(12) United States Patent
Wakayama et al.

(10) Patent No.: US 6,194,650 B1
(45) Date of Patent: *Feb. 27, 2001

(54) COATED OBJECT AND PROCESS FOR PRODUCING THE SAME

(75) Inventors: Hiroaki Wakayama; Yoshiaki Fukushima; Narihito Tatsuda; Yoshitsugu Kojima; Osami Kamigaito; Yasutomo Goto; Shinji Inagaki; Kenichirou Suzuki; Megumi Sasaki; Hiroaki Hayashi; Kazuo Higuchi; Norihiko Setoyama, all of Aichi-ken (JP)

(73) Assignee: Kabushiki Kaisha Toyota Chuo Kenkyusho, Aichi-gun (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/297,051

(22) PCT Filed: Aug. 26, 1998

(86) PCT No.: PCT/JP98/03822

§ 371 Date: Apr. 27, 1999

§ 102(e) Date: Apr. 27, 1999

(87) PCT Pub. No.: WO99/10167

PCT Pub. Date: Mar. 4, 1999

(30) Foreign Application Priority Data

| | | |
|---|---|---|
| Aug. 27, 1997 | (JP) | 9-247910 |
| Dec. 24, 1997 | (JP) | 9-367266 |
| May 25, 1998 | (JP) | 10-143143 |
| Jul. 3, 1998 | (JP) | 10-189220 |
| Jul. 3, 1998 | (JP) | 10-189221 |
| Jul. 3, 1998 | (JP) | 10-189222 |
| Jul. 3, 1998 | (JP) | 10-189223 |
| Jul. 3, 1998 | (JP) | 10-189224 |
| Jul. 3, 1998 | (JP) | 10-189225 |

(51) Int. Cl.$^7$ ............................. H01L 31/00; B05D 5/12
(52) U.S. Cl. ..................... 136/256; 427/74; 427/214; 502/101; 502/527
(58) Field of Search ..................... 136/256; 427/74, 427/214; 502/101, 527

(56) References Cited

FOREIGN PATENT DOCUMENTS

| | | |
|---|---|---|
| 28 53 066 | 6/1980 | (DE) . |
| 1-308873 | 12/1989 | (JP) . |
| 7-47140 | 5/1995 | (JP) . |

*Primary Examiner*—Mark Chapman
(74) *Attorney, Agent, or Firm*—Oblon, Spivak, McClelland, Maier & Neustadt, P.C.

(57) ABSTRACT

A coated material comprising a substrate which has micropores and a reaction product coated thereon along the surface configuration of the substrate and an inner wall of the micropores thereof. The coated material is preferably produced by performing a supercritical coating step wherein a reaction precursor is dissolved in a supercritical fluid to form a precursor fluid and then the precursor fluid is brought into contact with a substrate in the presence with a reaction initiator to allow a reaction between the reaction precursor and the reaction initiator, thereby coating a reaction product onto the substrate.

40 Claims, 42 Drawing Sheets

87 substrate (activated carbon powder)

8210
87

8201
821 oxide semiconductor layer 8201
82 oxide semiconductor electrode for solar cell
823
821
823 dye

COATED OBJECT AND PROCESS FOR PRODUCING THE SAME

FIELD OF THE INVENTION

The present invention relates to a coated material which is excellent in terms of chemical and physical properties such as a catalytic activity and adsorptivity and also relates to a method for producing the same.

BACKGROUND OF THE INVENTION

As a method for obtaining a material which is excellent in terms of chemical and physical properties such as a catalytic activity and adsorptivity, a method in which a microporous substrate is coated with an organic or inorganic coating material and a method in which a coated material formed by a coating step is peeled off to obtain a microporous-surfaced material having on its surface an inverted configuration of the microporous configuration of the substrate is known.

In such a method, a coating material such as a sol or gel is coated on a surface of a substrate. However, this method involves a problematic closure of a micropore opening with the coating material when the substrate has a micropore whose diameter is less than a micron order($\mu$m).

Accordingly, the coating material can not be penetrated into the innermost of the micropore, resulting in difficulty in obtaining an intended microporous-surfaced material effectively.

On the other hand, a method in which a coating material is coated onto a substrate by means of a gaseous phase method such as CVD is also proposed. However, in this method, a prolonged time period is required to allow the vapor of the coating material to be penetrated into the micropore. Especially in the case of a material having a low vapor pressure, only a small amount can be vaporized and the coating time is extremely prolonged.

In an attempt to overcome the problems mentioned above, a method in which a supercritical fluid containing a polymeric material dissolved therein is brought into contact with an inorganic porous membrane is proposed (Japanese Laid-Open Patent Publication No. 7-144121). Also a method is known in which a supercritical fluid containing a ceramic precursor such as a polycarbosilane or a polysilane dissolved therein is impregnated in a carbon/carbon complex where it is allowed to precipitate and then subjected to a heat treatment to form a ceramic membrane of SiC, SiN and the like on its surface thereby heightening its oxidation resistance (Japanese Laid-Open Patent Publication No. 1-308873).

Nevertheless, the methods disclosed in the publications described above involve, similarly as in the former two methods, the problematic closure of a micropore opening with the polymeric material when the micropore has a diameter less than a micron thereby preventing the supercritical fluid containing such a material from being penetrated sufficiently.

As a result, an intended coating can not be achieved.

An objective of the present invention is to overcome such conventional problems by providing a coated material and a method for producing the same, by which a coated material formed by coating the surface of a substrate efficiently with a reaction product can be obtained, and also by which a reaction product transferring or reproducing the microstructure of the substrate can be obtained after removing a part or all of the substrate from the coated material.

DISCLOSURE OF THE INVENTION

The first aspect of the present invention is a coated material comprising a substrate which has micropores, and a reaction product coated thereon along the surface configuration of the substrate and an inner wall of the micropores thereof.

The second aspect of the present invention is a coated material comprising a substrate having micropores a part of which is to be removed and, a reaction product coated along the surface configuration of the substrate and an inner wall of the micropores.

Any of these coated materials according to the present invention comprises a reaction product coated along the surface configuration of a microporous substrate into the innermost of the micropore. Accordingly, it exhibits an extremely excellent effect when applied to various uses as described hereinafter.

In addition, a substrate coated with the reaction product thus obtained or the reaction product itself can be imparted, depending on the properties of the reaction product, with a catalytic activity, a light catalytic activity, an adsorptivity, a heat resistance, a chemical resistance, an oxidation resistance, a conductivity, a ferromagnetism, a ferroelectricity, a superconductivity, a light function (reflex, absorption) and the like.

The reaction product may also be formed by mixing or laminating two or more components such as a chemically resistant membrane plus a photo-functional membrane.

The coated material may have the front side and the back side whose surfaces are both similar in their configurations to those of the micropores of the substrate or may have such a similar surface only on one side. In the latter case, the coated material may be used as a mold for reproducing the microporous configuration of the substrate.

A method for producing the excellent coated material described above is achieved by the following invention.

Thus, the third aspect of the present invention is a method for producing a coated material comprising a supercritical coating step wherein a reaction precursor is dissolved in a supercritical fluid to form a precursor fluid and then the precursor fluid is brought into contact with a substrate in the presence with a reaction initiator to allow a reaction between the reaction precursor and the reaction initiator, thereby coating a reaction product onto the substrate.

Also provided is a method for producing a coated material comprising:

a supercritical coating step wherein a reaction precursor is dissolved in a supercritical fluid to form a precursor fluid and then the precursor fluid is brought into contact with a substrate in the presence with a reaction initiator to allow a reaction between the reaction precursor and the reaction initiator, thereby coating a reaction product onto the substrate; and, a removing step wherein at least a part of the substrate is removed.

The advantageous effects of the present invention are described below.

In the present invention, the reaction precursor is first dissolved in the supercritical fluid to prepare a precursor fluid. In order to allow the reaction described above in the presence of a reaction initiator, a substrate containing the reaction initiator may for example be prepared. Then, the substrate is brought into contact with the precursor fluid by, for example, immersing the substrate in the precursor fluid, thereby allowing the precursor fluid to be penetrated into the micropore of the substrate.

In this step, the precursor fluid is readily be penetrated into the micropore since it employs the supercritical fluid as a solvent therefor. Since the reaction precursor dissolved in the supercritical fluid has a low molecular weight and a small molecular size, it does not close the opening of the micropore unlike a substance having a high molecular weight, such as the polymeric materials and polycarbosilanes employed in the conventional method.

Then the reaction precursor in the precursor fluid thus penetrated into the micropore reacts with the reaction initiator. Subsequently, the reaction precursor is converted into an intended reaction product, which coats the substrate.

Accordingly, the present invention allows the reaction product to be coated onto the surface of the substrate efficiently.

The supercritical fluid is a substance having solubilizability equivalent to that of fluid and dispersibility and viscosity close to those of gas. Therefore, it allows a large amount of a reaction precursor to be transported into the micropore readily and rapidly. The solubilizability can be adjusted by selecting temperature, pressure and entrainers (additives) appropriately.

The supercritical fluid may, for example, be carbon dioxide, methane, ethane, propane, methanol, ethanol, acetone, ethylene, butane and the like. Also in order to adjust the solubility of the reaction precursor in the supercritical fluid, an entrainer such as methanol, ethanol, acetone and the like can be employed.

The reaction precursor may, for example, be a metal or semi-metal (semiconductor) reaction precursor consisting of one or more of an alkoxide, an acetylacetate, an organic acid salt, a nitrate, an oxychloride, a chloride and the like, of a metal or a semi-metal (semiconductor).

The reaction initiator, which is for the reaction precursor, may be water and/or a surface functional group such as —OH.

Examples of a method for incorporating a reaction initiator in a substrate are a gaseous phase contact method, and a liquid phase immersion method and the like. When a material having micropores such as a porous material or a material whose surface has affinity with a reaction initiator is employed as a substrate, the reaction initiator can readily be incorporated into the micropore or onto the surface of the substrate by bringing the substrate into contact with a gas or a liquid containing the reaction initiator.

The substrate may be a filtration membrane, an osmotic membrane, an ion exchange membrane and a dialysis membrane.

The substrate may also be a porous material having a specific surface area of 100 $m^2/g$ or more. Such a porous material includes an activated carbon, a porous silica, a porous alumina, an alumina silicate and the like.

Especially when applying to a substrate having a micropore of a micron size which is as small as 1000 Å or less, a higher effect is obtained.

A reaction product formed resulted from a reaction between the reaction precursor and the reaction initiator may be a metal oxide formed from the metal reaction precursor or a semi-metal (semiconductor) oxide such as a silica or a metal.

The reaction product formed on the substrate as described above may also be removed from a part or all of the substrate if necessary by means of a heating and/or an addition of a solvent, thereby isolating as a reaction product which reflects the microporous structure of the substrate.

In addition, the reaction product formed on the substrate may be imparted with a function by means of a post-treatment such as a oxidizing or reducing treatment if necessary.

When the substrate is a porous material having a large surface area, a substrate coated with a reaction product having a large surface area can be obtained, and furthermore, a reaction product having a large surface area can be singly obtained by removing the substrate as described above.

The substrate coated with the reaction product thus obtained or the reaction product itself can be imparted, depending on the properties of the reaction product, with a catalytic activity, a light catalytic activity, an adsorptivity, a heat resistance, a chemical resistance, an oxidation resistance, a conductivity, a ferromagnetism, a ferroelectricity, a superconductivity, a light function (reflex, absorption) and the like.

The reaction product can also be formed by mixing or laminating two or more components such as a chemically resistant membrane plus an photo-functional membrane.

The reaction product may be a combination of two or more metal oxides such as $In_2O$—$SnO_2$ as a conductive material.

When the reaction product is a metal oxide, it can be converted into a metal by performing a reducing treatment as a post-treatment. The material produced by this procedure is in the state where a substrate is coated with a metal or where a metal cluster is supported on the substrate, and by using it as a metal one having a higher catalytic activity such as Pt, Pd and Rh, a substance suitable as a starting material for a catalyst can be produced.

The amount of the reaction product to be coated may be controlled on the basis of a cluster size consisting of several atoms by adjusting the amounts of the reaction initiator and/or the reaction precursor appropriately.

For example, when the reaction initiator is water and/or a surface functional group such as —OH and the reaction product is a silica ($SiO_2$) and the substrate is an activated carbon, then the amount of the water in the activated carbon may be varied on the basis of data such as the surface area and the isothermal adsorption curve of the activated carbon by controlling the amount of the water in an atmosphere with which the activated carbon is in contact, and the amount of the surface functional group such as —OH can be controlled by optimizing the activation condition of the activated carbon.

By using the activated carbon on which water and/or a surface functional group such as —OH in an amount required for forming a predetermined amount of silica is supported, the coating amount of the silica can precisely be designed on the basis of a cluster size consisting of several atoms.

Also when a further different material is additionally supported on a substrate containing a reaction initiator, a reaction product obtained by removing a part or all of the substrate therefrom after coating has an excellent performance such as capability of selectively adsorbing of the additionally supported material or its analogue, since it reflects the structure of the substrate as well as the structure of the material which was supported thereon.

When an electric field is applied to coat a substrate with a reaction product, a sufficient amount of a precursor fluid can be transported into the super-micropore of the substrate readily and rapidly as described above, since the precursor fluid has a high dispersibility and a low viscosity associated naturally with a supercritical fluid. This leads to a uniform coating with a sufficient amount.

A coated material produced by the excellent method for coating described above is provided by the following invention.

Thus, a coated material manufactured by a method comprises a supercritical coating step wherein a reaction precursor is dissolved in a supercritical fluid to form a precursor fluid and then the precursor fluid is brought into contact with a substrate in the presence with a reaction initiator to allow a reaction between the reaction precursor and the reaction initiator, thereby coating a reaction product onto the substrate.

In addition, a coated material manufactured by a method comprises a supercritical coating step wherein a reaction precursor is dissolved in a supercritical fluid to form a precursor fluid and then the precursor fluid is brought into contact with a substrate in the presence with a reaction initiator to allow a reaction between the reaction precursor and the reaction initiator, thereby coating a reaction product onto the substrate, followed by removing at least a part of the substrate.

The fourth aspect of the present invention is a condenser as a coated material obtained by utilizing the excellent coating method described above.

A method for producing a condenser which is an electronic assembly part is disclosed for example in Japanese Laid-Open Patent Publication No. 56-67919. In this method, the surface of a conductive thin film consisting of a metal formed on a substrate is oxidized by an ion implantation method to form a dielectric layer on the surface of the conductive thin film and then further on this dielectric layer, a conductive layer (counter electrode layer) is overlaid by a sputtering method, thereby producing a super-thin film condenser.

It is desired that a condenser has a capacitance which is as high as possible.

Unfortunately, the method disclosed in the publication described above employs an ion implantation method to form a dielectric layer and a sputtering method to form a counter electrode layer. For this reason, it can not be adapted to a porous material such as an activated carbon having a large surface area due to a complicated microporous structure, whereas it can be adapted to a flat substrate.

Accordingly, it is impossible to increase the surface area of a dielectric which determines the capacitance of the condenser, resulting in difficulty in increasing the capacitance.

Furthermore, in spite of various methods proposed so far to increase the capacitance, a condenser having a high capacitance is still not available due to impossibility of increasing the specific surface area of the dielectric layer.

In view of such problematic conventional arts, the following invention was established to provide a condenser having a high capacitance and a method for producing the same.

Thus, the coated material is a condenser comprising a conductive porous substrate as the substrate, a dielectric layer as a first reaction product and a counter electrode layer as a second reaction product, wherein the specific surface area of said dielectric layer is $1 \times 10^8$ $m^2/m^3$ or more.

Furthermore, the coated material is a condenser comprising a substrate-side electrode layer as a first reaction product, a dielectric layer as a second reaction product and a counter electrode layer as a third reaction product, wherein the specific surface area of said dielectric layer is $1 \times 10^8$ $m^2/m^3$ or more.

In principle, the condenser has electrode layers on both sides of the dielectric layer. These electrode layers may consist of a counter electrode layer formed on one side of the dielectric layer and a conductive porous substrate formed on the other side (see FIG. 10).

Alternatively, an electrode layer similar to the counter electrode may be formed instead of the conductive porous substrate (see FIG. 15).

In this invention, an extremely high capacitance can be obtained since the dielectric layer provided between the electrode layers has a specific surface area as high as $1 \times 10^8$ $m^2/m^3$ or more. Thus, for example, the specific surface area has been attempted to be increased by coating a dielectric layer onto the surface of a porous substrate, but the obtained specific surface area was only $3 \times 10^7$ $m^2/m^3$ at most, resulting in the capacitance as low as 0.02 mAh/g.

On the contrary, a capacitance as high as at least 2 mAh/g can be obtained according to the present invention because of a large specific surface area as described above (see embodiments).

The specific surface area ($m^2/m^3$) referred herein means a rate of the surface area ($m^2$) of the dielectric layer surface to the volume ($m^3$) of the porous substrate coated with the dielectric layer.

A method for producing a condenser having the high capacitance described above may be provided by the following invention.

Thus, a method for producing the coated material wherein the coated material is a condenser comprising a conductive porous substrate, a dielectric layer and a counter electrode layer, the method comprises:

a dielectric layer forming step wherein the dielectric layer is formed on the surface of the conductive porous layer and a counter electrode forming step wherein the counter electrode layer is coated onto said dielectric layer, wherein at least one of said dielectric layer forming step and said counter electrode forming step is conducted by means of the supercritical coating step.

In this invention, the surface of the conductive porous substrate is coated with the dielectric layer, further on which the counter electrode layer is provided by coating.

Thus, the conductive porous substrate may also serve as one electrode layer.

Since the conductive porous substrate employed also serves as a mold having an extremely large specific surface area, a dielectric layer whose specific surface are is as high as $1 \times 10^8$ $m^2/m^3$ or more can readily be produced. Thus, a condenser having a high capacitance can readily be obtained.

In the present invention, the conductive porous substrate means a substrate which has a conductivity and is porous. Examples of such a conductive porous substrate which can be employed are of a porous carbon such as an activated carbon, a porous metal such as a porous aluminum and a porous tantalum, and a porous article consisting of a conductive oxide of a metal and/or a semi-metal such as a porous ruthenium oxide, a porous vanadium oxide, a porous indium oxide, a porous tin oxide, a porous nickel oxide and the like.

Among these substances, the activated carbon is especially preferred since it has a high specific surface area and provides a high capacitance.

As the dielectric layer, one of, or a combination of two or more of an oxide and a nitride of a metal and/or a semi-metal may be employed.

Among the oxides of the metals and/or the semi-metals, a perovskite type compound and a titanium oxide-based compound are employed more preferably since they have high dielectric constants and provide higher capacitances.

Such a perovskite type compound includes an $A^{2+}B^{4+}O_3$ type compound consisting of a combination of divalent and tetravalent elements such as $BaTiO_3$, $SrTiO_3$, $CaTiO_3$, $PbTiO_3$, $BaZrO_3$, $PbZrO_3$, $Pb_xSr_{1-x}(ZrT_{1-y})O_3$ and the like, an $A^{1+}B^{5+}O_3$ type compound consisting of a combination of monovalent and pentavalent elements such as $NaTaO_3$, $KTaO_3$, $NaNbO_3$, $K_xNa_{1-x}(Nb_yTa_{1-y})O_3$ and the like, an $A^{3+}B^{3+}O_3$ type compound consisting of a combination of trivalent elements such as $LaAlO_3$ and the like, an $A^{2+}(B^{3+}_{0.5}B'^{5+}_{0.5})O_3$ type compound consisting of a combination of divalent, trivalent and pentavalent elements, an $A^{2+}(B^{2+}_{0.5}B'^{6+}_{0.5})O_3$ type compound consisting of a combination of divalent and hexavalent elements, an $A^{2+}(B^{1+}_{0.5}B'^{7+}_{0.5})O_3$ type compound consisting of a combination of monovalent, divalent and heptavalent elements, an $A^{3+}(B^{2+}_{0.5}B'^{4+}_{0.5})O_3$ type compound consisting of a combination of divalent, trivalent and tetravalent elements, an $A^{2+}(B^{1+}_{0.25}B'^{5+}_{0.75})O_3$ type compound consisting of a combination of monovalent, divalent and pentavalent elements and the like, and one of these compounds and/or a mixture of two or more of these compounds may be employed.

The titanium oxide-based compounds include $TiO_2$ and $TiO_2$ combined with a solvent at a concentration of 20% or less. Such a solvent may be a titanate of Ba, Sr, Ca, Mg, Be, and CaO, MgO, BeO, $BaCO_3$, $SiO_2BeO$, $BaCO_3$, $SiO_2$ and the like.

As the dielectric layer forming step in which a dielectric layer is formed on the surface of the conductive porous substrate, a method for coating by means of the supercritical coating step (hereinafter referred to as a supercritical coating method as appropriate) may be employed. The supercritical coating method allows a uniform dielectric layer to be formed in a short time.

Also by performing a heat treatment after coating the dielectric layer to crystallize the dielectric layer, the dielectric constant can be improved. Such a heat treatment is more preferred to be performed since it serves to improve the dielectric constant of the dielectric layer.

The heat treatment preferably employs a temperature of 300 to 1200° C. More preferably, the temperature is 600 to 900° C.

The supercritical coating step is accomplished, as described above, by a step in which a reaction precursor is dissolved in a supercritical fluid to form a precursor fluid (dissolution step) followed by a step in which a substrate is brought into contact with the precursor fluid in the presence of a reaction initiator to allow a reaction between the reaction precursor and the reaction initiator, thereby coating a reaction product onto the substrate (coating step).

The supercritical fluid in this invention may, for example, be a hydrocarbon such as methane, ethane, propane, butane, ethylene, propylene and the like, an alcohol such as methanol, ethanol, propanol, iso-propanol, butanol, iso-butanol, sec-butanol, tert-butanol and the like, a ketone such as acetone, methylethylketone and the like, and carbon dioxide, ammonia, chlorine, chloroform, Freon and the like.

As an entrainer for adjusting the solubility of the reaction precursor in the supercritical fluid, an alcohol such as methanol, ethanol, propanol and the like, a ketone such as acetone, ethylmethylketone and the like, or an aromatic hydrocarbon such as benzene, toluene, xylene and the like may also be employed.

As the reaction precursor, an alkoxide of a metal and/or a semi-metal, an acetylacetate of a metal and/or a semi-metal, an organic salt of a metal and/or a semi-metal, a nitrate of a metal and/or a semi-metal, an oxychloride of a metal and/or a semi-metal, a chloride of a metal and/or a semi-metal may be employed independently or in combination of two or more of these.

As the reaction initiator, which is for the reaction precursor, water may be employed. Alternatively, a surface functional group of a porous substrate, such as —OH, may serve as the reaction initiator without addition of any exogenous reaction initiators.

A method for incorporating the reaction initiator into the porous substrate may for example be a gaseous phase contact method or a liquid phase contact method. Since the porous substrate has a micropore, it can readily contain the reaction initiator by means of a contact with a gas or a liquid containing the reaction initiator. The thickness of the dielectric layer which is a reaction product can be adjusted on the basis of a thickness of several atoms by adjusting the amounts of the reaction initiator and/or the reaction precursor.

For example, when the reaction initiator is water and/or a surface functional group of a porous substrate such as —OH, the reaction product is a titania ($TiO_2$) and the porous substrate is an activated carbon, then the amount of the water in the activated carbon may be varied on the basis of data such as the surface area and the isothermal adsorption curve of the activated carbon by adjusting the amount of the water in an atmosphere with which the activated carbon is in contact, and the amount of the surface functional group such as —OH can be controlled by optimizing the activation condition of the activated carbon.

In this manner, the thickness of the dielectric layer consisting of a certain reaction product such as titania can be designed to obtain a thickness of several atoms or otherwise various thicknesses.

As a method for forming the dielectric layer on the surface of a porous substrate, a method in which a material for the dielectric layer is dissolved in a solvent such as ethanol and the solution thus obtained is coated onto the surface of the porous substrate has conventionally been proposed.

However, such a coating method for the dielectric layer employing a liquid as a solvent does not allow the solvent to be penetrated into the micropore of the porous substrate due to a high surface tension of the liquid, resulting in the closure of the micropore of the substrate with the coating layer.

Accordingly, this method gives an extremely low specific surface area of the dielectric layer formed on the surface of the porous substrate, although the porous substrate itself has a high specific surface area.

The electrode layer may be a metal such as Pt, Pd, Au, Rh and the like, a conductive carbon, a metal oxide conductive material, a metal oxide semiconductor and the like.

The supercritical coating method may be also employed as a step for forming a counter electrode layer.

As the precursor for a counter electrode layer described above, an alkoxide of a metal and/or a semi-metal, an acetylacetate of a metal and/or a semi-metal, an organic salt of a metal and/or a semi-metal, a nitrate of a metal and/or a semi-metal, an oxychloride of a metal and/or a semi-metal, a chloride of a metal and/or a semi-metal, a hydrocarbon, an oxygen-containing hydrocarbon and a chlorine-containing hydrocarbon which can be carbonized by a heat treatment, may be employed.

In addition, a compound consisting of one or more of these substances and/or a mixture consisting of one or more of such compounds may also be employed.

A reaction taking place in the post-treatment performed after the coating of a reaction precursor may be one of those described below.

(1) When the counter electrode layer is a metal, a metal chloride, for example, is employed as a precursor for the counter electrode layer, and the coating is conducted by CVD coating method or a supercritical coating method, and the metal chloride is subjected to pyrolysis to obtain a metal layer. Instead of the metal chloride, a metal acetylacetate and an organic acid salt of a metal may also be employed.

(2) When the counter electrode layer is a conductive carbon, a hydrocarbon, an oxygen-containing hydrocarbon and a chlorine-containing hydrocarbon which can be carbonized by a heat treatment may for example be coated by CVD coating method or a supercritical coating method, and then carbonized by the heat treatment to form the conductive carbon layer.

(3) When the counter electrode layer is a metal oxide conductive material or a metal oxide semiconductor, a metal alkoxide may, for example, be coated by CVD coating method or a supercritical coating method, and then hydrolyzed. Instead of the metal alkoxide, a metal acetylacetate, an organic acid salt of a metal, a metal nitrate, a metal oxychloride, a metal chloride may also be employed.

(4) When the counter electrode layer is a semi-metal oxide conductive material or a semi-metal oxide semiconductor, a metal alkoxide may, for example, be coated by CVD coating method or a supercritical coating method, and then hydrolyzed. Instead of the semi-metal alkoxide, a semi-metal acetylacetate, an organic acid salt of a semi-metal, a semi-metal nitrate, a semi-metal oxychloride, a semi-metal chloride may also be employed.

In any of the above cases, the supercritical coating method is more preferable since it can form a counter electrode layer deep into the micropore of a dielectric layer in a short time period.

Also in any of the above cases, a thicker counter electrode layer may be coated by means of a liquid phase coating method on the top of the counter electrode layer formed in the counter electrode forming step described above and then subjected to the reaction in a post-treatment step, thereby increasing the conductivity. Two or more electrode layers may also be laminated.

The liquid phase coating method for forming a counter electrode on the surface of the dielectric layer means a coating method comprising a dissolution step in which a reaction precursor is dissolved in a solvent such as an alcohol to prepare a coating solution and a coating step in which the precursor is reacted with a reaction initiator by contact with a dielectric layer containing the reaction initiator to effect the coating of a reaction product onto the surface of the dielectric layer.

Another method for producing the condenser may be provided by the following invention.

Thus, a method for producing a coated material wherein the coated material is a condenser comprising a porous substrate, a substrate-side electrode layer, a dielectric layer and a counter electrode layer, the method comprises:

performing a substrate-side electrode forming step wherein the substrate-side electrode layer is formed on the surface of the porous substrate, a dielectric layer forming step wherein the dielectric layer is formed on said substrate-side electrode layer, and a counter electrode layer forming step wherein the counter electrode layer is formed on said dielectric layer, wherein at least one of said substrate-side electrode forming step, said dielectric layer forming step and said counter electrode layer forming step is conducted by means of the supercritical coating step.

Also in this invention, the excellent condenser described above can readily be obtained.

Examples of the porous substrate are a porous carbon such as an activated carbon, a porous metal such as a porous aluminum and a porous tantalum, a porous silica, a porous alumina, a porous titania, a porous aluminasilicate, and a porous material consisting of an oxide of a metal and/or a semi-metal such as a porous ruthenium oxide, a porous vanadium oxide, a porous indium oxide, a porous tin oxide, a porous nickel oxide and the like. A substrate obtained by coating one of these porous substrates with a conductive material or a semiconductor may also be employed.

An activated carbon is especially preferred since it has a high specific surface area and provides a high capacitance.

In the substrate-side electrode forming step, the counter electrode forming step in the aforementioned production method may similarly be employed except for forming the substrate-side electrode layer on the surface of the porous substrate.

The dielectric layer forming step and the aforementioned counter electrode forming are similar to those in the production method.

Furthermore, another method for producing the condenser is provided by the following invention.

Thus, a method for producing a coated material wherein the coated material is a condenser comprising a substrate-side electrode layer, a dielectric layer and a counter electrode layer, the method comprises:

performing a substrate-side electrode forming step wherein the substrate-side electrode layer is formed on the surface of a porous substrate, a dielectric layer forming step wherein the dielectric layer is formed on said substrate-side electrode layer, a counter electrode layer forming step wherein the counter electrode layer is formed on said dielectric layer, and a removing step wherein the porous substrate is removed, wherein at least one of said substrate-side electrode forming step, said dielectric layer forming step and said counter electrode layer forming step is conducted by means of the supercritical coating step.

Also in this invention, the excellent condenser described above can readily be obtained.

In these stepes, as a porous substrate capable of being subjected to the substrate separation procedure, a porous carbon such as an activated carbon or a porous metal such as a porous aluminum and a porous tantalum and the like may be employed.

In the substrate removing step, when the substrate is a porous carbon, the carbon may be oxidized by heating in an oxidative atmosphere to be converted into a carbon monooxide and/or carbon dioxide thereby removing the substrate.

When the substrate is a porous metal, it can be removed by dissolving in an acid such as hydrochloric acid.

Otherwise, the aforementioned production method can be employed similarly.

Furthermore, a coated material (condenser) produced by utilizing an excellent method is provided by the following invention.

Thus, a coated material which is a condenser comprising a conductive porous substrate, a dielectric layer and a counter electrode layer, is obtained by:

performing a dielectric layer forming step wherein the dielectric layer is formed on the surface of the conductive porous layer and a counter electrode forming step wherein the counter electrode layer is coated onto said dielectric layer, wherein at least one of said dielectric layer forming step and said counter electrode forming step is conducted by means of the supercritical coating step.

Furthermore, a coated material which is a condenser comprising a porous substrate, a substrate-side electrode layer, a dielectric layer and a counter electrode layer, is obtained by:

performing a substrate-side electrode forming step wherein the substrate-side electrode layer is formed on the surface of the porous substrate, a dielectric layer forming step wherein the dielectric layer is formed on said substrate-side electrode layer, and a counter electrode layer forming step wherein the counter electrode layer is formed on said dielectric layer, wherein at least one of said substrate-side electrode forming step, said dielectric layer forming step and said counter electrode layer forming step is conducted by means of the supercritical coating step.

Moreover, a coated material which is a condenser comprising a substrate-side electrode layer, a dielectric layer and a counter electrode layer, obtained by:

performing a substrate-side electrode forming step wherein the substrate-side electrode layer is formed on the surface of a porous substrate, a dielectric layer forming step wherein the dielectric layer is formed on said substrate-side electrode layer, a counter electrode layer forming step wherein the counter electrode layer is formed on said dielectric layer, and a removing step wherein the porous substrate is removed, wherein at least one of said substrate-side electrode forming step, said dielectric layer forming step and said counter electrode layer forming step is conducted by means of the supercritical coating step.

The fifth aspect of the present invention is a catalyst as a coated material obtained by utilizing the excellent coating method described above.

As a noble metal-supporting catalyst, a porous support material having an acid point such as zeolite on which a noble metal is supported by impregnation with a solution of a salt thereof or by ion exchange has widely been reported.

However, one having a large number of the acid points i.e. the ion exchange sites such as zeolite involves a problematic excessive particle growth of the noble metal supported on the support material when subjected to a water-heat durability test as a result of destruction of the crystalline structure of the support material due to de-aluminum phenomenon (change in the coordination number of zeolite structure from 4 to 6).

Accordingly, Japanese Laid-Open Patent Publication No. 4-176337 discloses an exhaust gas purification catalyst supporting a noble metal on a high silica zeolite having a Si/Al ratio of 40 or more and less than 1000 as a support material. A zeolite having a high Si/Al ratio suppresses the particle growth of a noble metal due to the de-aluminum.

Nevertheless, a zeolite having a high Si/Al ratio involves difficulty in supporting the noble metal as highly dispersed therein since the noble metal is supported as concentrated on a small number of the ion exchange sites. Moreover, such a zeolite is not satisfactorily durable because of the motility of the noble metal thereon which allows the particle growth to occur easily.

In view of such conventional problems, the following invention is established to provide a method for producing a catalyst in which a catalyst component such as a noble metal is placed as highly dispersed in a support and which has an excellent durability.

Thus, a method for producing a coated material which is a catalyst having a catalyst component as supported on a support material, comprises:

a catalyst component bonding step wherein the catalyst component is bonded as dispersed onto the surface of a substrate;

a support coating step wherein the support material is coated on said catalyst component, followed by;

a substrate removing step wherein the substrate is removed, wherein at least one of catalyst bonding step and the support coating step is conducted by means of the supercritical coating step.

Furthermore, a method for producing a coated material which is a noble metal-supporting catalyst having a noble metal supported on a support material, comprises:

a noble metal loading step wherein the noble metal as the catalyst component is loaded as dispersed onto a pore wall surface of a porous substrate;

a support coating step wherein the support material is coated on said noble metal, followed by;

a substrate removing step wherein the porous substrate is removed, wherein at least one of the noble metal loading step and the support coating step is conducted by means of the supercritical coating step.

The most important feature of this invention is that a catalyst component is loaded as dispersed onto the surface of the substrate and then the support material is further overlaid thereon and then the substrate is removed.

The advantageous effects of this invention are described below.

In this invention, a catalyst component in a form of a catalyst component having a small particle size is placed as highly dispersed, since the catalyst component is loaded as dispersed onto the surface of a substrate. Then a support material is further overlaid. As a result, the catalyst component is in the state that it is highly dispersed as a particle at a high density almost uniformly on the surface of the support material. Therefore, the catalyst obtained by this invention has a high catalytic activity.

Also since the rear part of the particle of the catalyst component is embedded in the support material as shown in FIGS. 16A to 16D discussed later, the interaction between the catalyst component and the support material is strong, thereby limiting the motility of the catalyst component. Thus, there is a less possibility of a sintering resulted from the particle growth due to the binding of the catalyst component to each other. Therefore, the catalyst obtained by this invention has an excellent durability.

In addition, by subjecting a noble metal-supporting catalyst further to the noble metal loading step, a support coating step, and the noble-metalizing and support-forming stepes repetitively, a catalyst having a further high activity can be obtained.

The catalyst component bonding step and the noble metal loading step are discussed below.

In this invention, a porous substrate exerts an especially high effect when used as a substrate. Such a porous substrate is a substrate having a large number of pores on its surface.

Examples of such a porous substrate are a porous carbon such as an activated carbon, a porous metal such as a porous aluminum and a porous tantalum, a porous silica, a porous alumina, a porous aluminasilica, and a porous article consisting of a conductive oxide of a metal and/or a semi-metal such as a porous ruthenium oxide, a porous vanadium oxide, a porous indium oxide, a porous tin oxide, a porous nickel oxide, and a polymeric foam such as polyolefin and polyurethane foams and the like.

Among these substances, an activated carbon is especially preferred since it has a high specific surface area and can adsorb a large amount of a noble metal as dispersed therein. As the substrate, one capable of being easily removed by means of heat treatment or acid/base treatment and the like is preferable. The activated carbon is especially preferred since it can readily be removed by sintering and the like.

As the catalyst component, a noble metal or a promoter such as $CeO_2$ may be mentioned. The noble metal such as Pt, Rh, Pd, Ir and Ru may appropriately be employed depending on use of a noble metal-supporting catalyst.

As the catalyst component bonding step and the noble metal loading step wherein a catalyst component such as a noble metal is loaded as dispersed onto the surface of the substrate, CVD coating method, a solution immersion method, the supercritical coating method may for example be employed. The supercritical coating method is preferred especially since it allows a uniform catalyst component layer to be formed within a short time period.

In the CVD method, vapor of the catalyst component such as a noble metal is deposited under a reduced pressure onto the surface. In the solution immersion method, the substrate is immersed in a solution such as an aqueous solution of a noble metal salt (e.g., a platinum chloride).

The supercritical coating step is accomplished, as described above, by a step in which a reaction precursor of a catalyst component is dissolved in a supercritical fluid to form a precursor fluid (dissolution step) followed by a step in which a substrate is brought into contact with the precursor fluid in the presence of a reaction initiator to allow a reaction between the reaction precursor and the reaction initiator, thereby coating the catalyst component such as a noble metal as a reaction product or its precursor onto the substrate (coating step).

Generally, the supercritical fluid means a fluid at a temperature and under a pressure which exceed a critical point of a substance. However, the supercritical fluid referred herein is a fluid at least at a temperature not lower than the critical point, and the pressure is not necessarily within the range defined above. A fluid in such conditions has a solubilizability equivalent to that of a liquid and a dispersibility and a viscosity close to those of a gas. Therefore, it allows a large amount of a reaction precursor to be transported into the micropore readily and rapidly. The solubilizability can be adjusted by selecting the temperature, the pressure and the entrainers (additives) appropriately.

The supercritical fluid in the present invention may, for example, be a hydrocarbon such as methane, ethane, propane, butane, ethylene, propylene and the like, an alcohol such as methanol, ethanol, propanol, iso-propanol, butanol, iso-butanol, sec-butanol, tert-butanol and the like, a ketone such as acetone, methylethylketone and the like, and carbon dioxide, water, ammonia, chlorine, chloroform, Freon and the like.

As an entrainer for adjusting the solubility of the reaction precursor in the supercritical fluid, an alcohol such as methanol, ethanol, propanol and the like, a ketone such as acetone, ethylmethylketone and the like, or a aromatic hydrocarbon such as benzene toluene, xylene and the like may also be employed.

As the noble metal reaction precursor, an alkoxide of a noble metal, an acetylacetate of a noble metal, an organic salt of a noble metal, a nitrate of a noble metal, an oxychloride of a noble metal, and a chloride of a noble metal may be employed independently or in combination of two or more of these.

As the reaction initiator, which is for the reaction precursor, water may be employed. A surface functional group of a porous substrate, such as —OH, may also be employed as the reaction initiator.

A method for incorporating the reaction initiator into the porous substrate may for example be a gaseous phase contact method or a liquid phase contact method. When a porous substrate has a micropore, it can readily contain a reaction initiator by means of a contact with a gas or a liquid containing the reaction initiator.

The thickness of a noble metal layer which is a reaction product can be adjusted by adjusting the amounts of the reaction initiator and/or the reaction precursor within the range from a cluster to a laminate.

For example, when the reaction initiator is water and/or a surface functional group of a substrate such as —OH and the substrate is an activated carbon, then the amount of the water in the activated carbon may be varied on the basis of data such as the surface area and the isothermal adsorption curve of the activated carbon by adjusting the amount of the water in an atmosphere with which the activated carbon is in contact. The amount of the surface functional group such as —OH can be adjusted by optimizing the activation condition of the activated carbon.

In this manner, a thickness of a certain noble metal can be designed to obtain a thickness of a cluster of several atoms up to various thicknesses.

As a method for bonding a noble metal on the surface of a porous substrate, a method in which a noble metal salt is dissolved in a solvent such as water and ethanol and the solution thus obtained is coated onto the surface of the porous substrate has conventionally been proposed.

However, such a solution coating method employing a liquid as a solvent does not allow the solvent to be penetrated into the micropore of the porous substrate due to a high surface tension of the liquid, resulting in the closure of the micropore of the substrate with the coating layer.

Accordingly, such a surface can not be utilized sufficiently to achieve the bonding of a noble metal as being dispersed therein, although the porous substrate itself has a high specific surface area.

The support coating step is detailed below.

In this step, a support material is coated onto a noble metal as a catalyst component which is loaded as dispersed onto a pore wall surface of a porous substrate. The support material is formed as covering the entire surface of the pore wall.

The support material includes a metal oxide, a metal nitride, a metal carbide, a metal, an organic polymer and the like. Such a metal oxide includes $Al_2O_3$, $SiO_2$, $Fe_2O_3$, $ZrO_2$, $SnO_2$, $TiO_2$ and the like.

The metal nitride may be silicon nitride, aluminum nitride, boron nitride, carbon nitride and the like. The metal carbide may be calcium carbide, silicon carbide, tungsten carbide, iron carbide, sodium carbide, boron carbide, manganese carbide and the like.

The organic polymer, which may be used as a support, may be a foam of a polymer such as a polyolefin or a polyurethane and various organic polymers.

As a method for coating the support material, the CVD coating method, the solution immersion method, the supercritical coating method, employed in the noble metal loading step, may be mentioned.

The supercritical coating step is accomplished by a step in which a reaction precursor consisting of a starting material for a support material such as a metal oxide (for example, a compound of a metal such as Al and Si) is dissolved in a supercritical fluid to form a precursor fluid (dissolution step) followed by a step in which a reaction initiator is contained in said precursor fluid, which is brought into contact with the substrate to which the noble metal is bound as dispersed to allow a reaction between the reaction precursor and the reaction initiator, thereby coating a support material as a reaction product onto the surface of the noble metal and the substrate (coating step).

As the reaction precursor, an alkoxide of a metal and/or a semi-metal, an acetylacetate of a metal and/or a semi-metal, an organic salt of a metal and/or a semi-metal, a nitrate of a metal and/or a semi-metal, an oxychloride of a metal and/or a semi-metal, and a chloride of a metal and/or a semi-metal, which constitute a metal oxide or a metal nitride mentioned previously, may be employed. An organic monomer, an organic dimer, an organic trimer and an organic tetramer comprised in the organic polymer may also be employed.

In addition, a compound consisting of one or more of these substances and/or a mixture consisting of one or more of such compounds may also be employed.

A tough support can be obtained by repeating the coating step, if necessary.

In a substrate removing step when a substrate is a porous carbon such as an activated carbon, the carbon may be oxidized by heating in an oxidative atmosphere to be converted into carbon monooxide and/or carbon dioxide, thereby removing the substrate. Upon this heating, the starting material for a support material is converted into a support material such as a metal oxide.

The reaction precursor of the noble metal employed in the supercritical coating method or a noble metal salt employed in the solution immersion method is converted upon the heating into a noble metal as a catalyst component.

In the substrate removing step, when the substrate is a porous metal, the substrate can be removed by dissolution using an acid such as hydrochloric acid or hydrofluoric acid or using an alkali such as an aqueous solution of sodium hydroxide.

In this procedure, it is preferable to convert the starting material for the support material into the support material by addition of a polymerization promoter prior to the substrate removing step.

The conversion of the noble metal salt into a noble metal is performed by a heat treatment or an irradiation before or after the removal of the substrate.

When a support material is an organic polymer especially, the removal of the substrate by the heating in the oxidative atmosphere is not preferable, but it is preferable to dissolve the substrate off using the acid, alkali or organic solvent.

As a result of these stepes, a catalyst in which a catalyst component such as a noble metal is supported on a support material can be obtained.

The catalyst obtained according to the present invention can widely be employed in the fields of exhaust gas cleaning, petroleum chemical industry, chimney gas cleaning, organic substance decomposition and the like, depending on selection of the noble metals as catalyst components.

The coated material (catalyst) produced by utilizing the excellent method described above is provided by the following invention.

Thus, a coated material, wherein the coated material is a catalyst having a catalyst component as supported on a support material, is obtained by performing:

a catalyst component bonding step wherein the catalyst component is bonded as dispersed onto the surface of a substrate;

a support coating step wherein the support material is coated on said catalyst component, followed by;

a substrate removing step wherein the substrate is removed;

wherein at least one of catalyst bonding step and the support coating step is conducted by means of the supercritical coating step.

Furthermore, a coated material, wherein the coated material is a noble metal-supporting catalyst having a noble metal supported on a support material, is obtained by performing:

a noble metal loading step wherein the noble metal as the catalyst component is loaded as dispersed onto a pore wall surface of a porous substrate, a support coating step wherein the support material is coated on said noble metal, followed by, a substrate removing step wherein the porous substrate is removed, wherein at least one of the noble metal loading step and the support coating step is conducted by means of the supercritical coating step.

The sixth aspect of the present invention is a metal-supported material obtained by utilizing the excellent method described above.

As a method for producing a metal-supported material such as a metal-supporting catalyst, an immersion supporting method using an aqueous solution of a metal salt or an ion exchange supporting method and the like as discussed with regard to the catalyst has conventionally been employed. In addition, an exhaust gas purification catalyst consisting of a metal supported on a high silica zeolite having a Si/Al ratio of 40 to 1000 is disclosed (Japanese Laid-Open Patent Publication No. 4-176337).

However, such conventional methods involve the following problems.

Thus, the zeolite having a high Si/Al ratio involves difficulty in supporting a noble metal as highly dispersed therein since the noble metal is supported as concentrated on a small number of the ion exchange sites. In addition, such a zeolite is not satisfactorily durable because of the motility of the noble metal thereon which allows the particle growth to occur easily.

In addition, when using a solution method, it is difficult to allow a metal to be supported as penetrated deep into the microstructure of the micropore of the zeolite.

In view of such conventional problems, the following invention is established to provide a method for producing a metal-supported material by which a metal can be supported on a pore wall surface of a porous substrate as highly dispersed deep into a micropore.

Thus, a method for producing a coated material wherein the coated material is a metal-supported material having a metal supported on the substrate, the method including a supercritical coating step comprises:

a dissolution step wherein a metal precursor is dissolved in a supercritical fluid to form a precursor fluid, a supercritical coating step wherein the precursor fluid is brought into contact with the substrate in the presence of a reaction initiator to allow a reaction between the metal precursor and the reaction initiator, thereby coating the metal onto the substrate.

Thus, a method for producing a coated material, wherein the coated material is a metal-supported material having a metal supported on the substrate, comprises:

a supercritical coating step wherein a metal precursor is dissolved in a supercritical fluid to form a precursor fluid, and then the precursor fluid is brought into contact with the substrate in the presence of a reaction initiator to allow a reaction between the metal precursor and the reaction initiator, thereby coating the metal onto the substrate, and, a sintering step wherein the material thus obtained is heated and sintered.

The most important feature of this invention is that the supercritical coating step comprises the production of a precursor fluid (dissolution step) and the coating procedure effected by the reaction described above (coating step) is performed.

In addition, by adjusting the amount of the metal precursor, it is possible not only that the metal can be supported as highly dispersed on a porous substrate but also that the porous substrate can uniformly be coated with the metal.

Furthermore, by removing the substrate after coating, a metal onto which the surface configurations of the substrate (i.e., a high surface area) is transferred can be obtained.

The advantageous effects of this invention are described below.

In this invention, a precursor fluid to be brought into contact with a substrate employs a supercritical fluid as a solvent therefor. Therefore, the precursor fluid can be penetrated into the micropore of the substrate readily and rapidly.

Also since the metal is embedded deep into the micropore of a porous support as shown in FIG. 17 referred to later, the interaction between the metal and the substrate is strong, thereby limiting the motility of the metal. Thus, there is a less possibility of a sintering resulted from the particle growth due to the binding of the metal to one another.

Therefore, a metal-supported material obtained by this invention has an excellent durability.

The dissolution step is detailed below.

First, a metal precursor such as a metal salt is dissolved in the supercritical fluid to form a precursor solution such as a metal salt solution.

The supercritical fluid in the present invention may, for example, be a hydrocarbon such as methane, ethane, propane, butane, ethylene, propylene and the like, an alcohol such as methanol, ethanol, propanol, iso-propanol, butanol, iso-butanol, sec-butanol, tert-butanol and the like, a ketone such as acetone, methylethylketone and the like, and carbon dioxide, water, ammonia, chlorine, chloroform, Freon and the like.

As an entrainer for adjusting the solubility of the metal precursor in the supercritical fluid, an alcohol such as methanol, ethanol, propanol and the like, a ketone such as acetone, ethylmethylketone and the like, or an aromatic hydrocarbon such as benzene toluene, xylene and the like may also be employed.

As the metal precursor, an alkoxide of a metal and/or a semi-metal, an acetylacetate of a metal and/or a semi-metal, an organic salt of a metal and/or a semi-metal, a nitrate of a metal and/or a semi-metal, an oxychloride of a metal and/or a semi-metal, a chloride of a metal and/or a semi-metal may be employed independently or in combination of two or more of these.

The coating step is detailed below.

Thus, the precursor fluid obtained in the dissolution step is brought into contact with a substrate. As such a substrate, a porous substrate is highly effective.

The porous substrate means a substrate having a large number of micropores on its surface.

Examples of such a porous substrate are a porous carbon such as an activated carbon, a porous metal such as a porous aluminum and a porous tantalum, a porous silica, a porous alumina, a porous aluminasilica, and a porous article consisting of an oxide of a metal and/or a semi-metal such as a porous ruthenium oxide, a porous vanadium oxide, a porous indium oxide, a porous tin oxide, a porous nickel oxide, and a polymeric foam such as polyolefin and polyurethane foams and the like.

Among these substances, an activated carbon and a porous oxide are especially preferred since they have high specific surface areas and can adsorb a large amount of a metal as dispersed therein.

In addition, by adjusting the amount of a metal precursor, it is possible not only that the metal can be supported as highly dispersed but also that the porous substrate can uniformly be coated with the metal.

When the metal is supported or coated still in the form of a metal precursor on a substrate, then the metal precursor can be converted into the metal by conducting a post-treatment such as a heat treatment or an irradiation subsequently if necessary.

The post-treatment step is detailed below.

A substrate having the precursor coated thereon which was formed in the coating step is then subjected to heat-sintering or irradiation.

As a result, the metal precursor coated on the substrate such as a metal salt can be converted into a metal or a metal oxide, thereby obtaining a metal-supported material.

The metal to be supported on the substrate may be a noble metal such as Pd, Pt, Rh, Ru, Ir and the like, and a metal oxide such as $Al_2O_3$, $SiO_2$, $ZrO_2$, $CeO_2$, $Fe_2O_3$, $TiO_2$, $La_2O_3$ and the like.

In such a case, a use as a catalyst and/or a promoter is effective.

In this invention, the metal which is the supported component includes an elemental metal and a metal oxide.

The metal-supported material formed on the substrate as described above can be extracted as a metal which reflects the microporous structure of the substrate by removing a part or all of the porous substrate by means of heating or addition of a solvent, as necessity requires.

According to this invention, a method for producing a metal-supported material by which a metal can be supported on a substrate as highly dispersed deep into a micropore can be obtained.

The metal-supported material obtained according to this invention can be used, for example, as a catalyst, an adsorbent and a separation material.

A coated material (metal-supported material) produced by utilizing the excellent method is provided by the following invention.

Thus, a coated material, wherein the coated material is a metal-supported material having a metal supported on a substrate, is obtained by performing a supercritical coating step wherein a metal precursor is dissolved in a supercritical fluid to form a precursor fluid, and then the precursor fluid is brought into contact with the substrate in the presence of a reaction initiator to allow a reaction between the metal precursor and the reaction initiator, thereby coating the metal onto the substrate.

Furthermore, a coated material, wherein the coated material is a metal-supported material having a metal supported on the substrate, is obtained by performing a supercritical coating step wherein a metal precursor is dissolved in a supercritical fluid to form a precursor fluid, and then the precursor fluid is brought into contact with the substrate in the presence of a reaction initiator to allow a reaction between the metal precursor and the reaction initiator, thereby coating the metal onto the substrate followed by sintering the material.

The seventh aspect of the present invention is a light catalyst as a coated material obtained by utilizing the excellent method described above.

Conventionally, as a light catalyst capable of adsorbing and decomposing an odor component or a pollutant, a glass or metal substrate supporting a light catalyst component such as $TiO_2$ on its surface was proposed.

As a method for producing such a conventional light catalyst, a so-called alkoxide method is disclosed in Japanese Laid-Open Patent Publication No. 8-299789.

Thus, a titanium alkoxide diluted with an alcohol is sprayed onto the surface of a warmed substrate. In this manner, the titanium alkoxide is hydrolyzed by an atmospheric moisture to form a hydrated titanium dioxide layer on the surface of the substrate. Subsequently, the substrate is sintered and then non-fixed $TiO_2$ is removed from the surface of the substrate. Finally, a highly active titanium dioxide light catalyst can be obtained.

In Japanese Laid-Open Patent Publication No. 8-117596, a method for producing a light catalyst utilizing a titanium dioxide particle is disclosed.

Thus, a titanium dioxide particle is first impregnated with water, dispersed in a solvent-based paint and applied onto a substrate. Then, after evaporating the solvent off by a primary drying followed by evaporating the water off by a secondary drying, a light catalyst supporting the titanium dioxide particle on the substrate is produced.

However, the conventional methods for producing light catalysts described above involve the following problems.

Thus, in order to elicit a light catalyst function sufficiently, a substrate having a higher specific surface area is required.

As such a substrate having a higher specific surface area, a porous substrate such as an activated carbon or a zeolite is employed.

However, when supporting a light catalyst component such as $TiO_2$ on the porous substrate using the solution as described above, the solution can not be penetrated deep into the micropore of the porous substrate. In addition, the light catalyst component is coated as closing the opening of the micropore.

As a result, the high specific surface area of the porous substrate can not be utilized efficiently, and the catalyst function can not be exerted sufficiently, and the adsorptivity of the porous substrate is reduced.

Accordingly, a light catalyst having a high decomposition efficiency for an adsorbed molecule can not be obtained.

Also because of the difficulty in supporting the light catalyst component on the micropore region, it is difficult to support the light catalyst component as highly dispersed.

In view of such conventional problems, the following invention is established to provide a method for producing a light catalyst having a high catalyst reaction efficiency by which a light catalyst component can be supported on a porous substrate as highly dispersed deep into a micropore.

Thus, a method for producing a coated material which is a light catalyst supporting a light catalyst component on the porous substrate comprises a supercritical coating step wherein a precursor fluid is formed by dissolving a light catalyst precursor for forming a light catalyst component in a supercritical fluid and then the precursor fluid is brought into contact with the porous substrate in the presence of a reaction initiator thereby coating the light catalyst component on the porous substrate.

It is preferable to subject a light catalyst to a heat treatment at 300 to 700° C. after performing the coating step.

The most important feature of this invention is that the supercritical coating step consisting of the production of a precursor fluid (dissolution step) and the coating procedure effected by the reaction described above (coating step) is performed.

The advantageous effects of this invention are described below.

In this invention, the precursor fluid to be brought into contact with the porous substrate employs the supercritical fluid as a solvent. Therefore, the precursor fluid can be penetrated into the micropore of the porous substrate readily and rapidly.

Thus, the light catalyst component can be supported as highly dispersed even on the surface of a pore wall of the porous substrate deep into the micropore.

Accordingly, the light catalyst has a high catalyst reaction efficiency and a high adhesiveness between the light catalyst component and the porous substrate.

Also, since the light catalyst component is embedded deep into the micropore of the porous support as shown in FIG. 20C referred to later, the interaction between the light catalyst component and the porous substrate is potent, thereby limiting the motility of the light catalyst component. Accordingly, there is a less possibility of a sintering resulted from the particle growth due to the binding of the catalyst component to one another.

Therefore, the light catalyst obtained by this invention has an excellent durability.

The dissolution step is detailed below.

First, a light catalyst precursor for forming a light step is brought into contact with the porous substrate to form the light catalyst component or its precursor.

As a result, a light catalyst in which the porous substrate is coated with the light catalyst component or its precursor is obtained.

In this step, the light catalyst precursor may be converted into the light catalyst component by conducting a heat treatment if necessary.

The porous substrate means a substrate having a large number of micropores on its surface.

Examples of such a porous substrate are a porous carbon such as an activated carbon, a porous metal such as a porous aluminum and a porous tantalum, a porous silica, a porous alumina, a porous aluminasilica, and a porous article consisting of an oxide of a metal and/or a semi-metal such as a porous ruthenium oxide, a porous vanadium oxide, a porous indium oxide, a porous tin oxide, a porous nickel oxide, and a polymeric foam such as polyolefin in and polyurethane foams and the like.

Among these substances, an activated carbon and a porous silica are especially preferred since they have a high specific surface area and can be bonded by a large amount of a light catalyst component as dispersed therein.

The light catalyst component to be supported on the porous substrate may preferably be a metal oxide such as $TiO_2$, $ZnO$, $WO_3$, $SnO_2$, $Fe_2O_3$, $SiO_2$, $NiO$, $Cu_2O$, $SrTiO_3$, $NbO_2$, and a metal sulfide catalyst component such as a metal salt is dissolved in a supercritical fluid to form a precursor solution.

The supercritical fluid in the present invention may, for example, be a hydrocarbon such as methane, ethane, propane, butane, ethylene, propylene and the like, an alcohol such as methanol, ethanol, propanol, iso-propanol, butanol, iso-butanol, sec-butanol, tert-butanol and the like, a ketone such as acetone, methylethylketone and the like, and carbon dioxide, water, ammonia, chlorine, chloroform, Freon and the like.

As an entrainer for adjusting the solubility of the light catalyst precursor in the supercritical fluid, an alcohol such as methanol, ethanol, propanol and the like, a ketone such as acetone, ethylmethylketone and the like, or an aromatic hydrocarbon such as benzene toluene, xylene and the like may also be employed.

Examples of the light catalyst precursor are titanium isopropoxide {Ti(iso-PrO)$_4$}, titanium n-butoxide {Ti(n-BuO)$_4$}, tetra-n-propylorthotitanate{Ti(n-C$_3$H$_7$O)$_4$}, tetraethylorthotitanate {Ti(C$_2$H$_5$O)$_4$}, triethoxy iron {Fe(OC$_2$H$_5$)$_3$}, pentaisopropoxy niobium {Nb(O—i—C$_3$H$_7$)$_5$}, tetraethoxysilane {Si(OC$_2$H$_5$)$_4$}, diethoxy zinc {Zn(OC$_2$H$_5$)$_2$}, tungsten hexacarbonyl {W(CO)$_6$}, tetraphenyl tin {Sn(C$_6$H$_5$)$_4$}, copper n-octanate {Cu(C$_7$H$_{15}$COO)$_2$}, diisopropoxy copper {Cu(O—i—C$_3$H$_7$)$_2$} and the like.

The coating step is detailed below.

Thus, the precursor fluid obtained in the dissolution such as CdS and ZnS and the like.

Any of these substances has a high light catalytic activity and provides an advantageously high adhesiveness to the porous substrate.

A metal oxide or a metal sulfide as the light catalyst may optionally be combined with a promoter. Such a promoter may be a noble metal such as Pt, Au and Pd, and a base metal such as Ni, Fe and Nb.

Any of these substances may give an advantage that the charge separation between an electron and a hole generated by photoexcitation is efficient and that multiple adsorption sites are provided on the light catalyst surface for composite contaminants, thereby increasing the light catalytic activity.

The light catalyst formed on the porous substrate as described above can be isolated as a reaction product which reflects the microporous structure of the porous substrate by separating a part or all of the porous substrate as necessity requires by means of heating or addition of a solvent.

As described above, according to this invention, a method for producing a light catalyst having a high catalyst reaction efficiency by which a light catalyst component can be supported on the surface of a pore wall of a porous substrate as highly dispersed deep into a micropore can be obtained.

The light catalyst obtained according to this invention can adsorb and decompose an odor component or a pollutant and can be used, for such as a seat fabric, a curtain, a wall paper and the like.

Also, it can be applied widely to a reaction utilizing a light energy such as water decomposition, $CO_2$ immobilization and conversion into a useful substance.

A coated material (light catalyst) produced by utilizing the excellent method is provided by the following invention.

Thus, a coated material, wherein the coated material is a light catalyst supporting a light catalyst component on a porous substrate, is obtained by performing:

a supercritical coating step wherein a precursor fluid is formed by dissolving a light catalyst precursor for forming a light catalyst component in a supercritical fluid and then the precursor fluid is brought into contact with the porous substrate in the presence of a reaction initiator thereby coating the light catalyst component on the porous substrate.

Furthermore, a coated material, wherein the coated material is a light catalyst supporting a light catalyst component on the porous substrate, is obtained by performing:

a supercritical coating step wherein a precursor fluid is formed by dissolving a light catalyst precursor for forming a light catalyst component in a supercritical fluid and then the precursor fluid is brought into contact with the porous substrate in the presence of a reaction initiator thereby coating the light catalyst component on the porous substrate, followed by, a heat treatment at 300 to 700° C.

The eighth aspect of the present invention is a dye-sensitized solar cell as a device utilizing a coated material obtained by utilizing the excellent method described above.

As shown in FIG. 30, a dye-sensitized solar cell 49 is known. The dye-sensitized solar cell 49 has a transparent electrode 495 provided on the light-facing side of an oxide semiconductor electrode 492, facing which a counter electrode 493 is also provided together with a spacer 481, with which a gap is formed between the electrodes, in which an electrolyte fluid 494 is filled.

The conventional dye-sensitized solar cell 49 emits an electron in the oxide semiconductor electrode 492 in response to light 499 irradiated to the oxide semiconductor electrode 492 through the transparent electrode 495. Then the electron in the oxide semiconductor electrode 492 is collected into the transparent electrode 495, and isolated therefrom.

The conventional oxide semiconductor electrode 492 is, as shown in FIG. 31, has a porous material obtained by partially sintering an oxide semiconductor particle (particle size of nanometer) 4922 such as $TiO_2$, on the surface of which a dye 4923 such as arutheniumcomplex is provided. An electron emitted in the oxide semiconductor electrode 492 travels therebetween, while being isolated from the adjacent transparent electrode 495. The transparent electrode 495 should be transparent and should have a conductivity as its properties, and an example of such a material employed is $SnO_2$.

However, the conventional solar cell 49 involves the following problems.

Thus in the conventional solar cell 49, the transparent electrode 495 having both of the transparency and the conductivity is essential. A substance employed in the transparent electrode 495, such as $SnO_2$, has a high electric resistance and is extremely expensive.

Such properties such as a high electric resistance of the transparent electrode 495 lead to a problematic reduction in the energy conversion efficiency of the dye-sensitized solar cell 49 causing to a reduction in the resulting current.

In addition, it is very difficult to reduce the cost for the dye-sensitized solar cell 49 due to a high price of the electrode 495.

In view of such conventional problems, the following invention is established to provide a dye-sensitized solar cell with which a large current is obtained, a high energy conversion efficiency is achieved, and the production cost can be reduced.

Thus, a dye-sensitized solar cell comprises an oxide semiconductor electrode, a counter electrode, an electrolyte fluid provided therebetween, and a transparent plate provided on the light-facing side of the oxide semiconductor electrode, wherein said oxide semiconductor electrode is a coated material having a conductive center electrode whose surface is coated with an oxide semiconductor and a dye provided on the surface of said oxide semiconductor to taken an electron from said center electrode, wherein the coated material as the oxide semiconductor is produced by a method comprising a supercritical coating step wherein a reaction precursor is dissolved in a supercritical fluid to form a precursor fluid and then the precursor fluid is brought into contact with a substrate in the presence with a reaction initiator to allow a reaction between the reaction precursor and the reaction initiator, thereby coating a reaction product onto the substrate.

As the center electrode, any of various conductive materials may be employed. For example, a metal and a carbon fiber may be employed.

The center electrode may be in various forms, such as a network matrix, a porous structure and the like. Most preferably, a center electrode is designed as a cotton-like network matrix, which is used as a single layer or as a multilayer. By means of such a form, an oxide semiconductor electrode can be used while maintained its light transmittance.

On the surface of the center electrode, the oxide semiconductor is coated. Such an oxide semiconductor may for example be titanium oxide ($TiO_2$), tin oxide ($SnO_2$), zinc oxide (Zno), niobium oxide ($Nb_2O_5$), indium oxide ($In_2O_3$), zirconium oxide (ZrO), lanthanum oxide ($La_2O_3$), tantalum oxide ($Ta_2O_5$), strontium titanate ($SrTiO_3$), barium titanate ($BaTiO_3$) and the like.

Among these oxide semiconductors, $TiO_2$ is the most preferable substance since it provides a high energy conversion efficiency due to a highly efficient electron injection from a dye and a large short current and a high release voltage of a solar cell.

As a method for coating the oxide semiconductor onto the surface of the center electrode, a method employing the supercritical coating step (supercritical coating method) is employed. The supercritical coating method enables the formation of an extremely uniform layer of the oxide semiconductor within a short time period regardless of the configuration of the center electrode surface.

On the surface of the oxide semiconductor, a dye can be provided. Such a dye may be a metal complex, an organic dye or its derivative, including a ruthenium complex, particularly a ruthenium bipyridine complex, a phthalocyanine, a cyanine, amerocyanine, aporphyrin, achlorophyll, apyrene, amethylene blue, a thionine, a xanthene, a coumarine, a rhodamine and the like.

The dye may be contained in the oxide semiconductor as described below.

For example, a dye such as a ruthenium complex is dissolved in an alcohol such as ethanol or in an organic solvent such as acetonitrile to form a solution, in which an oxide semiconductor is immersed to adsorb the dye. In this step, the solution may be heated to control the dye adsorptivity.

On the light-facing side of the oxide semiconductor electrode, the transparent plate is provided. This transparent plate is not required to be conductive unlike to a conventional transparent electrode. Accordingly, it can be selected from various transparent materials depending on intended light transmittance and mechanical strength.

The advantageous effects of the present invention are described below.

The dye-sensitized solar cell according to this invention has an oxide semiconductor electrode having a three-layered structure consisting of the center electrode, the oxide semiconductor and the dye. It is designed to allow an electron to be isolated directly from the center electrode. Therefore, it enables a higher energy conversion efficiency, a higher current and a lower production cost when compared with a conventional one.

Thus, an electron generated in response to the reception of a light by the oxide semiconductor electrode can be isolated directly from the conductive center electrode. Such a center electrode may be made from the material having a relatively low electric resistance such as a metal or a carbon as described above. Accordingly, when compared with a conventional transparent electrode having a high electric resistance, a higher energy conversion efficiency and a higher current can readily be obtained.

Also because of the structure allowing the electron to be isolated directly from the center electrode, the conductive transparent electrode, which has been essential so far, is no longer required. Accordingly, an expensive transparent electrode can be replaced with a cost-saving transparent plate, leading to a substantially reduced production cost.

As a method for the coating the oxide semiconductor onto the center electrode, the supercritical coating method is employed. This supercritical coating method is performed by bonding a precursor dissolved in a supercritical fluid onto the surface of the center electrode followed by precipitating the precursor to form the oxide semiconductor layer.

The supercritical fluid in this invention may, for example, be a hydrocarbon such as methane, ethane, propane, butane, ethylene, propylene and the like, an alcohol such as methanol, ethanol, propanol, iso-propanol, butanol, iso-butanol, sec-butanol, tert-butanol and the like, a ketone such as acetone, methylethylketone and the like, and carbon dioxide, water, ammonia, chlorine, chloroform, Freon and the like.

As an entrainer for adjusting the solubility of the precursor in the supercritical fluid, an alcohol such as methanol, ethanol, propanol and the like, a ketone such as acetone, ethylmethylketone and the like, or an aromatic hydrocarbon such as benzene toluene, xylene and the like may also be employed.

As the precursor, a substance which can be converted into the oxide semiconductor after the reaction and which is an alkoxide of a metal and/or a semi-metal, an acetylacetate of a metal and/or a semi-metal, an organic salt of a metal and/or a semi-metal, a nitrate of a metal and/or a semi-metal, an oxychloride of a metal and/or a semi-metal, a chloride of a metal and/or a semi-metal may be employed independently or in combination of two or more of these.

Specifically, titanium n-butoxide($Ti[O(CH_2)_3CH_3]_4$), titanium isopropoxide ($Ti[OCH(CH_3)_2]_4$) titanium ethoxide ($Ti(OC_2H_5)_4$) may be employed as a precursor for $TiO_2$.

The ninth aspect of the present invention is an oxide semiconductor electrode for a dye-sensitized solar cell as a device utilizing a coated material obtained by utilizing the excellent method described above.

Conventionally, as shown in FIG. 32, a dye-sensitized solar cell 51 is known. The dye-sensitized solar cell 51 has a transparent electrode 55 and an oxide semiconductor electrode 52 provided in such a manner that a light-facing side 520 is in contact with the transparent electrode 55, facing which a counter electrode 53 is also provided together with a spacer 581, with which a gap is formed between the electrodes, in which an electrolyte fluid 54 is filled.

The conventional dye-sensitized solar cell 51 emits an electron in the oxide semiconductor electrode 52 in response to light 599 irradiated to the oxide semiconductor electrode 52 through the transparent electrode 55. Then the electron in the oxide semiconductor electrode 52 is collected into the transparent electrode 55, and isolated therefrom.

The oxide semiconductor electrode 52 is, as shown in FIG. 33 referred to later, comprises a porous electrode substrate 521 obtained by partially sintering an oxide semiconductor particle such as $TiO_2$, a modified layer 522 provided on the surface of the porous electrode substrate 521, and a dye 523 such as a ruthenium complex further overlaid thereon.

The modified layer 522 is provided for the purpose of increasing the energy conversion efficiency of the solar cell, and constituted of an oxide such as $TiO_2$. The modified layer 522 is formed by applying an aqueous solution of titanium tetrachloride and the like onto the electrode substrate 521 followed by a heat treatment.

However, the conventional oxide semiconductor electrode 52 involves the following problems.

Thus, the conventional oxide semiconductor electrode 52 involves difficulty in forming the modified layer 522 uniformly on the electrode substrate 521. Thus, when an aqueous solution of such as titanium tetrachloride is applied onto the electrode substrate 521, the aqueous solution closes the opening of a micropore of the electrode substrate 521 and does not penetrate into deep inside due to an influence of the dispersibility and the viscosity of the aqueous solution. Accordingly, after the heat treatment, the modified layer 522 has not been formed inside of a micropore of the electrode substrate 521 and no uniformity is obtained. Therefore, the energy conversion efficiency increasing effect of the modified layer 522 is insufficient.

In view of such conventional problems, the following invention is established to provide an oxide semiconductor electrode allowing a modified layer to be formed deep inside of a micropore of an electrode substrate and having a high energy conversion efficiency.

Thus, a method for producing a coated material which is an oxide semiconductor electrode having a modified layer formed on at least a part of the surface of an electrode substrate comprises:

a supercritical coating step wherein a reaction precursor of the modified layer is dissolved in a supercritical fluid to form a precursor fluid and then the precursor fluid is brought into contact with a porous oxide semiconductor in the presence of a reaction initiator to allow a reaction between the reaction precursor and the reaction initiator, thereby coating a reaction product as an oxide onto said oxide semiconductor.

Furthermore, a method for producing a coated material which is an oxide semiconductor electrode comprising an electrode substrate, a modified layer and a dye comprises:

a supercritical coating step wherein a reaction precursor of the modified layer is dissolved in a supercritical fluid to form a precursor fluid and then the precursor fluid is brought into contact with the electrode substrate consisting of a porous oxide semiconductor in the presence of a reaction initiator to allow a reaction between the reaction precursor and the reaction initiator, thereby coating a reaction product as an oxide onto said electrode substrate to form the modified layer on at least a part of the surface of the electrode substrate, and, a dye placing step wherein a dye is placed on the top of said modified layer.

The most important feature of this invention is that the formation of the modified layer is effected by performing the supercritical coating step consisting of the production of the precursor fluid (dissolution step) and the coating procedure effected by the reaction described above (coating step).

The supercritical fluid in this invention may, for example, be a hydrocarbon such as methane, ethane, propane, butane, ethylene, propylene and the like, an alcohol such as methanol, ethanol, propanol, iso-propanol, butanol, iso-butanol, sec-butanol, tert-butanol and the like, a ketone such as acetone, methylethylketone and the like, and carbon dioxide, water, ammonia, chlorine, chloroform, Freon and the like.

As an entrainer for adjusting the solubility of the precursor in the supercritical fluid, an alcohol such as methanol, ethanol, propanol and the like, a ketone such as acetone, ethylmethylketone and the like, or an aromatic hydrocarbon such as benzene toluene, xylene and the like may also be employed.

As the precursor, a substance which is an alkoxide of a metal and/or a semi-metal, an acetylacetate of a metal and/or a semi-metal, an organic salt of a metal and/or a semi-metal, a nitrate of a metal and/or a semi-metal, an oxychloride of a metal and/or a semi-metal, a chloride of a metal and/or a semi-metal may be employed independently or in combination of two or more of these.

Specifically, titanium n-butoxide $(Ti[O(CH_2)_3CH_3]_4)$, titanium isopropoxide $(Ti[OCH(CH_3)_2]_4)$ titanium ethoxide $(Ti(OC_2H_5)_4)$ may be employed as a precursor for $TiO_2$.

As the electrode substrate, a porous material obtained by a partial sintering of a microparticle of an oxide semiconductor may be employed.

Specifically, titanium oxide $(TiO_2)$, tin oxide $(SnO_2)$, zinc oxide $(ZnO)$, niobium oxide $(Nb_2O_5)$, indium oxide $(In_2O_3)$, zirconium oxide $(ZrO_2)$, lanthanum oxide $(La_2O_3)$, tantalum oxide $(Ta_2O_5)$, strontium titanate $(SrTiO_3)$, barium titanate $(BaTiO_3)$ may be employed.

The modified layer is provided as a second oxide semiconductor on the surface of an electrode substrate consisting of an oxide semiconductor electrode (a first oxide semiconductor) for the purpose of improving the performance of the oxide semiconductor electrode.

For such a modified layer, titanium oxide $(TiO_2)$, tin oxide $(SnO_2)$, zinc oxide $(ZnO)$, niobium oxide $(Nb_2O_5)$, indium oxide $(In_2O_3)$, zirconium oxide $(ZrO_2)$, lanthanum oxide $(La_2O_3)$, tantalum oxide $(Ta_2O_5)$, strontium titanate $(SrTiO_3)$, barium titanate $(BaTiO_3)$ may be employed and these can be combined similarly to or differently from that for the electrode substrate may be employed.

Since the modified layer has a high specific surface area, it can increase the amount of a dye to be bound when such a dye is placed as described below. Further, the modified layer containing less impurities, when compared with the electrode substrate, allows to promote the motility of an electron from the dye to the electrode substrate or within the electrode. An increased area of the contact between the particles in the electrode may also serves to promote the motility of the electron.

The oxide semiconductor electrode for the solar cell contains a dye placed on the surface of a modified layer.

Such a dye may be a metal complex, an organic dye or its derivative, including a ruthenium complex, particularly a ruthenium bipyridine complex, a phthalocyanine, a cyanine, a merocyanine, a porphyrin, a chlorophyll, a pyrene, a methylene blue, a thionine, a xanthene, a coumarine, a rhodamine and the like.

The precipitation of the precursor as an oxide may be achieved by, for example, bringing a supercritical fluid into contact with the electrode substrate, followed by removing the supercritical fluid and drying, followed by a heat treatment if necessary.

The dye may be contained in the oxide semiconductor as described below.

For example, a dye such as a ruthenium complex is dissolved in an alcohol such as ethanol or in an organic solvent such as acetonitrile to form a solution, in which the oxide semiconductor is immersed to adsorb the dye. In this step, the solution may be heated to control the dye adsorptivity.

The advantageous effects of the present invention are described below.

In this invention, a supercritical fluid containing the precursor dissolved therein is brought into contact with the electrodesubstrate. Inthisstep,thesupercritical fluid can penetrate sufficiently deep into a micropore of the porous electrode substrate since it has extremely excellent dispersibility and viscosity as described above. In addition, the supercritical fluid can penetrate into the inside of the micropore as containing a large amount of the precursor dissolved therein since it also has an excellent dissolution capability.

Accordingly, when the precursor in the supercritical fluid is precipitated as an oxide, the oxide is precipitated uniformly and entirely as far as the inside of a micropore. Thus, an extremely uniform modified layer can be formed on the surface of the electrode substrate.

In addition, in the case of an oxide semiconductor electrode for a solar cell, by further providing a dye on a uniform modified layer, an extremely excellent oxide semiconductor electrode for the solar cell can be obtained.

Thus, the presence of the uniform modified layer serves to increase the amount of the dye to be adsorbed and to reduce the electric resistance of the entire electrode. Accordingly, an increase in a current value and an increase in a voltage due to a reduction in a leak current can advantageously be achieved, and the high rate property and an energy conversion efficiency can be improved substantially.

In addition, by applying an oxide having a high conductivity or one capable of increasing the release voltage to the modified layer, the properties of the solar cell can be improved.

Further, the oxide semiconductor can be utilized as, in addition to the oxide semiconductor electrode for the solar cell, an electrode for an ordinary cell, an electrochromic element or a water photolysis.

Furthermore, a coated material (oxide semiconductor electrode) produced by utilizing the excellent method is provided by the following invention.

Thus, a coated material which is an oxide semiconductor electrode having a modified layer formed on at least a part of the surface of an electrode substrate is obtained by performing:

a supercritical coating step wherein a reaction precursor of the modified layer is dissolved in a supercritical fluid to form a precursor fluid and then the precursor fluid is brought into contact with a porous oxide semiconductor in the presence of a reaction initiator to allow a reaction between the reaction precursor and the reaction initiator, thereby coating a reaction product as an oxide onto said oxide semiconductor.

Furthermore, a coated material which is an oxide semiconductor electrode comprising an electrode substrate, a modified layer and a dye is obtained by performing:

a supercritical coating step wherein a reaction precursor of the modified layer is dissolved in a supercritical fluid to form a precursor fluid and then the precursor fluid is brought into contact with the electrode substrate consisting of a porous oxide semiconductor in the presence of a reaction initiator to allow a reaction between the reaction precursor and the reaction initiator, thereby coating a reaction product as an oxide onto said electrode substrate to form the modified layer on at least a part of the surface of the electrode substrate, followed by, a dye placing step wherein a dye is placed on the top of said modified layer.

The tenth aspect of the present invention is an oxide semiconductor electrode as a coated material obtained by utilizing the excellent method described above which is different from one previously described.

As shown in FIG. 40, a dye-sensitized solar cell 81 is known. The dye-sensitized solar cell 81 has a transparent electrode 85 provided on the light-facing side 820 of an oxide semiconductor electrode 82, facing which a counter electrode 83 is also provided together with a spacer 881, with which a gap is formed between the electrodes, in which an electrolyte fluid 84 is filled.

The conventional dye-sensitized solar cell 81 emits an electron in the oxide semiconductor electrode 82 in response to light 899 irradiated to the oxide semiconductor electrode 82 through the transparent electrode 85. Then the electron in the oxide semiconductor electrode 82 is collected into the transparent electrode 85, and isolated therefrom.

The conventional oxide semiconductor electrode 82 is, as shown in FIG. 44, has a porous electrode substrate 8921 obtained by partially sintering an oxide semiconductor particle (particle size of nanometer) such as $TiO_2$, and a dye 8923 such as a ruthenium complex provided on the surface of the porous electrode substrate 8921.

However, the conventional oxide semiconductor electrode 82 involves the following problems.

Thus, the electrode substrate 8921 in the conventional oxide semiconductor electrode 82 is a porous material which is constituted by partially sintering a microparticle of the oxide semiconductor as described above. Accordingly, a large number of isolated points are present in the region which is and is not in contact with the micropore. In such isolated points, the motility of an electron is limited, resulting in a reduced photo-current.

On the other hand, when a large oxide semiconductor is employed instead of the microparticle, the specific surface area becomes low, resulting in a reduced amount of the dye placed on the surface.

Therefore, the conventional oxide semiconductor electrode involves difficulty in providing a solar cell having a high energy conversion efficiency.

In view of such conventional problems, the following invention is established to provide a method for producing an oxide semiconductor electrode for a solar cell which reduces the limitation of the motility of an electron without reducing the specific surface area of the oxide semiconductor and has a high energy conversion efficiency.

Thus, a method for producing a coated material, wherein the coated material is an oxide semiconductor electrode having an oxide semiconductor layer, comprises:

a supercritical coating step wherein a reaction precursor of the oxide semiconductor is dissolved in a supercritical fluid to form a precursor fluid and then the precursor fluid is brought into contact with a substrate having a high specific surface area in the presence of a reaction initiator to allow a reaction between the reaction precursor and the reaction initiator, thereby coating an oxide semiconductor onto said substrate.

Furthermore, a method for producing a coated material, wherein the coated material is an oxide semiconductor electrode having an oxide semiconductor layer and a dye, comprises:

a supercritical coating step wherein a reaction precursor of the oxide semiconductor is dissolved in a supercritical fluid to form a precursor fluid and then the precursor fluid is brought into contact with a substrate having a high specific surface area in the presence of a reaction initiator to allow a reaction between the reaction precursor and the reaction initiator, thereby coating an oxide semiconductor onto said substrate, and, a dye placing step wherein the dye is placed on the top of said oxide semiconductor layer.

The most important feature of this invention is that the formation of a oxide semiconductor layer is effected by performing the supercritical coating step consisting of the production of the precursor fluid (dissolution step) and the coating procedure effected by the reaction described above (coating step) and then the substrate is removed.

As the substrate having a high specific surface area, a material capable of being removed in a liquid or gaseous phase by means of oxidation or dissolution is employed. For example, various porous materials such as an activated carbon, a polymeric permeable membrane, a porous oxide, a porous metal and the like may be employed. Among these materials, an activated carbon is especially preferred since it can readily be removed in a subsequent step.

The specific surface area of the substrate is preferably 5 $m^2/g$ or more. A specific surface area of the substrate less than 5 $m^2/g$ may cause too low a specific surface area of a resultant oxide semiconductor layer, which may lead to difficulty in placing a sufficient amount of a dye when applied to a solar cell.

The formation of an oxide semiconductor layer on the substrate is accomplished by the supercritical coating step.

This method which is by means of the supercritical coating step (hereinafter referred to as a supercritical method) is more preferable since it can form a uniform oxide semiconductor layer within a short time period. This supercritical coating method is performed by, for example, bringing a supercritical fluid containing a precursor dissolved therein into contact with the surface of a substrate, followed by allowing the precursor to be precipitated to form the oxide semiconductor layer.

For such an oxide semiconductor, titanium oxide ($TiO_2$), tin oxide ($SnO_2$), zinc oxide (ZnO), niobiumoxide ($Nb_2O_5$), indium oxide ($In_2O_3$), zirconium oxide ($ZrO_2$), lanthanum oxide ($La_2O_3$), tantalum oxide ($Ta_2O_5$), strontium titanate ($SrTiO_3$), barium titanate ($BaTiO_3$) may be employed.

The supercritical fluid in this invention may, for example, be a hydrocarbon such as methane, ethane, propane, butane, ethylene, propylene and the like, an alcohol such as methanol, ethanol, propanol, iso-propanol, butanol, iso-butanol, sec-butanol, tert-butanol and the like, a ketone such as acetone, methylethylketone and the like, and carbon dioxide, water, ammonia, chlorine, chloroform, Freon and the like.

As an entrainer for adjusting the solubility of the precursor in the supercritical fluid, an alcohol such as methanol, ethanol, propanol and the like, a ketone such as acetone, ethylmethylketone and the like, or an aromatic hydrocarbon such as benzene toluene, xylene and the like may also be employed.

As the precursor, a substance which can be converted into an oxide semiconductor after the reaction and which is an alkoxide of a metal and/or a semi-metal, an acetylacetate of a metal and/or a semi-metal, an organic salt of a metal and/or a semi-metal, a nitrate of a metal and/or a semi-metal, an oxychloride of a metal and/or a semi-metal, a chloride of a metal and/or a semi-metal may be employed independently or in combination of two or more of these.

Specifically, titanium n-butoxide($Ti[O(CH_2)_3CH_3]_4$), titanium isopropoxide ($Ti[OCH(CH_3)_2]_4$), titanium ethoxide ($Ti(OC_2H_5)_4$) may be employed as a precursor for $TiO_2$.

In the case of an oxide semiconductor electrode for a solar cell, a dye is placed on the surface of a modified layer.

Such a dye may be a metal complex, an organic dye or its derivative, including a ruthenium complex, particularly a ruthenium bipyridine complex, a phthalocyanine, a cyanine, a merocyanine, a porphyrin, a chlorophyll, a pyrene, a methylene blue, a thionine, a xanthene, a coumarine, a rhodamine and the like.

The dye may be placed onto the modified layer as described below.

For example, a dye such as a ruthenium complex is dissolved in an alcohol such as ethanol or in an organic solvent such as acetonitrile to form a solution, in which the oxide semiconductor is immersed to adsorb the dye. In this step, the solution may be heated to control the dye adsorptivity.

When an oxide semiconductor electrode for a solar cell is actually produced, a large number of the oxide semiconductor layers are produced and then used to form a film on a transparent electrode, on which a dye is further mounted. In this manner, the production step can be streamlined.

The advantageous effects of the present invention are described below.

In this invention, an oxide semiconductor layer is formed on the substrate having the high specific surface area described above by means of precipitation or coating. Thus, the obtained oxide semiconductor layer has a surface configuration transferred directly from that of the substrate and thus has a high specific surface area. Therefore, especially in the case of a solar cell is intended, a dye of a sufficient amount can be placed on the surf ace of the oxide semiconductor layer.

The oxide semiconductor layer is formed by allowing the oxide semiconductor to be precipitated or coated on the substrate. This oxide semiconductor layer enables a substantial increase in the size of the oxide semiconductor particle while keeping its high specific surface area when compared with a conventional oxide semiconductor microparticle. Therefore, the oxide semiconductor layer having almost no isolated region which determines the motility of an electron such as a crystal interface unlike to a conventional art employing a partial sintering of a microparticle. Accordingly, it allows the electron to move more easily than in a conventional art.

The oxide semiconductor electrode provides a higher energy conversion efficiency than in a conventional art because of the amount of the dye thus preserved as well as a less limited motility of the electron.

The oxide semiconductor can be utilized as, in addition to the oxide semiconductor electrode for the solar cell, an electrode for an ordinary cell, an electrochromic element or a water photolysis.

An oxide semiconductor electrode produced by the excellent method for production described above is provided by the following invention.

Thus, a coated material which is an oxide semiconductor electrode having an oxide semiconductor layer is obtained by performing:

a supercritical coating step wherein a reaction precursor of the oxide semiconductor electrode is dissolved in a supercritical fluid to form a precursor fluid and then the precursor fluid is brought into contact with a substrate having a high specific surface area in the presence of a reaction initiator to allow a reaction between the reaction precursor and the reaction initiator, thereby coating an oxide semiconductor onto said substrate.

Furthermore, a coated material which is an oxide semiconductor electrode having an oxide semiconductor layer and a dye is obtained by performing:

a supercritical coating step wherein a reaction precursor of the oxide semiconductor is dissolved in a supercritical fluid to form a precursor fluid and then the precursor fluid is brought into contact with a substrate having a high specific surface area in the presence of a reaction initiator to allow a reaction between the reaction precursor and the reaction initiator, thereby coating an oxide semiconductor onto said substrate, followed by, placing the dye on the top of said oxide semiconductor layer.

The eleventh aspect of the present invention is an adsorbent used as an adsorbent for a heat pump as a coated material obtained by utilizing the excellent coating method described above.

An adsorption heat pump which promotes the evaporation of a liquid from a liquid tank by means of the adsorption of a vapor onto a porous solid and which recovers a cooling effect corresponding to the vaporization latent heat has been subjected to the development. Generally, water is employed as a liquid/vapor component.

For such an adsorption heat pump, a highly hygroscopic adsorbent is essential. As the conventional adsorbent, an activated carbon with or without a silica or titania supported thereon is known.

To produce this adsorbent, silicon tetrachloride or titanium tetrachloride was adsorbed onto an activated carbon sample which had been subjected to deaeration under vacuum and then the chloride adsorbed on the activated carbon was hydrolyzed or condensed with dehydration, as described in Japanese Laid-Open Patent Publication No. 04-346814.

However, the adsorbent produced by a conventional method does not exert a sufficient hygroscopic property. Especially when applying to the adsorption heat pump, a high hygroscopicity at a wide region of the relative humidity is required. Accordingly, the adsorbent produced by the conventional method does not satisfy such requirement and can not be used as the adsorbent for the heat pump. In this context, the relative humidity is a ratio ($P/P_0$) of an actual water vapor pressure (P) to a saturate vapor pressure ($P_0$) assuming that a gaseous phase consists entirely of water vapor.

In view of such conventional problems, the following invention is established to provide a method for producing an adsorbent for a heat pump which exhibits a high hygroscopicity at a wide region of the relative humidity.

Thus, a method for producing a coated material wherein the coated material is an adsorbent, comprises:

a supercritical coating step wherein a reaction precursor is dissolved in a supercritical fluid to form a precursor fluid and then the precursor fluid is brought into contact with a adsorbent substrate in the presence with a reaction initiator to allow a reaction between the reaction precursor and the reaction initiator, thereby coating a hydrophilic substance as a reaction product onto said adsorbent substrate.

The most important feature of this invention is that formation of the hydrophilic substance is effected by performing the supercritical coating step consisting of the production of the precursor fluid (dissolution step) and the coating procedure effected by the reaction described above (coating step).

The supercritical fluid in the present invention may, for example, be a hydrocarbon such as methane, ethane, propane, butane, ethylene, propylene and the like, an alcohol such as methanol, ethanol, propanol, iso-propanol, butanol, iso-butanol, sec-butanol, tert-butanol and the like, a ketone such as acetone, methylethylketone and the like, and carbon dioxide, water, ammonia, chlorine, chloroform, Freon and the like.

As the hydrophilic substance may be selected from the group consisting of silica, titania, alumina, a hydrophilic polymer, a hydrophilic oligomer and the like, and at least one of these substances serves as a coating.

As an entrainer for adjusting the solubility of the precursor in the supercritical fluid, an alcohol such as methanol, ethanol, propanol and the like, a ketone such as acetone, ethylmethylketone and the like, or an aromatic hydrocarbon such as benzene toluene, xylene and the like may also be employed.

As the precursor, an alkoxide of a metal and/or a semi-metal, an acetylacetate of a metal and/or a semi-metal, an organic salt of a metal and/or a semi-metal, a nitrate of a metal and/or a semi-metal, an oxychloride of a metal and/or a semi-metal, a chloride of a metal and/or a semi-metal may be employed independently or in combination of two or more of these.

specifically, titanium n-butoxide($Ti[O(CH_2)_3CH_3]_4$), titanium isopropoxide ($Ti[OCH(CH_3)_2]_4$), titanium ethoxide ($Ti(OC_2H_5)_4$) may be employed as a precursor for titania ($TiO_2$).

As the precursor for silica ($SiO_2$), silicon tetraethoxide ($Si(OC_2H_5)_4$), silicon tetramethoxide ($Si(OCH_3)_4$), silicon tetraisopropoxide ($Si[OCH(CH_3)_2]_4$) may be employed.

As the precursor for alumina ($Al_2O_3$), aluminum triisopropoxide ($Al[OCH(CH_3)_2]_3$), aluminum acetylacetonate ($Al(CH_3COCHCOCH_3)_3$) may be employed.

Examples of the hydrophilic polymer are polyvinyl alcohol and polyacrylamide. Their precursors may be vinyl acetate and acrylamide and the like.

Examples of the hydrophilic oligomer are short polymers of vinylalcohol and acrylamide. Their precursors may be vinyl acetate and acrylamide and the like.

As the absorbent substrate, an activated carbon may be mentioned, and a porous carbon material whose micropore size is 4 nm or less in diameter is preferred.

The advantageous effects of the present invention are described below.

In this invention, a supercritical fluid containing the precursor dissolved therein is brought into contact with the adsorbent substrate. In this step, the supercritical fluid can penetrate sufficiently deep into inside of a micropore of an adsorbent substrate since it has extremely excellent dispersibility and viscosity as described above. In addition, the supercritical fluid can penetrate into the inside of the micropore as containing a large amount of the precursor dissolved therein since it also has an excellent dissolution capability.

Accordingly, when the precursor in the supercritical fluid is precipitated as an reaction product, the oxide is precipitated uniformly and entirely as far as the inside of the micropore. Thus, an extremely uniform hydrophilic substance layer can be formed on the surface of an adsorbent substrate.

The adsorbent thus obtained exhibits a high hygroscopicity at a wide region of the relative humidity. Therefore, the inventive adsorbent can exhibit a satisfactory performance of an adsorbent for, for example, an adsorption heat pump.

The coated material (adsorbent) produced by utilizing the excellent method described above is provided by the following invention.

Thus, a coated material wherein the coated material is an adsorbent is obtained by performing:

a supercritical coating step wherein a reaction precursor is dissolved in a supercritical fluid to form a precursor fluid and then the precursor fluid is brought into contact with an adsorbent substrate in the presence with a reaction initiator to allow a reaction between the reaction precursor and the reaction initiator, thereby coating a hydrophilic substance as a reaction product onto said adsorbent substrate.

In this invention, a microstructure can be transferred as follows.

Thus, a method for transferring a microstructure comprises:

a dissolution step wherein a reaction precursor is dissolved in a supercritical fluid to form a precursor fluid, and, a coating step wherein the precursor fluid is brought into contact with a structured body containing a reaction initiator to allow a reaction between the reaction precursor and the reaction initiator, thereby coating a reaction product onto the structured body.

In this method, a method for transferring a microstructure, by which a coated material formed by coating the surface of a structured body efficiently with a reaction product can be obtained, and also by which the reaction product transferring the microstructure of the structured body can be obtained after removing a part or all of the structured body from the coated material, is provided.

Also in the present invention, a configuration or a shape of a substrate can be reproduced. Especially, a microstructure of the substrate can be reproduced.

Thus, a method for reproducing a microstructure is provided which comprises:

a dissolution step wherein a reaction precursor is dissolved in a supercritical fluid to form a precursor fluid, and, a coating step wherein the precursor fluid is brought into contact with a structured body containing a reaction initiator to allow a reaction between the reaction precursor and the reaction initiator, thereby coating a reaction product onto the structured body along the surface configuration of the structured body at an uniform coating thickness.

In this method, a method for reproducing a microstructure, by which a coated material formed by coating the surface of a structured body efficiently with a reaction product can be obtained, and also by which a reaction product reproducing the microstructure of the structured body can be obtained after removing the structured body from the coated material, is provided.

PREFERRED EMBODIMENT OF THE INVENTION

Embodiment 1

This embodiment relates to a coated material and a method for coating.

EXAMPLE E1

Tetraethoxysilane [$Si(C_2H_5O)_4$] as a reaction precursor was dissolved in carbon dioxide at the temperature of 120° C. under the pressure of 200 atms as a supercritical fluid to form a precursor fluid.

On the other hand, an activated carbon (specific surface area: 810 $m^2$/g) containing water (reaction initiator) was prepared as a substrate, and immersed in the precursor fluid.

By this procedure, the precursor fluid penetrated into the micropore of the activated carbon, in which the water and tetraethoxysilane was reacted with each other, thereby coating the silica onto the surface of the micropore (inner wall surface) of the activated carbon. This coating step was performed for 3 hours. Subsequently, the activated carbon was taken out from the precursor fluid, dried, and heated in the air at 650° C. to remove the activated carbon from the silica-coated activated carbon.

Figure 1:
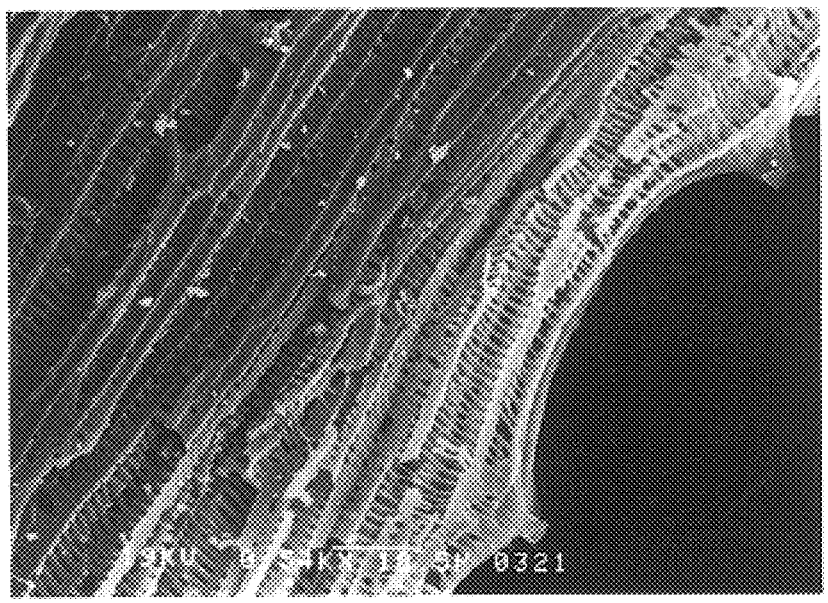
FIG. 1 is a scanning electron microscope photograph as a substitute of a drawing of an activated carbon as a substrate in Embodiment 1 (×540).
Figure 2:
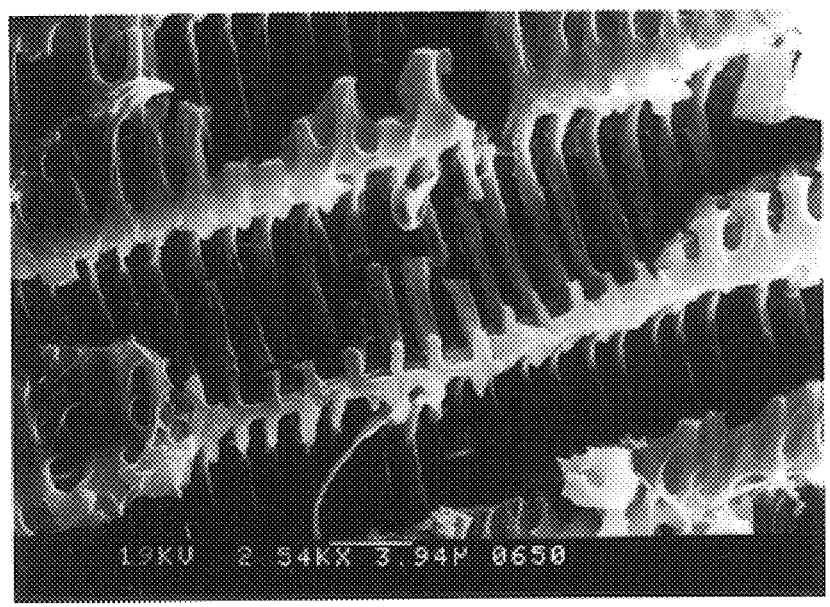
FIG. 2 is a scanning electron microscope photograph as a substitute of a drawing of a silica-coated activated carbon in Embodiment 1 (×2540).
Figure 3:
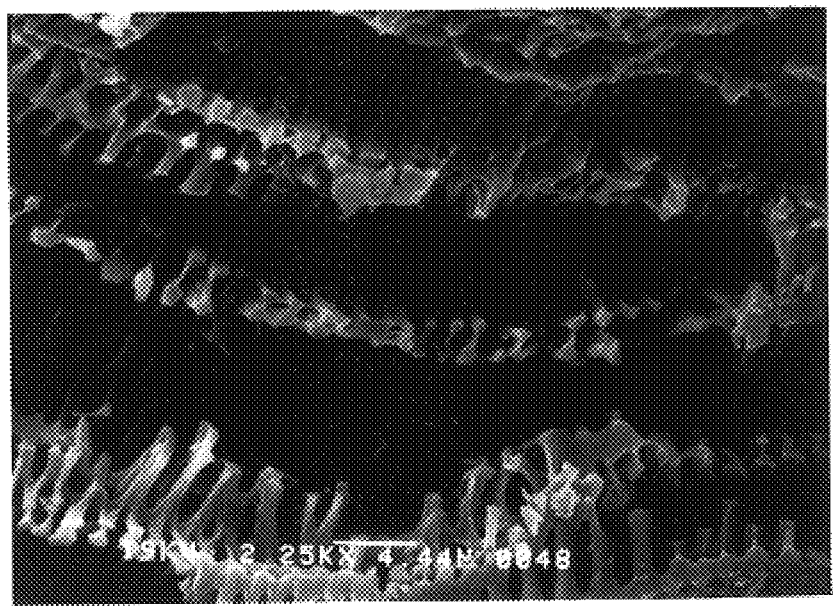
FIG. 3 is a scanning electron microscope photograph as a substitute of a drawing of a silica as a reaction product which reflects the microstructure of an activated carbon as fine as nanometers in Embodiment 1 (×2250).

The scanning electron microscope photographs of the activated carbon, the silica-coated activated carbon and the reaction product (silica itself) are shown in FIGS. 1, 2 and 3, respectively.

The specific surface areas determined by nitrogen adsorption are shown in Table 1.

FIG. 1 shows a structure originated from a plant tissue of a ground palm waste as a starting material for an activated carbon.

FIG. 2 indicates that the microstructure is maintained after coating the silica.

FIG. 3 indicates that the silica transferring the microstructure of the activated carbon is obtained.

EXAMPLE E2

A reaction product (silica itself) was produced similarly as in Example E1 except for mixing 10% by weight of acetone as an additive (entrainer) to a supercritical fluid carbon dioxide.

Figure 4:
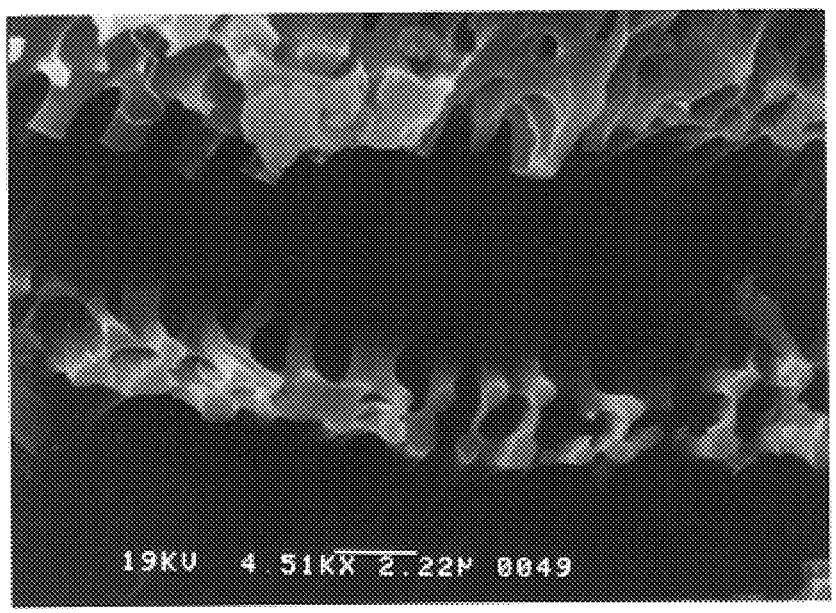
FIG. 4 is a scanning electron microscope photograph as a substitute of a drawing of a silica as a reaction product which reflects the microstructure of an activated carbon as fine as nanometers in Embodiment 1 (×4510).

The scanning electron microscope photograph of the reaction product (silica itself) is shown in FIG. 4.

As evident from FIG. 4, the silica obtained transferred the structure of the activated carbon accurately.

EXAMPLE E3

A reaction product (silica itself) was produced similarly as in Example E1 except for mixing 10% by weight of ethanol as an additive (entrainer) to a supercritical fluid carbon dioxide.

Figure 5:
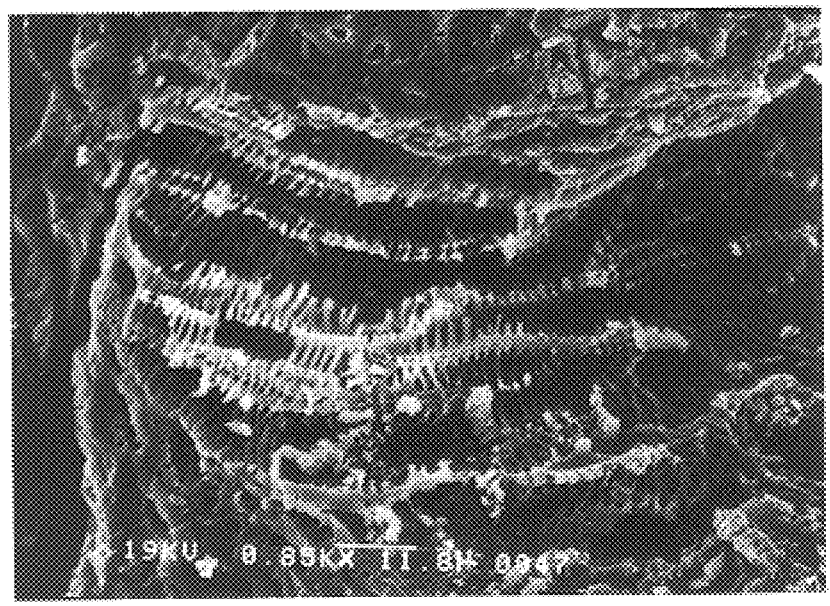
FIG. 5 is a scanning electron microscope photograph as a substitute of a drawing of a silica as a reaction product which reflects the microstructure of an activated carbon as fine as nanometers in Embodiment 1 (×850).

The scanning electron microscope photograph of the reaction product (silica itself) is shown in FIG. 5.

As evident from FIG. 5, the silica obtained transferred the structure of the activated carbon accurately.

EXAMPLE E4

Tetrabutoxytitanium [Ti(C$_4$H$_9$O)$_4$] as a reaction precursor was dissolved in supercritical carbon dioxide at the temperature of 160° C. under the pressure of 250 atms and allowed to penetrate into a substrate activated carbon (specific surface area: 800 m$^2$/g) containing water.

By a reaction between the water in the activated carbon with tetrabutoxytitanium, the titania (TiO$_2$) was coated onto the surface of the micropore (inner wall surface) of the activated carbon.

This coating step was performed for 3 hours. Subsequently, the activated carbon was removed from the titania-coated activated carbon similarly as in Example E1 by heating in the air at 650° C.

Figure 6:
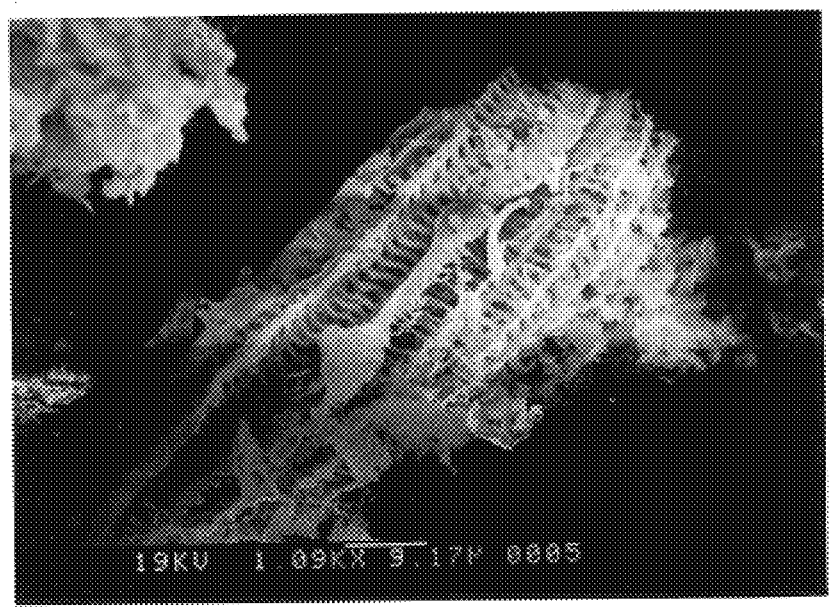
FIG. 6 is a scanning electron microscope photograph as a substitute of a drawing of a titania as a reaction product which reflects the microstructure of an activated carbon as fine as nanometers in Embodiment 1 (×1090).

The scanning electron microscope photograph of the reaction product (titania itself) is shown in FIG. 6.

As evident from FIG. 6, the obtained titania transferred the structure of the activated carbon accurately.

EXAMPLE E5

A reaction product(silica itself) was produced similarly as in Example E1 except for using an activated carbon (specific surface area: 1740 m$^2$/g) as a substrate. The specific surface area determined by nitrogen adsorption is shown in Table 1.

EXAMPLE E6

A reaction product (silica-coated activated carbon) was produced similarly as in Example E1 except for using an activated carbon (specific surface area: 3120 m$^2$/g) as a substrate. The specific surface area determined by nitrogen adsorption is shown in Table 1.

EXAMPLE E7

A reaction product (titania-coated activated carbon) was produced similarly as in Example E4 except for using an activated carbon (specific surface area: 3120 m$^2$/g) as a substrate. The specific surface area determined by nitrogen adsorption is shown in Table 1.

COMPARATIVE C1

Figure 7:
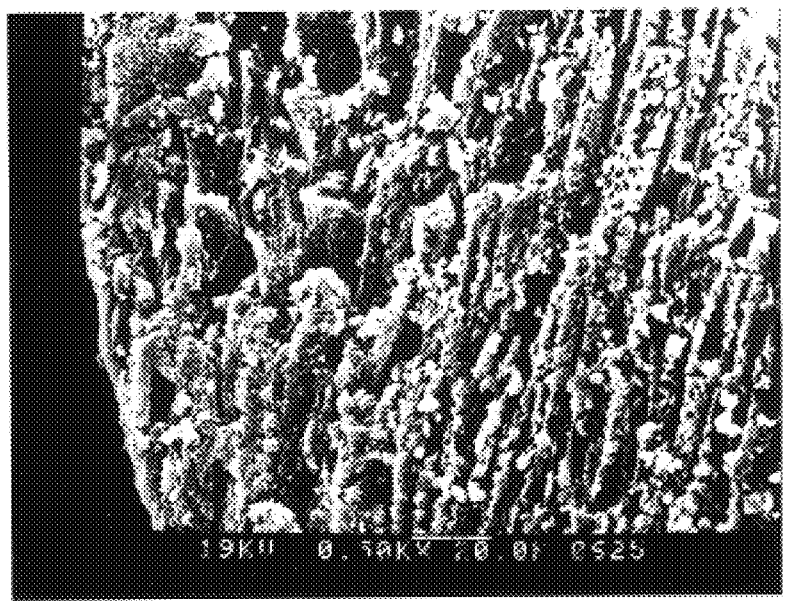
FIG. 7 is a scanning electron microscope photograph as a substitute of a drawing of a silica-coated activated carbon in Comparative C1 in Embodiment 1 (×500).
Figure 8:
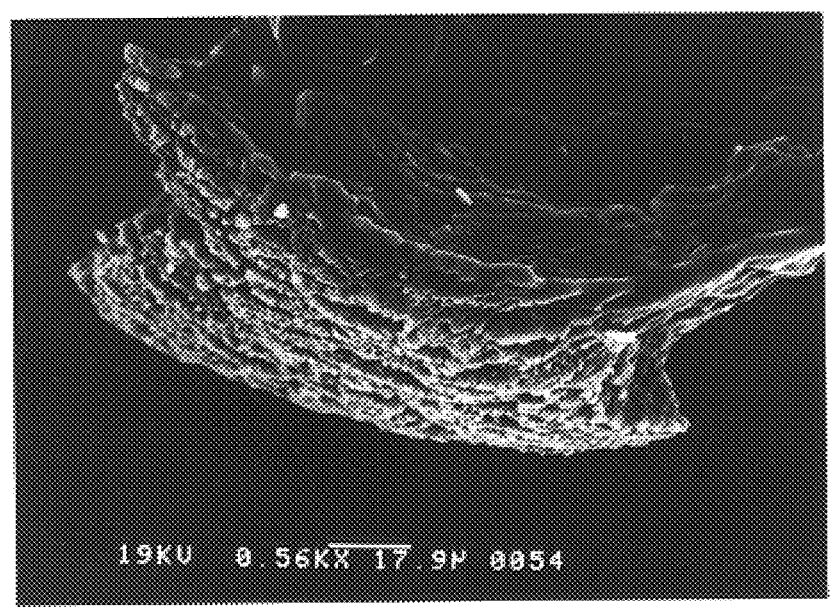
FIG. 8 is a scanning electron microscope photograph as a substitute of a drawing of a silica as a reaction product in Comparative C1 in Embodiment 1 (×560).

An activated carbon containing water (specific surface area: 800 m$^2$/g) was immersed in tetraethoxysilane [Si(C$_2$H$_5$O)$_4$] at 120° C. for 3 hours. The scanning electron microscope photographs of the silica-coated activated carbon and the reaction product (silica itself) thus obtained are shown in FIGS. 7 and 8. The specific surface areas determined by nitrogen adsorption are shown in Table 1.

As evident from FIGS. 7 and 8, the micropore of the activated carbon was closed with the silica resulted from coating.

TABLE 1

| | | Specific surface area (m$^2$/g) |
|---|---|---|
| Example E1 | silica-coated activated carbon | 806 |
| | reaction product(silica itself) | 789 |
| Example E2 | reaction product(silica itself) | 785 |
| Example E3 | reaction product(silica itself) | 790 |
| Example E4 | reaction product(titania itself) | 745 |
| Example E5 | reaction product(silica itself) | 1320 |
| Example E6 | silica-coated activated carbon | 2070 |
| Example E7 | titania-coated activated carbon | 1820 |
| Comparative C1 | silica-coated activated carbon | 31 |
| | reaction product(silica itself) | 6 |

The following conclusion was obtained based on the results shown in Table 1 and respective Figures. In Examples E1 to E7 the activated carbons coated with the reaction products (silica, titania) and the reaction products maintained their high specific surface areas and transferred the structures of the activated carbons accurately, but in Comparative C1 the silica-coated activated carbon and the silica underwent significant reduction in the specific surface area, and could not transfer the microstructure of the activated carbon.

Embodiment 2

This embodiment relates to a coated material as a condenser according to the present invention.

EXAMPLE E21

Figure 9A:
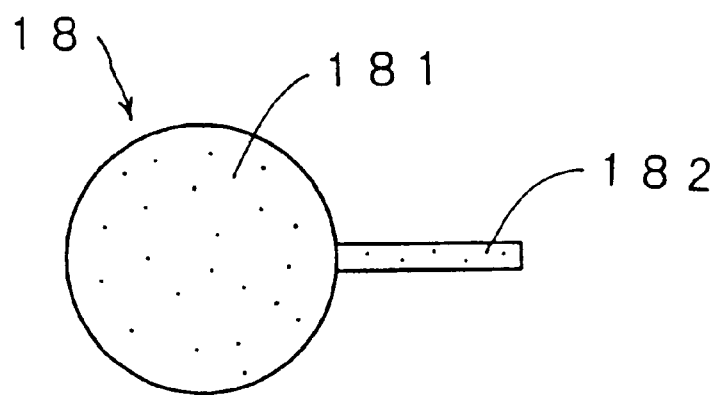
FIG. 9A is a plan view of an activate carbon substrate in Example E21 in Embodiment 2.
Figure 9B:
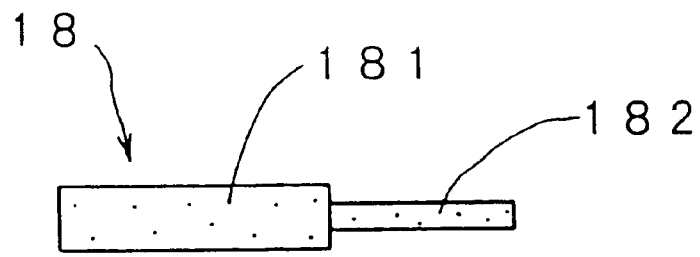
FIG. 9B is a lateral view of an activate carbon substrate in Example E21 in Embodiment 2.

A uniform mixture of 70 parts by weight of a phenolic activated carbon powder [specific surface are: 6.2×10$^9$ m$^2$/m$^3$ (specific gravity of activated carbon: 0.5, specific surface area per unit weight of activated carbon: 3100 m$^2$/g)] and 30 parts by weight of a phenol resin powder was subjected to pressure molding to obtain a molded article which had a protrusion and whose diameter and thickness were 20 mm and 1 mm, respectively (see FIG. 9A and FIG. 9B).

The molded article thus obtained was carbonized in a nitrogen atmosphere at 800° C. for 1 hour to obtain a C/C composite (carbon/carbon composite material) activated carbon substrate. This activated carbon substrate 18 consisted of a body 181 and a protrusion 182 for forming a disk condenser as shown in FIG. 9A and FIG. 9B. In addition, a Teflon tape was wound around the protrusion 182 of the activated carbon substrate 18 for masking.

Subsequently, a supercritical coating method was employed as a dielectric layer forming step. Thus, 1 g of tetrabutoxytitanium [Ti(C$_4$H$_9$O)$_4$] as a reaction precursor for titania (TiO$_2$) was dissolved in a supercritical carbon dioxide at 120° C. and under 240 atms, which was brought into contact with the activated carbon substrate containing water, thereby coating the titania on the surface of the activated carbon substrate to obtain an amorphous titania-activated carbon composite.

Furthermore, after removal of the masking Teflon tape surrounding the protrusion 182, the composite was annealed at 1000° C. for 1 hour to obtain a crystalline titania—activated carbon composite.

Subsequently, the following supercritical coating method was employed to form a counter electrode layer.

Thus, the protrusion of the crystalline titania—activated carbon composite was masked again with a Teflon tape and the crystalline titania—activated carbon composite was allowed to further contain water.

Then, 0.06 g of tetraethoxytin [$Sn(C_2H_6O)_4$] and 0.94 g of triisopropoxyindium [$In(i-C_3H_7O)_3$] were dissolved in a supercritical carbon dioxide (120° C., 200 atms) containing 10 parts by weight of ethanol, with which the titania—activated carbon composite was brought into contact to obtain a multilayer article having a titania layer and an amorphous ITO layer laminated on the activated carbon.

After removal of the masking Teflon tape again from this multilayer article, annealing at 600° C. was performed for 1 hour to obtain a condenser having a dielectric layer consisting of the titania and a counter electrode layer consisting of ITO which were laminated on the activated carbon as a conductive porous substrate.

Figure 10:
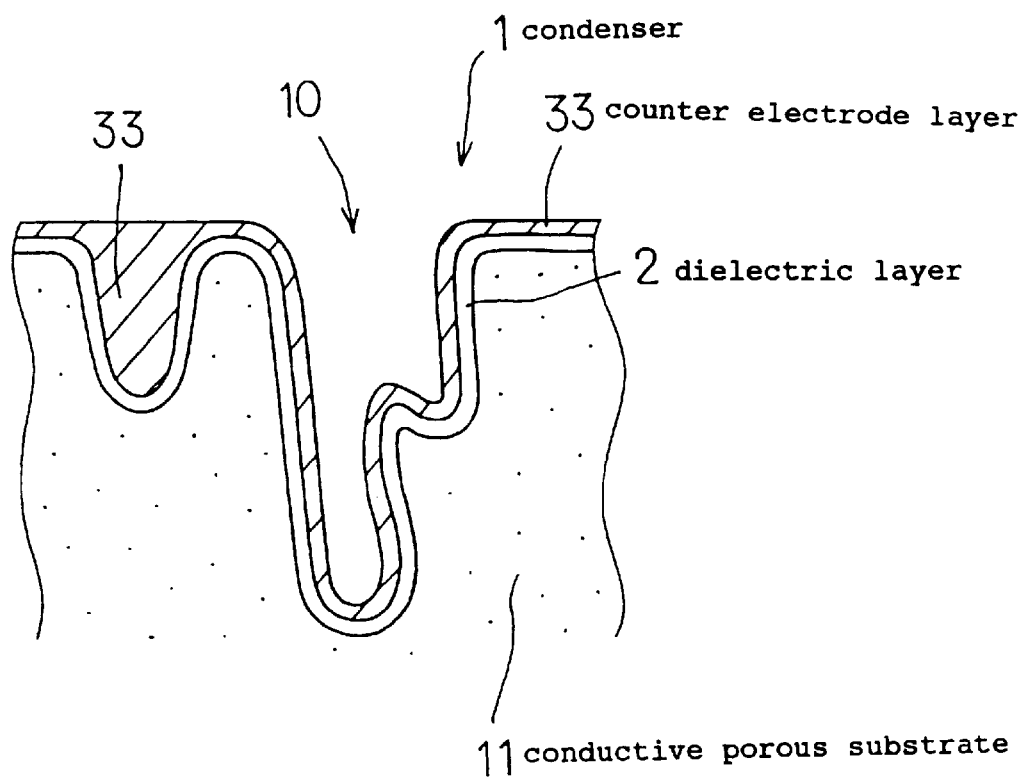
FIG. 10 is an explanatory view of the surface of a condenser consisting of a conductive porous substrate—a dielectric layer—a counter electrode layer in Example E21 in Embodiment 2.

FIG. 10 shows a condition inside of a micropore 10 in a condenser 1, in which a conductive porous substrate 11 has the micropore 10, which is coated with a dielectric layer 2, over which a counter electrode layer 33 is provided.

EXAMPLE E22

A C/C composite activated carbon substrate was obtained similarly as in Example E21 and then a Teflon tape was wound around the protrusion of the activated carbon substrate for masking.

Subsequently, the following supercritical coating method was employed as a dielectric layer forming step.

Thus, 0.539 g of diisopropoxide barium [$Ba(i-C_3H_7O)_2$] as a reaction precursor for barium titanate ($BaTiO_3$) and 0.600 g of tetraisopropoxide titanium [$Ti(i-C_3H_7O)_4$] were dissolved in a supercritical isopropanol at 250° C. under 220 atms. The activated carbon substrate containing water was brought into contact to coat barium titanate on the surface of the activated carbon substrate, thereby obtaining an amorphous barium titanate—activated carbon composite.

After removal of the masking Teflon tape, the composite was annealed at 1000° C. for 1 hour to obtain a crystalline barium titanate—activated carbon composite.

Finally, a counter electrode layer was formed similarly as in Example E21 to obtain a condenser having a barium titanate dielectric layer and an ITO electrode layer laminated on the activated carbon.

EXAMPLE E23

A condenser having a strontium titanate dielectric layer and an ITO electrode layer laminated on the activated carbon was obtained similarly as in Example E22 except for using 0.434 g of diisopropoxide strontium [$Sr(i-C_3H_7O)_2$] instead of 0.539 g of diisopropoxide barium [$Ba(i-C_3H_7O)_2$].

EXAMPLE E24

A condenser having an alumina dielectric layer and an ITO electrode layer laminated on the activated carbon was obtained similarly as in Example E21 except for using 1 g of triisopropoxidealuminium [$Al(i-C_3H_7O)_3$] instead of 1 g of tetrabutoxytitanium [$Ti(C_4H_9O)_4$].

EXAMPLE E25

A condenser having a titania dielectric layer and an ITO electrode layer laminated on the activated carbon was obtained similarly as in Example E21 except for not allowing crystallization after coating of the tetrabutoxytitanium.

EXAMPLE E26

A fabric of a phenolic activated carbon fiber [specific surface area: $2.4 \times 10^9$ $m^2/m^3$ (specific gravity of activated carbon: 0.72, specific surface area per unit weight of activated carbon: 1740 $m^2/g$)] was admixed with 10 parts by weight of a liquid resin consisting of a resol resin and a sufficient impregnation was achieved. This fiber fabric was then carbonized in a nitrogen atmosphere at 800° C. for 1 hour to obtain an activated carbon fiber fabric substrate.

Then, 0.3 g of this activated carbon fiber fabric substrate was isolated and a part of it was covered with a Teflon tape for masking.

Further, 1 g of tetrabutoxytitanium as a reaction precursor for titania ($TiO_2$) was dissolved in a supercritical carbon dioxide at 120° C. under 240 atms and brought into contact with the activated carbon fiber fabric substrate containing water to coat the titania on the surface of the substrate, thereby obtaining an amorphous titania—activated carbon fiber fabric composite.

After removal of the masking Teflon tape, the composite was annealed in a nitrogen atmosphere at 1000° C. for 1 hour to obtain a crystalline titania—activated carbon fiber fabric composite.

Then, a part of the composite was covered with a Teflon tape and allowed to contain water. Then PtC12 was dissolved in a supercritical carbon dioxide (120° C., 200 atms) containing 10 parts by weight of ethanol. Then the titania—activated carbon fiber fabric composite was brought into contact to form a multilayer article having a titania layer and a PtC12 layer laminated on the activated carbon fiber fabric.

After the masking Teflon tape surrounding the protrusion was removed from the multilayer article, pyrolysis was performed by a heat treatment at 600° C. in a nitrogen atmosphere to obtain a Pt layer, thereby obtaining a condenser having a titanium dielectric layer and an Pt electrode laminated on the activated carbon fiber fabric.

EXAMPLE E27

A C/C composite activated carbon substrate was obtained similarly as in Example E21.

Then, 0.06 g of tetraethoxytin and 0.94 g of triisopropoxyindium were dissolved in a supercritical carbon dioxide (120° C., 200 atms) containing 10 parts by weight of ethanol. An activated carbon substrate containing water was brought into contact to effect reaction, and then annealed in a nitrogen atmosphere at 600° C. for 1 hour to obtain an activated carbon—ITO composite consisting of ITO coating in which the surface of the activated carbon was covered with an ITO electrode layer. Then, a Teflon tape was wound around the protrusion of the composite for masking.

Then tetrabutoxytitanium as a reaction precursor was dissolved in supercritical carbon dioxide at 120° C. under 240 atms. The activated carbon—ITO composite containing water was brought into contact to coat the titania on the surface of ITO to obtain an activated carbon—ITO amorphous titania composite.

After removal of the masking Teflon tape, the composite was annealed in a nitrogen atmosphere at 1000° C. for 1 hour to obtain an activated carbon—ITO—crystalline titania composite.

Then the protrusion of the composite was wound again with a Teflon tape for masking, and allowed to contain water. Then, 0.06 g of tetraethoxytin and 0.94 g of triisopropoxyindium were dissolved in a supercritical carbon dioxide (120° C., 200 atms) containing 10 parts by weight of ethanol, and the activated carbon—ITO—crystalline titania composite was brought into contact to obtain a multilayer article in which an ITO layer, a crystalline titania layer and an amorphous ITO layer were laminated on the activated carbon.

After the masking Teflon tape was removed from the multilayer article, annealing was performed for 1 hour at 600° C. in a nitrogen atmosphere to obtain a condenser having an ITO electrode, a titania dielectric layer and an ITO electrode laminated on the activated carbon.

EXAMPLE E28

The condenser of Example E27 was heated in an oxidative atmosphere at 700° C. for 1 hour to remove the activated carbon layer as a porous substrate to obtain a condenser consisting of an ITO electrode as a substrate-side electrode layer, a titania dielectric layer and an ITO electrode as a counter electrode layer.

EXAMPLE E29

0.06 g of tetraethoxytin and 0.94 g of triisopropoxyindium were dissolved in a supercritical carbon dioxide (120° C., 200 atms) containing 10 parts by weight of ethanol, and brought into contact with a silica (specific surface area: 800 $m^2/g$) containing water to allow a reaction to obtain a silica amorphous ITO composite.

To this composite, 2 parts by weight of an unhardened epoxy resin was admixed and thorough impregnation was achieved. After annealing in a nitrogen atmosphere at 800° C. for 1 hour to proceed the crystallization of ITO and the carbonization of the epoxy resin. In this manner, a silica—ITO composite in which an ITO-coated silica was fixed with the carbon formed by the carbonization of the epoxy resin was obtained. A Teflon tape was wound around the protrusion of the composite for masking.

Then 1 g of tetrabutoxysilane as a reaction precursor of titania ($TiO_2$) was dissolved in a supercritical carbon dioxide at 120° C. under 240 atms, and brought into contact with the silica—ITO composite containing water to coat the titania on the surface of ITO to obtain a silica—ITO—amorphous titania composite.

After removal of the masking Teflon tape, the composite was annealed in a nitrogen atmosphere at 1000° C. for 1 hour to obtain a silica—ITO—crystalline titania composite.

Then the protrusion of the composite was wound again with a Teflon tape for masking, and allowed to contain water. Then, 0.06 g of tetraethoxytin and 0.94 g of triisopropoxyindium were dissolved in a supercritical carbon dioxide (120° C., 200 atms) containing 10 parts by weight of ethanol, and the silica—ITO—crystalline titania composite was brought into contact to obtain a multilayer article in which an ITO layer, a crystalline titania layer and an amorphous ITO layer were laminated on the silica.

After the masking Teflon tape was removed from the multilayer article, annealing was performed for 1 hour at 600° C. in a nitrogen atmosphere to obtain a condenser having an ITO electrode, a titania dielectric layer and an ITO electrode laminated on the silica.

COMPARATIVE C21

Comparative C21 employed a liquid phase method as a dielectric layer forming step. A condenser was produced otherwise similarly as in Example E21.

Thus, a C/C composite-derived activated carbon substrate was obtained by the manner similar to that in Example E21. Then a Teflon tape was wound around the protrusion of the activated carbon substrate for masking.

Then the activated carbon substrate containing water was immersed in an ethanol solution containing 1 g of tetrabutoxytitanium to coat the titania on the surface of the activated carbon substrate, thereby producing an amorphous titania activated carbon composite. The treatment temperature was 120° C.

After removal of the masking Teflon tape, the composite was annealed in a nitrogen atmosphere at 1000° C. for 1 hour to obtain a crystalline titania—activated carbon composite.

Finally, a counter electrode was formed similarly as in Example E21 to obtain a condenser having a titania dielectric layer and an ITO electrode as a counter electrode which were laminated on the activated carbon as a conductive porous substrate.

The specific surface areas of the porous substrate coated with the dielectric layers in the condensers of Examples E21 to E29 and Comparative C21, i.e., the specific surface areas of the dielectric layers are shown in Table 2 together with the capacitances of the condensers.

As evident from Table 2, Comparative C21 employing a liquid method had the specific surface area of the porous substrate coated with the dielectric layer which was reduced substantially (compared to Example E21), despite that the conductive porous substrate employed which was similar to that in Example E21. Such results may be attributable to the closure of the micropore of the activated carbon with the dielectric layer.

On the contrary, Examples E21 to E29 exhibited high specific surface areas. Such results may be attributable to the coating which was accomplished as deep as the inside of the micropore without closing the opening of the micropore.

Each of Examples E21 to E29 had a specific surface area as high as $3.5 \times 10^8$ $m^2/m^3$ or more, which provided a capacitance as high as 2.3 mAh/g or higher, which was 100 times that of Comparative C21 or higher.

TABLE 2

Specific Surface Areas of the Porous Substrate Coated with Dielectric Layers and Capacitance of Condensers

| Samples | Specific surface areas of the porous substrate coated with dielectric layers ($m^2/m^3$) | Capacitance of condensers (mAh/g) |
|---|---|---|
| Example E21 | $1.68 \times 10^9$ | 13 |
| Example E22 | $1.58 \times 10^9$ | 124 |
| Example E23 | $1.60 \times 10^9$ | 25 |
| Example E24 | $1.73 \times 10^9$ | 2.3 |
| Example E25 | $1.56 \times 10^9$ | 2.8 |
| Example E26 | $1.04 \times 10^9$ | 7.5 |
| Example E27 | $9.8 \times 10^8$ | 7.1 |
| Example E28 | $9.8 \times 10^8$ | 6.4 |
| Example E29 | $3.5 \times 10^8$ | 2.6 |
| Comparative C21 | $0.3 \times 10^8$ | 0.02 |

Embodiment 3

Figure 11:
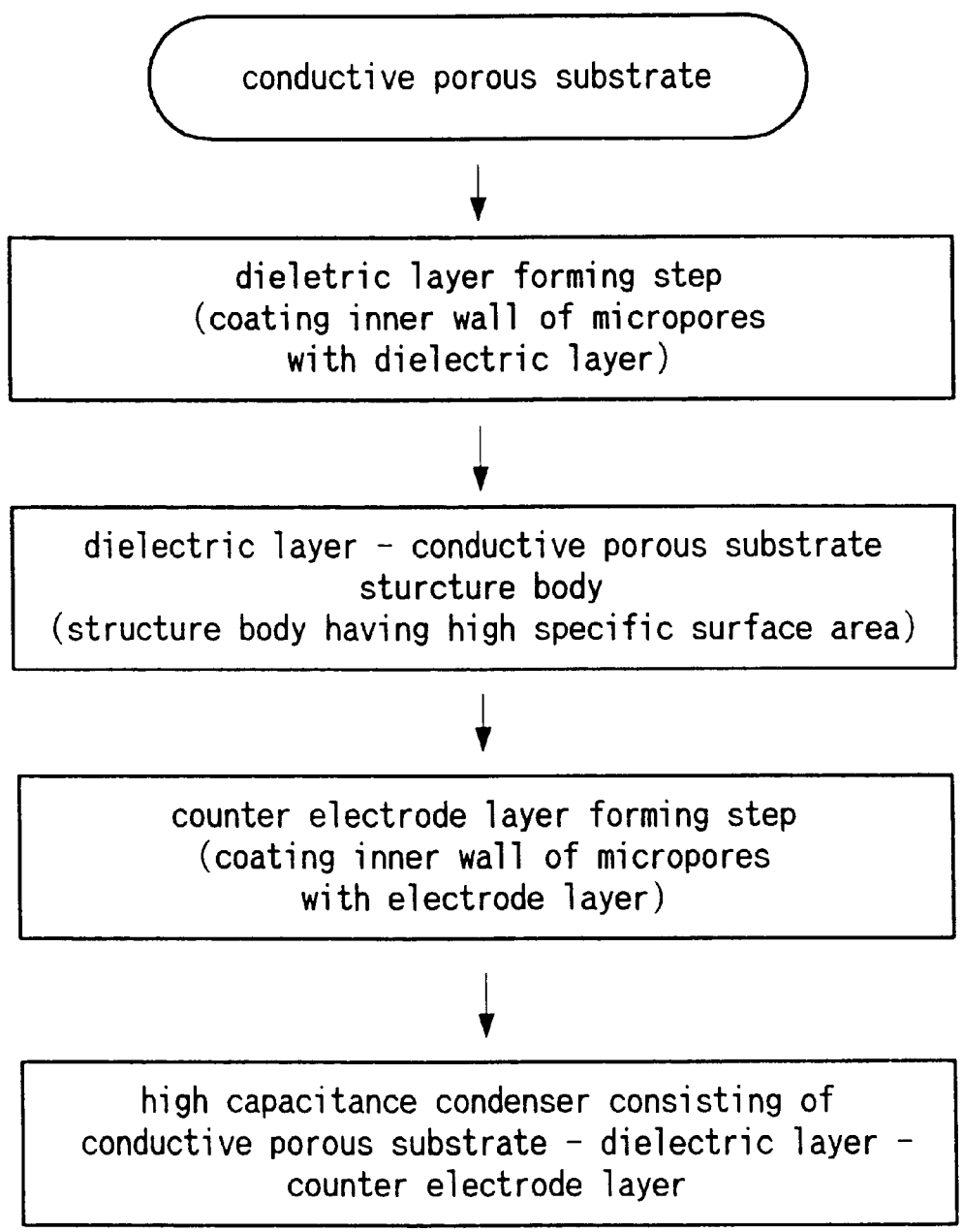
FIG. 11 is a flowchart illustrating a method for producing a condenser consisting of a conductive porous substrate—a dielectric layer—a counter electrode layer in Embodiment 3.

This embodiment relates to a method for producing a condenser (coated material) according to the present invention as shown in FIG. 11 and FIG. 10 pertaining to Example E21 described above and the sectional view of the condenser as focused on an important part.

FIG. 11 is a flowchart illustrating a method for producing a condenser consisting of a conductive porous substrate 11—a dielectric layer 2—a counter electrode layer 33 shown in FIG. 10. In this procedure, the condenser 1 having the surface shown in FIG. 10 was obtained. This corresponds to, for example, Example E21.

Embodiment 4

Figure 12:
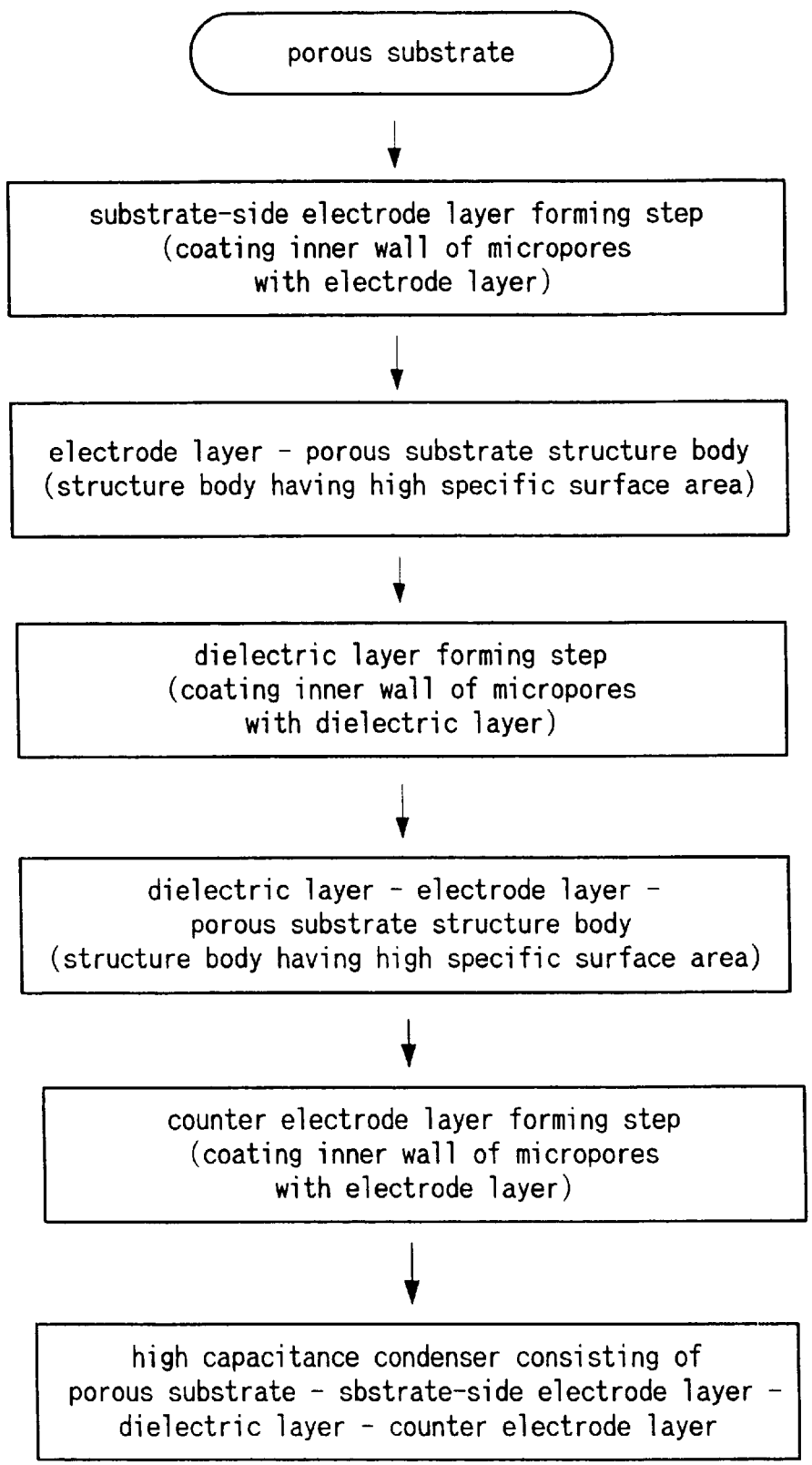
FIG. 12 is a flowchart illustrating a method for producing a condenser consisting of a conductive porous substrate—a porous substrate—a substrate-side electrode layer in Embodiment 4.
Figure 13:
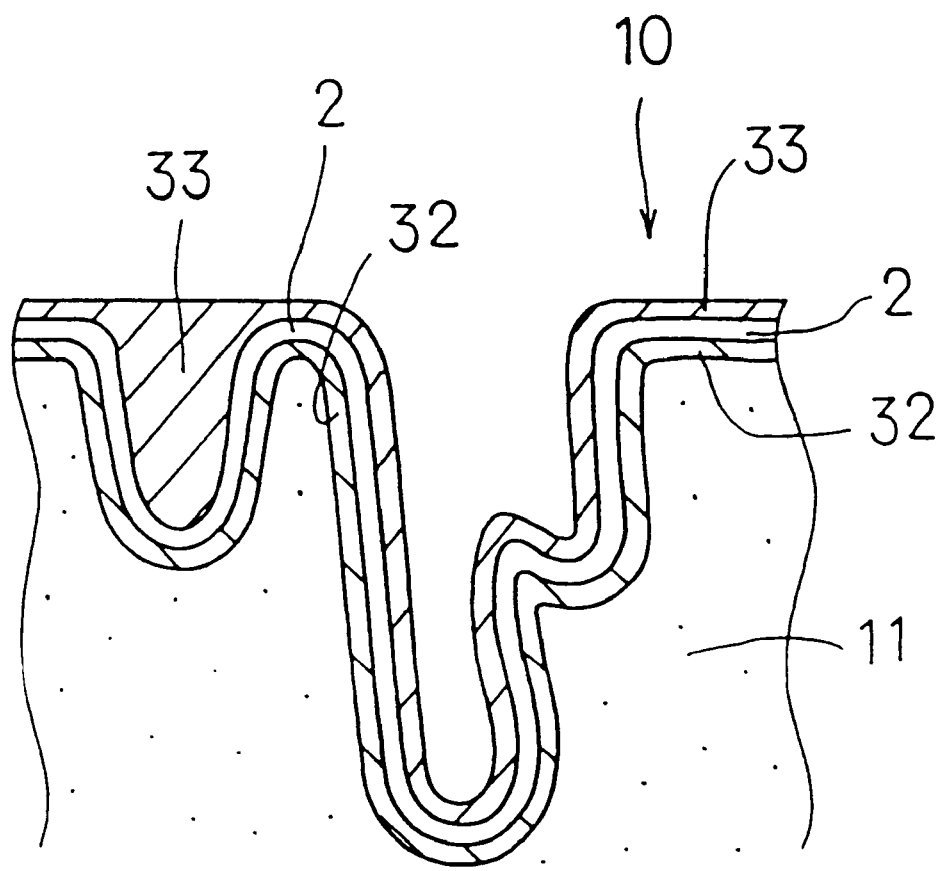
FIG. 13 is an explanatory view illustrating a condenser consisting of a porous substrate—a substrate-side electrode layer—a dielectric layer—a counter electrode layer in Embodiment 4.

This embodiment relates to another method for producing a condenser according to the present invention as shown in FIG. 12 and FIG. 13, and the sectional view of the condenser as focused on an important part.

FIG. 12 is a flowchart illustrating a method for producing a condenser consisting of a porous substrate 11—a substrate side electrode layer 32—a dielectric layer 2—a counter electrode layer 33 shown in FIG. 13. In this procedure, the condenser 10 having the surface shown in FIG. 13 was obtained. This corresponds to, for example, Example E27.

Embodiment 5

Figure 14:
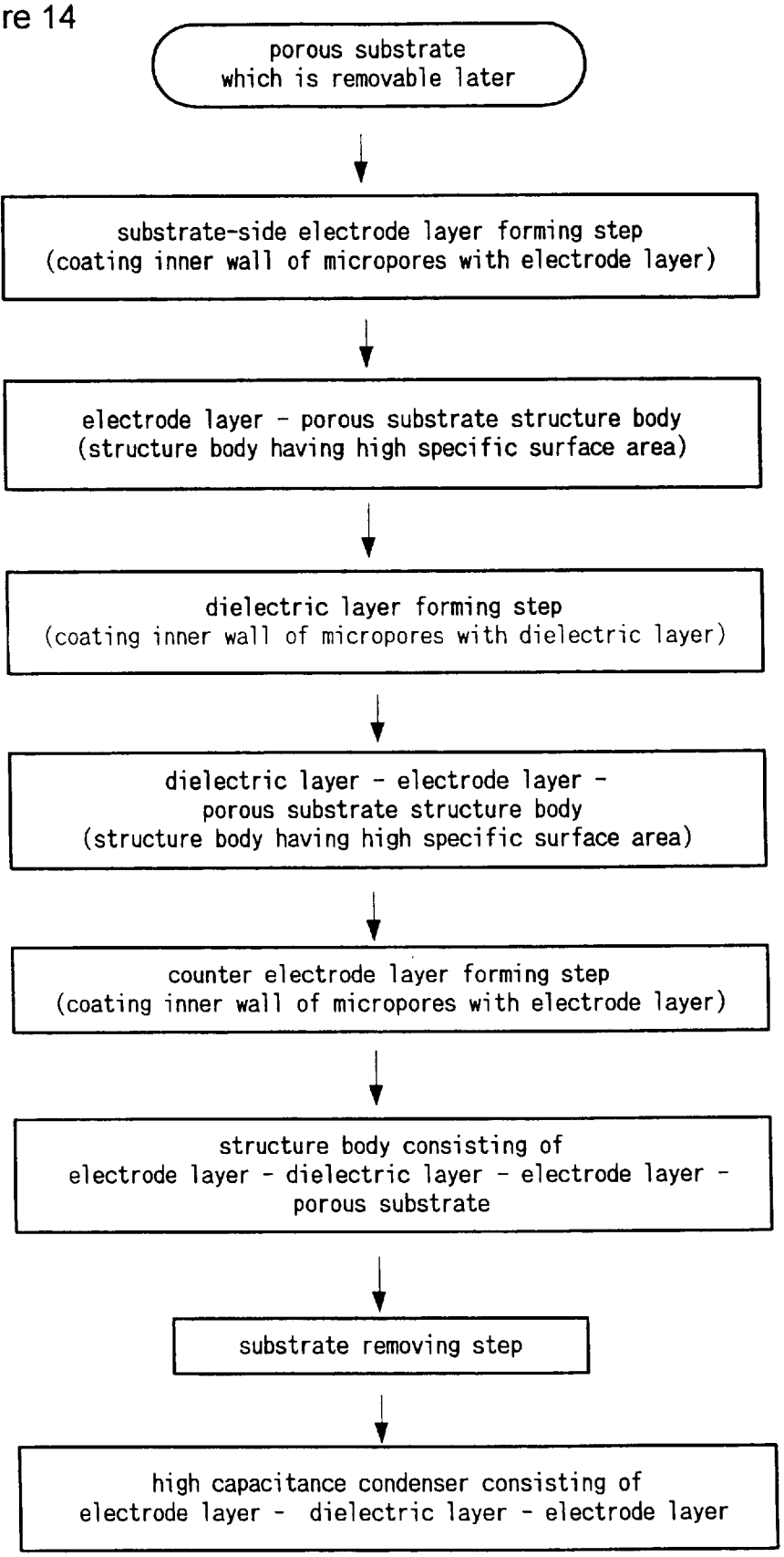
FIG. 14 is a flowchart illustrating a method for producing a condenser consisting of a substrate-side electrode layer—a dielectric layer—a counter electrode layer in Embodiment 5.
Figure 15:
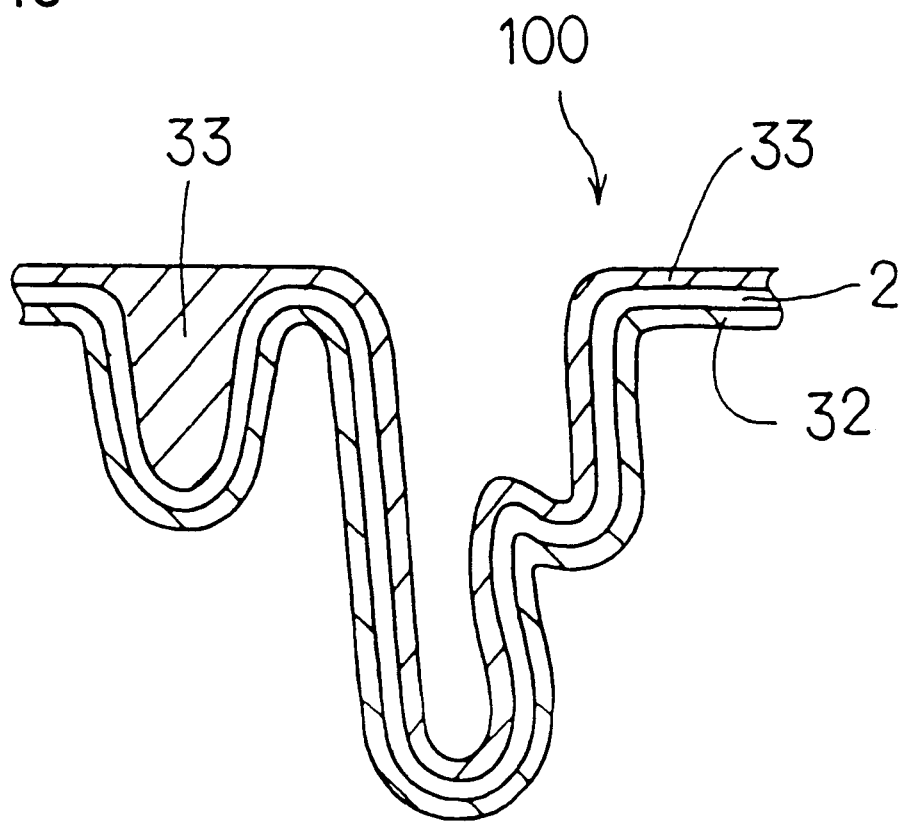
FIG. 15 is an explanatory view illustrating a condenser consisting of a substrate-side electrode layer—a dielectric layer—a counter electrode layer in Embodiment 5.

This embodiment relates to further different method for producing a condenser according to the present invention as shown in FIG. 14 and FIG. 15, and the sectional view of the condenser as focused on an important part.

FIG. 14 is a flowchart illustrating a method for producing a condenser consisting of a porous substrate side electrode layer 32—a dielectric layer 2—a counter electrode layer 33 shown in FIG. 15. In this procedure, the condenser 100 having the surface shown in FIG. 15 was obtained. This corresponds to, for example, Example E28.

Embodiment 6

This embodiment relates to a coated material as a noble metal-supporting catalyst and is discussed with reference to FIG. 16A to FIG. 16D.

In a method according to this embodiment, a noble metal loading step (FIG. 16A, FIG. 16B) wherein a noble metal 62 is loaded as dispersed on a surface 611 of a substrate 61, a support coating step (FIG. 16B, FIG. 16C) wherein a support material 63 is coated on the noble metal 62 and then a substrate removing step (FIG. 16C, FIG. 16D) wherein the substrate 61 is removed are performed.

Figure 16:
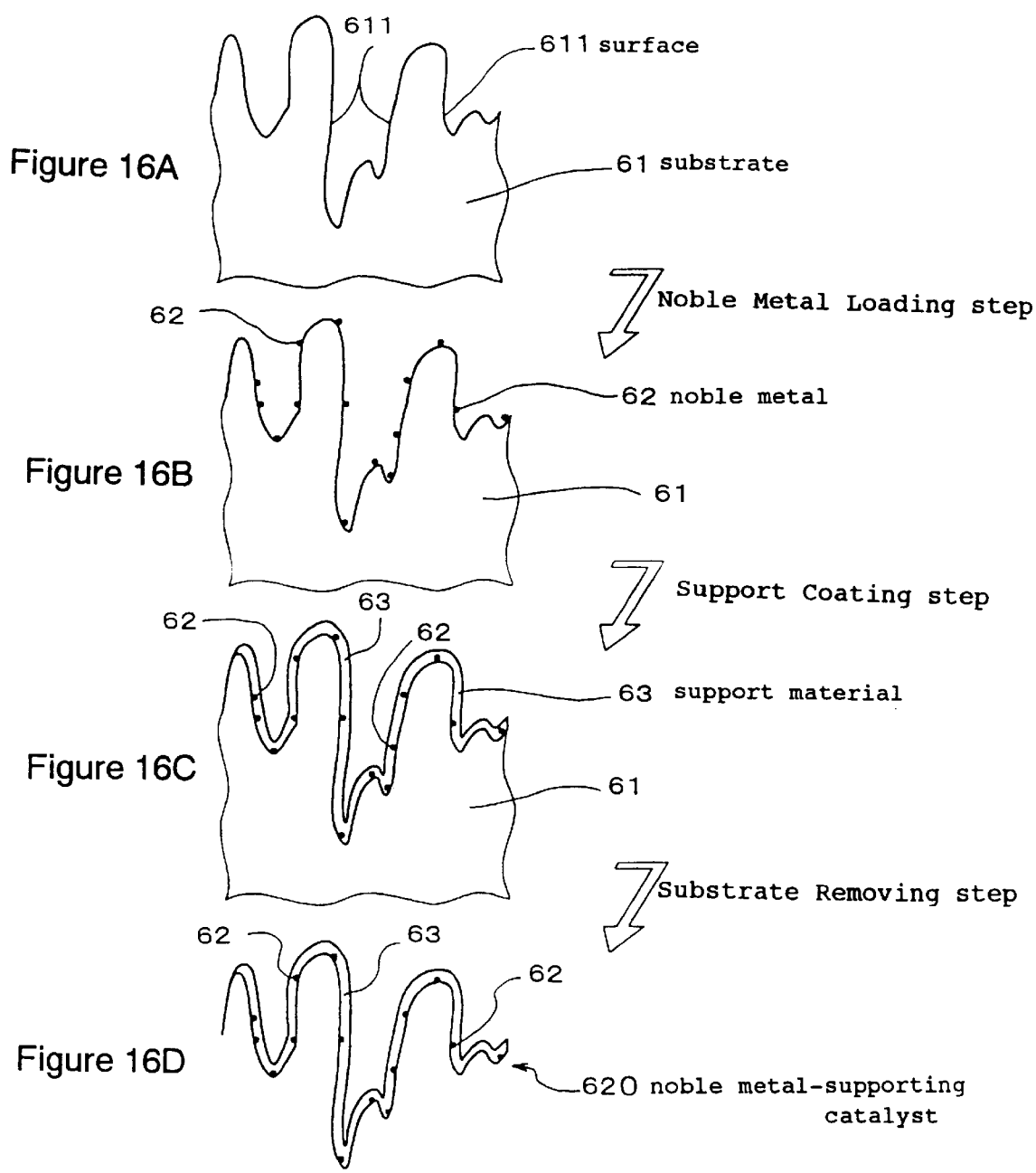
FIG. 16A is an explanatory view of a substrate in a method for producing a noble metal-supporting catalyst in Embodiment 6.
FIG. 16B is an explanatory view of a condition in which a noble metal loading step is performed in a method for producing a noble metal-supporting catalyst in Embodiment 6.
FIG. 16C is an explanatory view of a condition in which a support coating step is performed in a method for producing a noble metal-supporting catalyst in Embodiment 6.
FIG. 16D is an explanatory view of a condition in which a substrate removing step is performed in a method for producing a noble metal-supporting catalyst in Embodiment 6.

In this manner, a noble metal-supporting catalyst 620 having the noble metal 62 supported on the support material 63 is obtained (FIG. 16D).

In this embodiment, the noble metal 62 as a catalyst component having a small particle size is placed as highly dispersed, since the noble metal 62 is bonded as highly dispersed on the surface 611 on the substrate 61. Then the support material 63 is further overlaid. As a result, the noble metal 62 is highly dispersed as a particle at a high density uniformly on the surface of the support material 63. Therefore, a noble metal-supporting catalyst has a high catalytic activity.

Also since the rear part of the particle of the noble metal 2 is embedded in the support material 63 as shown in FIG. 16D, the interaction between the noble metal 62 and the support material 63 is potent, thereby limiting the motility of the noble metal 62. As a result, there is a less possibility of a sintering resulted from the particle growth due to the binding of the noble metal 62 to one another. Therefore, the noble metal supporting catalyst 620 obtained in this embodiment has an excellent durability.

Embodiment 7

Examples and Comparatives pertaining to Embodiment 6 are discussed below.

EXAMPLE E71

In this example, a noble metal loading step and a support coating step were performed by a supercritical coating method.

Thus, in a high pressure reaction vessel and in the presence of an activated carbon fiber (RENOVES A, manufactured by Osaka Gas Co., Ltd.) as a substrate, an acetone solution (0.7 g/l) of platinum diacethyl acetonate complex {Pt(acac)2 ↓} as a reaction precursor for a noble metal was dissolved in a supercritical carbon dioxide (150° C., 345 atms).

The mixture was kept in this condition for 3 hours. After removing the supercritical carbon dioxide under a reduced pressure followed by drying at room temperature for 10 hours, a precursor A was obtained (noble metal loading step).

In the presence of the precursor A, 2 ml of tetraethylorthosilicate (TEOS) which was a starting material for a support material as a reaction precursor was dissolved in the supercritical carbon dioxide (150° C., 345 atms). The mixture was kept in this condition for 3 hours.

Subsequently, the supercritical carbon dioxide was removed under a reduced pressure (support coating step).

After drying at room temperature for 10 hours, a heat treatment was performed in the air at 600° C. for 2 hours to remove the porous substrate while oxidizing the TEOS into a support material comprising $SiO_2$ (substrate removing step).

By this heating, the platinum dimethylacetonate complex was also converted into Pt as a catalyst component.

Thus, a noble metal-supporting catalyst having Pt supported on SiO2 as a support material was obtained.

EXAMPLE E72

In this example, a noble metal loading step employed a supercritical coating method, while a support coating step employed a solution immersion method.

Similarly as in Example E71, in the presence of an activated carbon fiber (RENOVES A, manufactured by Osaka Gas Co., Ltd.), an acetone solution (0.7 g/l) of platinum diacethyl acetonate complex {Pt(acac)2 ↓} was dissolved in a supercritical carbon dioxide (150° C., 345 atms). The mixture was kept in this condition for 3 hours. Then after removing the supercritical carbon dioxide under a reduced pressure followed by drying at room temperature for 10 hours, a precursor A was obtained (noble metal loading step).

The precursor A was immersed in tetraethylorthosilicate (TEOS) at room temperature. After removing an excessive TEOS by filtration, drying at room temperature was performed for 10 hours. Then a heat treatment was performed in the air at 600° C. for 2 hours, and a noble metal-supporting catalyst having Pt supported on a $SiO_2$ support similar to that in Example E71 was obtained.

COMPARATIVE C71

To 1 g of a porous article made from a silica, an aqueous solution of dinitrodiamine platinum salt was metered in such a rate that 2 g of Pt was combined with 120 g of the porous article, and the mixture was stirred at room temperature for 1 hour and then heated and evaporated into dryness.

A heat treatment was performed in the air at 500° C. for 2 hours to convert the platinum salt into Pt, thereby obtaining a noble metal-supporting catalyst having Pt supported on the porous article.

[Evaluation method]

Each of the noble metal-supporting catalysts was examined for its durability by heating in the air at 900° C. for 5 hours.

The particle size of Pt in each sample was determined by X ray diffractometry. The results are shown in Table 3.

TABLE 3

| Samples | Initial particle size of Pt | Particle size of Pt after tested durability |
|---|---|---|
| Example E71 | smaller than sensible level | 20 nm |
| Example E72 | smaller than sensible level | 30 nm |
| Comparative C71 | smaller than sensible level | 110 nm |

As evident from Table 3, Pt as the catalyst component in each of the noble metal-supporting catalysts before durability examination had a particle size which was sensed by X ray diffractometry or smaller.

However, after the durability examination, the particle size of Pt in Comparative C71 grew to 110 nm. On the other hand, in Examples E71 and E72 of this invention, the particle growth was remarkably small.

Embodiment 8

This embodiment relates to a coated material as a metal-supported material.

EXAMPLE E81

5 ml of an acetone solution in which $3.36 \times 10^{-2}$ g of platinum diacethyl acetonate complex {Pt(acac)2} as a metal precursor was dissolved was prepared as a precursor fluid.

Figure 18:
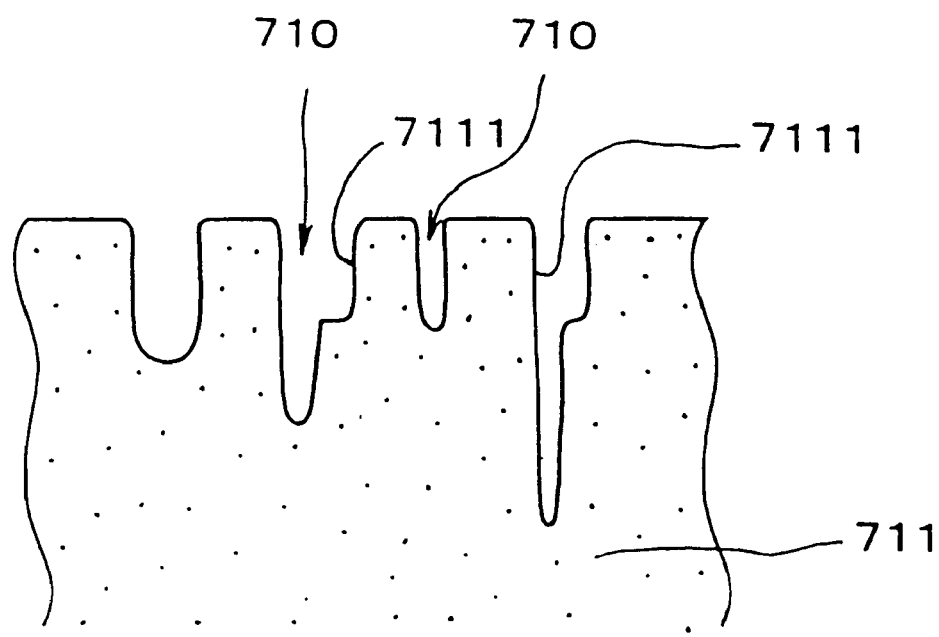
FIG. 18 is an explanatory view of the surface of a pore wall of a porous substrate in Example E81 in Embodiment 8.

In the mean time, a porous substrate 711 having a micropore 710 including micropores was provided as shown in FIG. 18.

Figure 19:
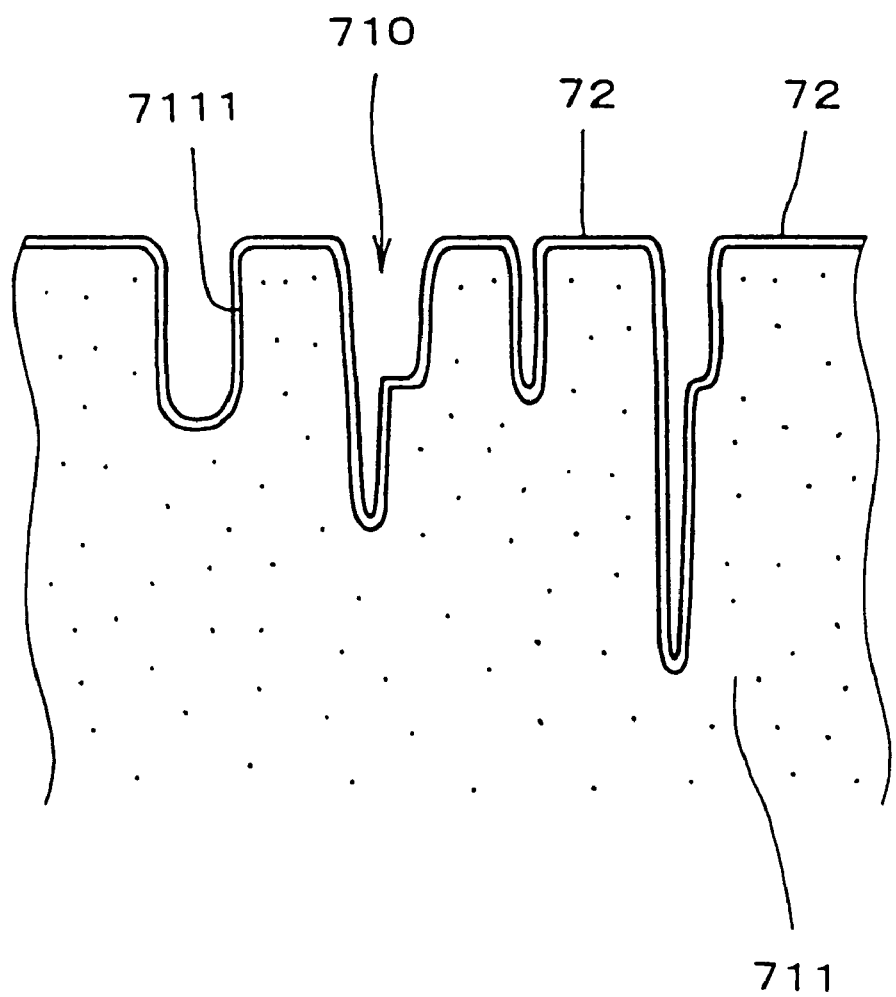
FIG. 19 is an explanatory view of a precursor fluid on the surface of a pore wall of a porous substrate in Example E81 in Embodiment 8.

Then, in the presence of 1 g of the porous substrate 711, 5 ml of the acetone solution was dissolved in a supercritical carbon dioxide (150° C., 345 atms) (dissolution step). By keeping the mixture in this condition for 3 hours, the precursor fluid was brought into contact with the porous substrate 711 as deep as a pore wall surface 7111, thereby coating a metal precursor 72 (coating step) as shown in FIG. 19.

After removing the supercritical carbon dioxide under a reduced pressure followed by drying at room temperature for 10 hours, a heat treatment was performed in the air at 500° C. for 2 hours (sintering step). Thus, platinum diacethyl acetonate complex as the metal precursor 72 in the precursor fluid was converted into a Pt metal 73 to obtain the metal-supported material 71 of Example E81 shown in FIG. 17.

Thus, the metal-supported material 71 had the Pt metal 73 supported on the pore wall surface 7111 of the porous substrate 711.

2 g of the Pt metal was supported on 120 g of the porous substrate.

EXAMPLE E82

5 ml of a methanol solution in which $2.27 \times 10^{-2}$ g of platinum dichloride {$PtCl_2$} as a metal precursor was dissolved was prepared as a precursor fluid.

In the mean time, a porous substrate 711 which was the same as that used in Example E81 was prepared (FIG. 18).

Then, in the presence of 1 g of the porous substrate 711, 5 ml of the methanol solution was dissolved in a supercritical carbon dioxide (150° C., 345 atms). By keeping the mixture in this condition for 3 hours, the precursor fluid was coated with a pore wall surface 7111 of the porous substrate 711 (FIG. 19).

Figure 17:
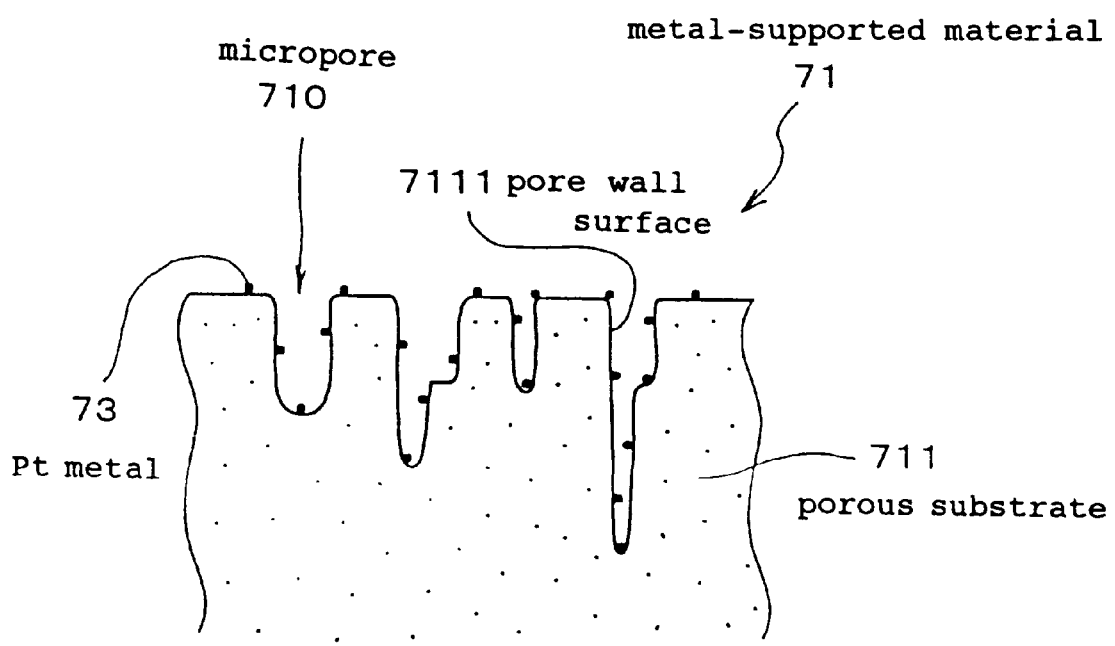
FIG. 17 is an explanatory view of a metal-supported material placed on the surface of a pore wall of a porous substrate in Example E81 in Embodiment 8.

After removing the supercritical carbon dioxide under a reduced pressure, drying and a heat treatment were performed in the conditions similar to those of Example E81. Thus, platinum dichloride as the metal precursor 2 in the precursor fluid was converted into a Pt metal 73 to obtain the metal-supported material 71 of Example E82, which had the Pt metal 73 supported on the pore wall surface 7111 of the porous substrate 711 (FIG. 17).

2 g of the Pt metal was supported on 120 g of the porous substrate.

COMPARATIVE C81

To 1 g of a porous substrate, an aqueous solution of dinitrodiamine platinum salt was metered in such a rate that 2 g of Pt was combined with 120 g of the porous substrate, and the mixture was stirred at room temperature for 1 hour and then heated and evaporated into dryness. A heat treatment was then performed in the air at 500° C. for 2 hours. In this manner, the dinitrodiamine platinum salt was converted into Pt metal, thereby obtaining a metal-supported material of Comparative C81 having Pt metal supported on the pore wall surface of the porous substrate.

The metal-supported materials of Example E81, Example E82 and Comparative C81 were examined for the dispersibility of Pt metal.

For this examination, the amount of CO adsorbed was determined by pulse method. Based on the amount of CO adsorbed thus determined, the dispersibility of Pt metal was assessed. The results are shown in Table 4.

Since in Table 4 the value representing the dispersibility is indicative of the average particle size of Pt metal and the dispersibility into the substrate and based on the assumption that one CO molecule is adsorbed on one Pt Subsequently, the supercritical fluid is removed and the substrate is dried and heated. In this manner, a light catalyst precursor 92 is converted into a light catalyst component 93, and a light catalyst 91 having the light catalyst component 93 supported on the porous substrate 911 is obtained (FIG. 20C).

The advantageous effects of this embodiment are described below.

In this embodiment, the precursor fluid in contact with a pore wall surface 9111 of the porous substrate 911 employs a supercritical fluid as a solvent. Therefore, the precursor fluid can permeate into a micropore 910 of the porous substrate 911 readily and rapidly.

Figure 20A:
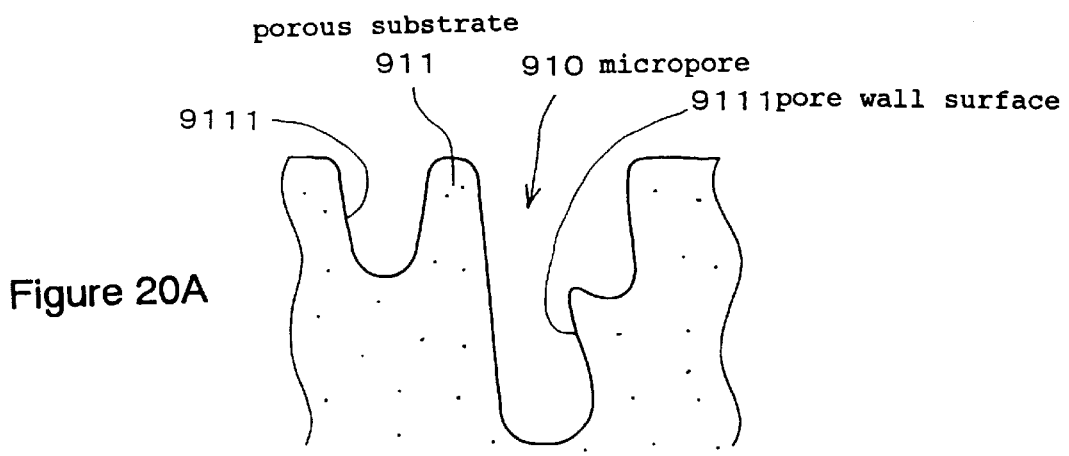
FIG. 20A is an explanatory view of the surface of a pore wall of a porous substrate in a method for producing a light catalyst in Embodiment 9.
Figure 20B:
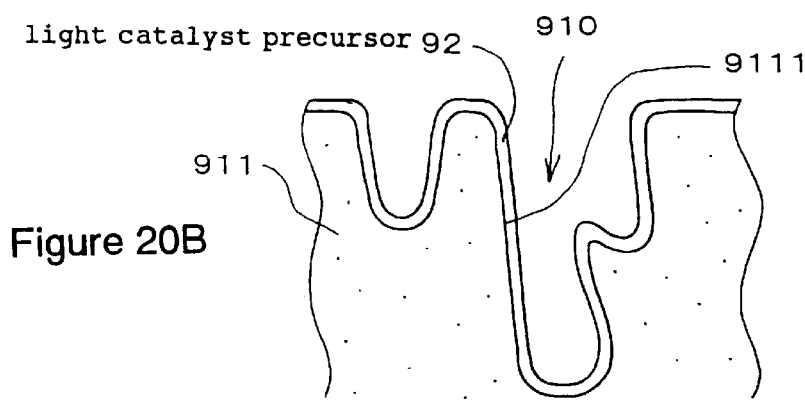
FIG. 20B is an explanatory view of the surface of a pore wall of a porous substrate after a coating step in a method for producing a light catalyst in Embodiment 9.
Figure 20C:
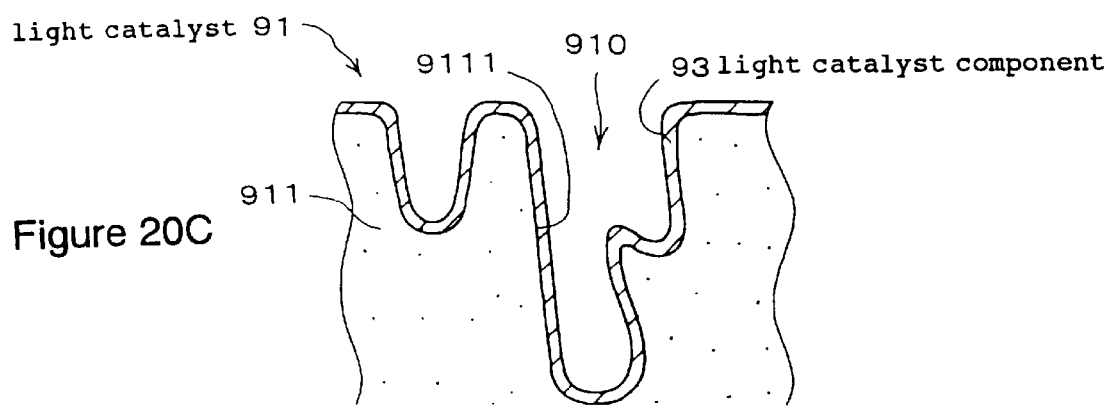
FIG. 20C is an explanatory view of the surface of a light catalyst in a method for producing a light catalyst in Embodiment 9.

Thus, as shown in FIG. 20C, the light catalyst component 93 can be supported as highly dispersed on the pore wall surface 9111 of the porous substrate 911 deep into the micropore 910.

Accordingly, the light catalyst 91 has a high catalyst reaction efficiency and a high adhesiveness between the light catalyst component and the porous substrate 911.

Also since the light catalyst component 93 is embedded deep into the micropore 91 of the porous substrate 911 (FIG. 20C), the interaction between the light catalyst component 93 and the porous substrate 911 is potent, thereby limiting the motility of the light catalyst component 93. Accordingly, there is a less possibility of a sintering resulted from the particle growth due to the binding of the catalyst component atom, the value 100% corresponds to the exposure of all Pt atoms on the surface.

TABLE 4

| Samples | Dispersibility of Pt metal |
|---|---|
| Example E81 | 65% |
| Example E82 | 60% |
| Comparative C81 | 48% |

As evident from Table 4, the dispersibilities of the Pt metals in Examples E81 and E82 were as high as 65% and 60%, respectively, whereas that in Comparative C81 was 48%.

Thus, the above results show that the metal-supported material obtained by the method according to this invention supports the metal as highly dispersed.

Embodiment 9

This embodiment relates to a coated material as a light catalyst and is discussed with reference to FIG. 20A to FIG. 20C.

In a production method according to this embodiment, a dissolution step wherein a precursor fluid in which a light catalyst precursor for forming a light catalyst component is dissolved in a supercritical fluid is prepared and a coating step (FIG. 20B) wherein the precursor fluid is brought into contact with a porous substrate 911 shown in FIG. 20A are performed. 93 to one another.

Therefore, the light catalyst 91 obtained by this invention has an excellent durability.

Embodiment 10

Examples and Comparatives pertaining to Embodiment 9 are discussed below.

EXAMPLE E101

An isopropanol solution {3.5 mol/l} in which titanium isopropoxide {Ti(iso-PrO)$_4$} as a light catalyst precursor was dissolved was prepared.

Then, in the presence of an activated carbon fiber (RENOVES A, manufactured by Osaka Gas Co., Ltd.) as a porous substrate, the isopropanol solution obtained above was dissolved in a supercritical carbon dioxide (150° C., 374 atms) (dissolution step).

By keeping the mixture in this condition for 3 hours, TiO$_2$ film was coated deep on the surface of a pore wall of the activated carbon fiber (coating step). Then the supercritical fluid was removed under a reduced pressure and the substrate was dried at room temperature for 10 hours.

Subsequently, a heat treatment under a nitrogen flow was conducted for 30 minutes at 300° C., 400° C., 500° C., 600° C., 700° C. or 800° C.

Consequently, 6 light catalysts of Example E101 each of which had a TiO$_2$ film formed on the activated carbon fiber were obtained.

COMPARATIVE C101

An isopropanol solution in which titanium isopropoxide {Ti(iso-PrO)$_4$} as a light catalyst precursor was dissolved at the concentration of 0.1 mol/l was prepared.

Then, an activated carbon fiber (RENOVES A, manufactured by Osaka Gas Co., Ltd.) was added to the isopropanol solution obtained above and dispersed ultrasonically.

To this mixture, 50% by weight of an aqueous solution of isopropanol was added with stirring. This solution contained water in an amount equivalent to that in the hydrolysis of the alkoxide.

Subsequently, the solvent was dried off and the substrate was heated under nitrogen flow for 30 minutes at 300° C., 400° C., 500° C., 600° C., 700° C. or 800° C., and then 6 light catalysts of Comparative C101 each of which had a TiO$_2$ film formed on the activated carbon fiber were obtained.

The catalyst performances of the light catalysts of Example E101 and Comparative C101 produced as described above were compared.

Thus, each of the light catalysts was placed in a cylindrical reaction vessel, whose both ends were then plugged with glass fibers, and then the light was irradiated from a high pressure mercury lamp (500W).

In this condition, an acetaldehyde-containing gas (acetaldehyde (100 ppm)+O$_2$ (5%) in N$_2$) was allowed to flow through the cylindrical reaction vessel.

After flowing, the acetaldehyde concentration was determined by gas chromatography.

Figure 21:
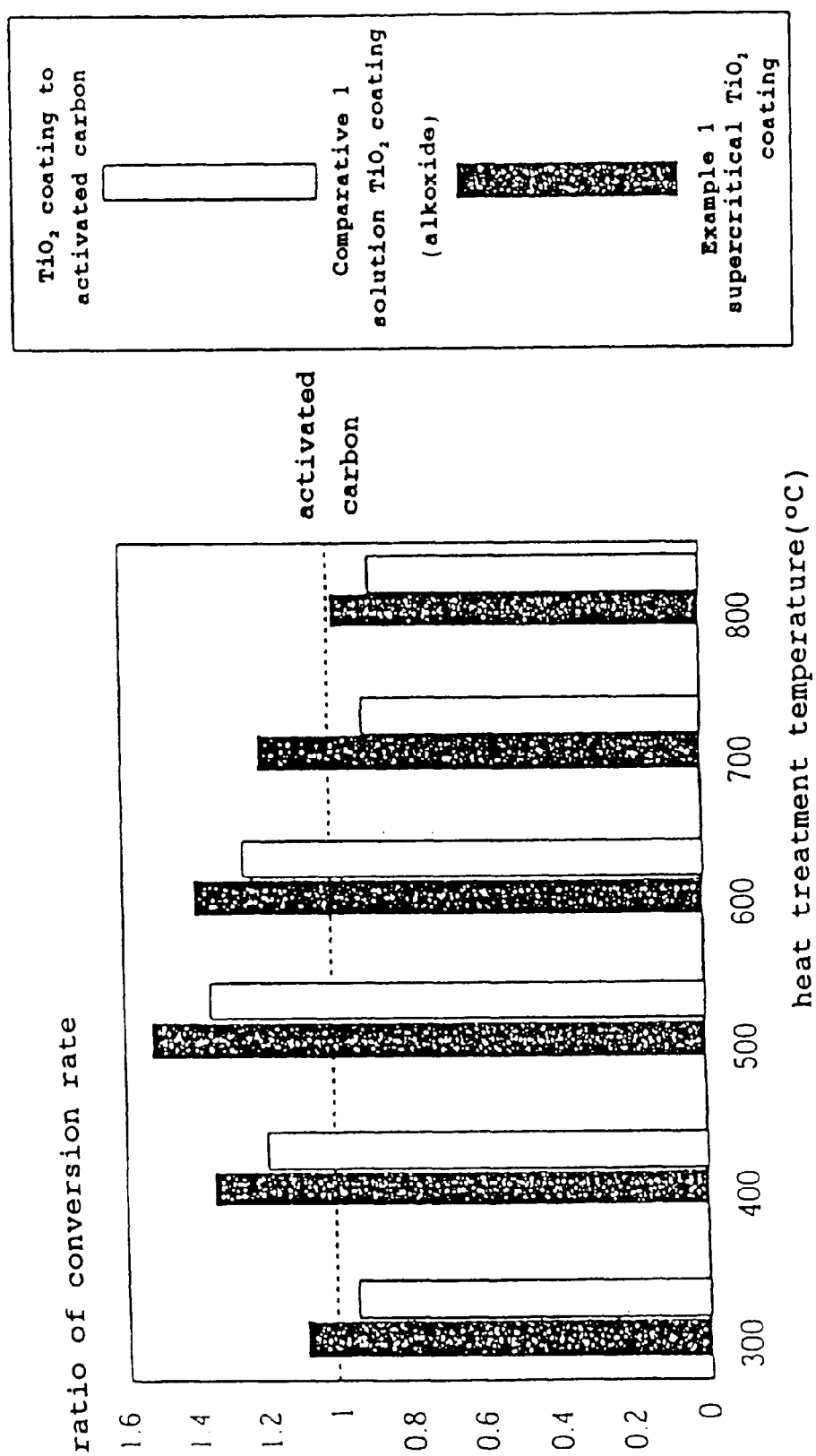
FIG. 21 is a graphical representation indicating the ratio of the conversion rates of the light catalysts of Example E101 and Comparative C101 in Embodiment 10.

The results are shown in FIG. 21 as a relationship between the ratio of the conversion rates and the heat treatment temperature. The ratio of the conversion rates means the ratio of the conversion rate of each sample to the conversion rate of an activated carbon.

The conversion rate means the rate of the reduction in the acetaldehyde concentration after reaction based on the concentration before reaction when the reaction is effected by passing acetaldehyde through the cylindrical reaction vessel.

As evident from FIG. 21, the conversion rate of the light catalyst of Example E101 was higher than that of Comparative C101.

While the light catalyst of Comparative C101 required the heat treatment at 400 to 600° C. in order to obtain the conversion rate which was higher than that of the activated carbon, a heat treatment at 300 to 700° C. was acceptable in the case of the light catalyst of Example E101 in order to obtain the conversion rate which was higher than that of the activated carbon.

These results indicate that a light catalyst having an excellent catalyst performance can be obtained according to the present invention.

Embodiment 11

A different coated material as a light catalyst was discussed in each of Example and Comparative of this embodiment.

EXAMPLE E111

An n-butanol solution {2.9 mol/l} in which titanium n-butoxide {Ti(n-BuO$_4$)} as a light catalyst precursor was dissolved was prepared.

Then, in the presence of an activated carbon fiber (RENOVES A, manufactured by Osaka Gas Co., Ltd.) as a porous substrate, the n-butanol solution obtained above was dissolved in a supercritical carbon dioxide (150° C., 356 atms).

By keeping the mixture in this condition for 3 hours, TiO$_2$ film was coated deep on the surface of a pore wall of the activated carbon fiber. Then the supercritical fluid was removed under a reduced pressure and the substrate was dried at room temperature for 10 hours.

Subsequently, a heat treatment under a nitrogen flow was conducted for 30 minutes at 300° C., 400° C., 500° C., 600° C., 700° C. or 800° C.

Consequently, 6 light catalysts of Example E111 each of which had a TiO$_2$ film formed on the activated carbon fiber were obtained.

COMPARATIVE C111

A $TiO_2$ sol (STS01, manufactured by Ishihara Techno Co., Ltd.) was applied onto an activated carbon fiber (RENOVES A, manufactured by Osaka Gas Co., Ltd.). After drying at room temperature for 10 hours, a heat treatment under a nitrogen flow was conducted for 30 minutes at 300° C., 400° C., 500° C., 600° C., 700° C. or 800° C.

Consequently, 6 light catalysts of Comparative C111 each of which had a $TiO_2$ film formed on the activated carbon fiber were obtained.

The catalyst performances of the light catalysts of Example E111 and Comparative C111 produced as described above were compared in the manner similar to that in Embodiment 10, except for using ammonia here instead of acetaldehyde employed in Embodiment 10. Otherwise the procedure was similar to that in Embodiment 10.

Figure 22:
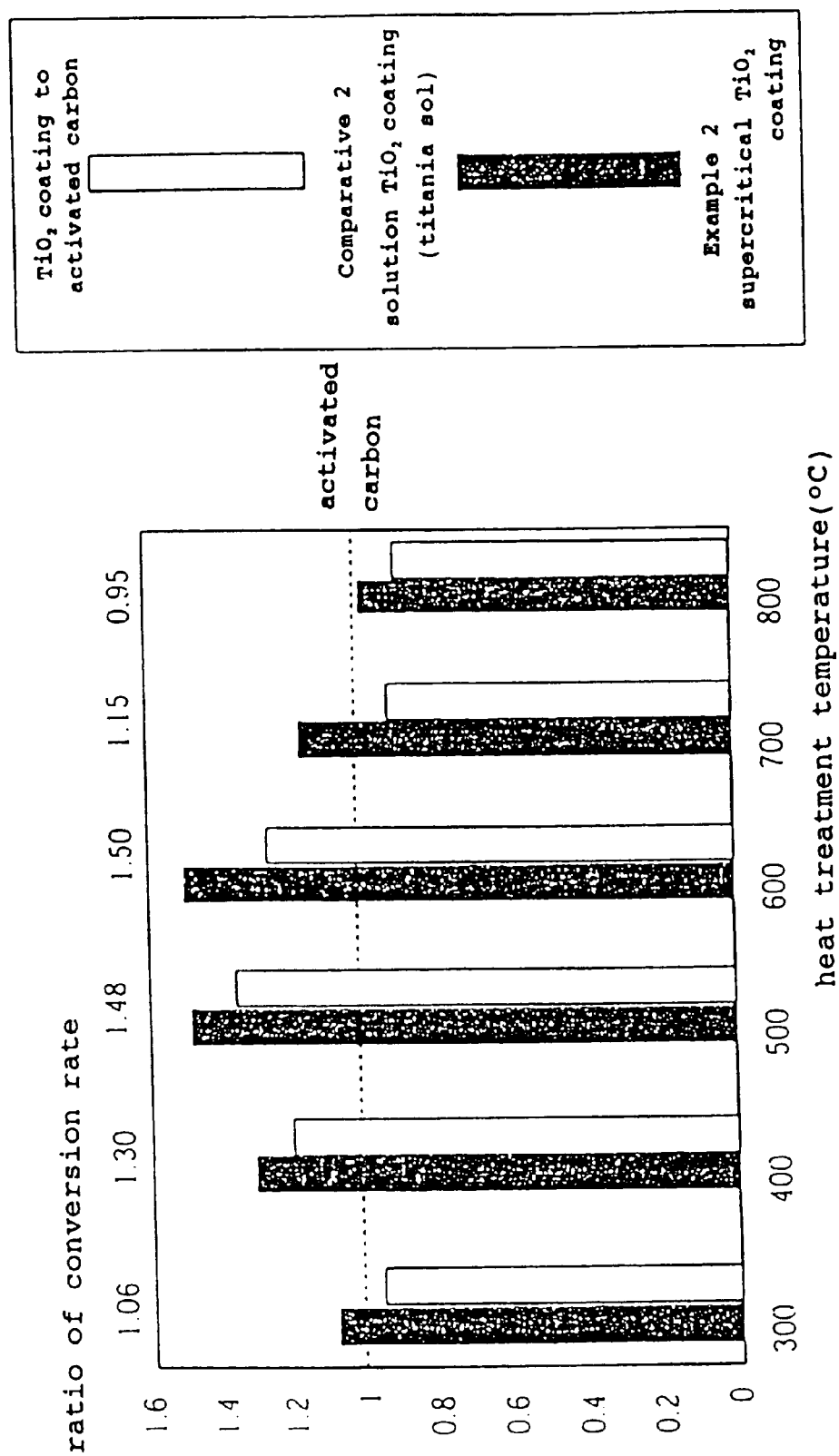
FIG. 22 is a graphical representation indicating the ratio of the conversion rates of the light catalysts of Example E111 and Comparative C111 in Embodiment 11.

The results obtained in this embodiment are shown in FIG. 22 as a relationship between the ratio of the conversion rates and the heat treatment temperature.

Similarly to Embodiment 10, FIG. 22 indicates that the light catalyst of Example E111 had a higher conversion rate when compared with the light catalyst of Comparative C111 and that a broader range of the temperature of the heat treatment was acceptable for obtaining a light catalyst having a conversion rate higher than that of an activated carbon.

These results also indicate that a light catalyst having an excellent catalyst performance can be obtained according to the present invention.

The appearances of the light catalysts of Example E101, Example E111, Comparative C101 and Comparative C111 were compared by visual observation.

As a result, the light catalysts of Comparative C101 and Comparative C111 had the spots of glossy or white area. This indicates that the light catalyst components were partially agglomerated.

On the contrary, the light catalysts of Example E101 and Example E111 showed no spots of glossy or white area which were observed in the light catalysts of Comparative C101 and Comparative C111, and exhibited no difference from the activated carbon having no supported light catalyst component.

These results indicate that a light catalyst supporting a light catalyst component as highly dispersed can be obtained according to the present invention.

Embodiment 12

A different coated material as a light catalyst was discussed also in each of Example and Comparative of this embodiment.

EXAMPLE E121

An isopropanol solution {3.5 mol/l} in which titanium isopropoxide {Ti(iso-PrO)$_4$} as a light catalyst precursor was dissolved was prepared.

Then, in the presence of a zeolite (ZSM-5, manufactured by Mobil Co., Ltd.) as a porous substrate, the isopropanol solution obtained above was dissolved in a supercritical carbon dioxide (150° C., 361 atms).

By keeping the mixture in this condition for 3 hours, $TiO_2$ film was coated deep on the surface of a pore wall of the zeolite. Then the supercritical carbon dioxide was removed under a reduced pressure and the substrate was dried at room temperature for 10 hours.

Subsequently, a heat treatment under a nitrogen flow was conducted for 30 minutes at 500° C.

Consequently, a light catalyst of Example E121 which had a $TiO_2$ film formed on the zeolite was obtained.

COMPARATIVE C121

An isopropanol solution in which titanium isopropoxide {Ti(iso-PrO)$_4$} as a light catalyst precursor was dissolved at the concentration of 0.1 mol/l was prepared.

Then, a zeolite (ZSM-5, manufactured by Mobil Co., Ltd.) was added to the isopropanol solution obtained above and dispersed ultrasonically.

To this mixture, 50% by weight of an aqueous solution of isopropanol was added with stirring. This solution contained water in an amount equivalent to that in the hydrolysis of the alkoxide.

Subsequently, the solvent was dried off and the substrate was heated under nitrogen flow for 30 minutes at 500° C., and then a light catalyst of Comparative C121 which had a $TiO_2$ film formed on the zeolite was obtained.

The light catalysts of Example E121 and Comparative C121 produced as described above were compared in the adhesiveness of their catalyst components to the porous substrate.

The light catalysts of Example E101 and Comparative C101 were also evaluated.

In the evaluation, 10 g of each sample was placed in a 500 ml beaker, which was treated ultrasonically in atmosphere for 5 minutes. The reduction in the weight of each sample not less than 1.0% after the ultrasonic treatment was employed as an index for the evaluation.

The results of the evaluation are shown in Table 5. A reduction in the weight less than 1.0% was designated by a ○ while a reduction in the weight not less than 1.0% was designated by X.

TABLE 5

| | Porous substrate | Supporting method | Adhesiveness |
|---|---|---|---|
| Example E101 | activated carbon fiber | supercritical $TiO_2$ coating | ○ |
| Comparative C101 | activated carbon fiber | solution $TiO_2$ coating | X |
| Example E121 | zeolite | supercritical $TiO_2$ coating | ○ |
| Comparative C121 | zeolite | solution $TiO_2$ coating | X |

As shown in Table 5, the reduction in the weight of the light catalysts of Examples E101 and E121 were less than 1.0% whereas those of the light catalysts of Comparatives C101 and C121 were 1.0% or more.

Thus, the light catalysts of Example E101 and Example E121 underwent almost no detachment of the catalyst component in response to the ultrasonic treatment.

These results indicate that a light catalyst having an excellent adhesiveness of a light catalyst component to a porous substrate can be obtained according to the present invention.

Embodiment 13

A further different coated material as a light catalyst was discussed in each of Example and Comparative of this embodiment.

EXAMPLE E131

An isopropanol solution {3.5 mol/l} in which titanium isopropoxide {Ti(iso-PrO)$_4$} as a light catalyst precursor was dissolved was prepared.

Then, in the presence of a silica bead (particle size 5 μm) as a porous substrate, the isopropanol solution obtained above was dissolved in a supercritical carbon dioxide (150° C., 361 atms).

By keeping the mixture in this condition for 3 hours, TiO$_2$ film was coated on the surface of the silica bead. Then the supercritical fluid was removed under a reduced pressure and the substrate was dried at room temperature for 10 hours.

Subsequently, a heat treatment under a nitrogen flow was conducted for 30 minutes at 500° C.

Consequently, a light catalyst of Example E131 having a TiO$_2$ film formed on the silica bead was obtained.

COMPARATIVE C131

An isopropanol solution in which titanium isopropoxide {Ti(iso-PrO)$_4$} as a light catalyst precursor was dissolved was prepared.

Then a silica bead (particle size 5 μm) was added to the isopropanol solution obtained above and dispersed ultrasonically.

To this mixture, 50% by weight of an aqueous solution of isopropanol was added with stirring. This solution contained water in an amount equivalent to that in the hydrolysis of the alkoxide.

Subsequently, the solvent was evaporated and dried off and the substrate was heated under nitrogen flow for 30 minutes at 500° C., and then a light catalyst of Comparative C131 which had a TiO$_2$ film formed on the silica bead was obtained.

The light transmission of the light catalysts of Example E131 and Comparative C131 produced as described above were evaluated.

The light transmission was evaluated by determining the transmittance at a wavelength ranging from 200 to 700 nm. The results of the determination are shown in FIG. 23.

Figure 23:
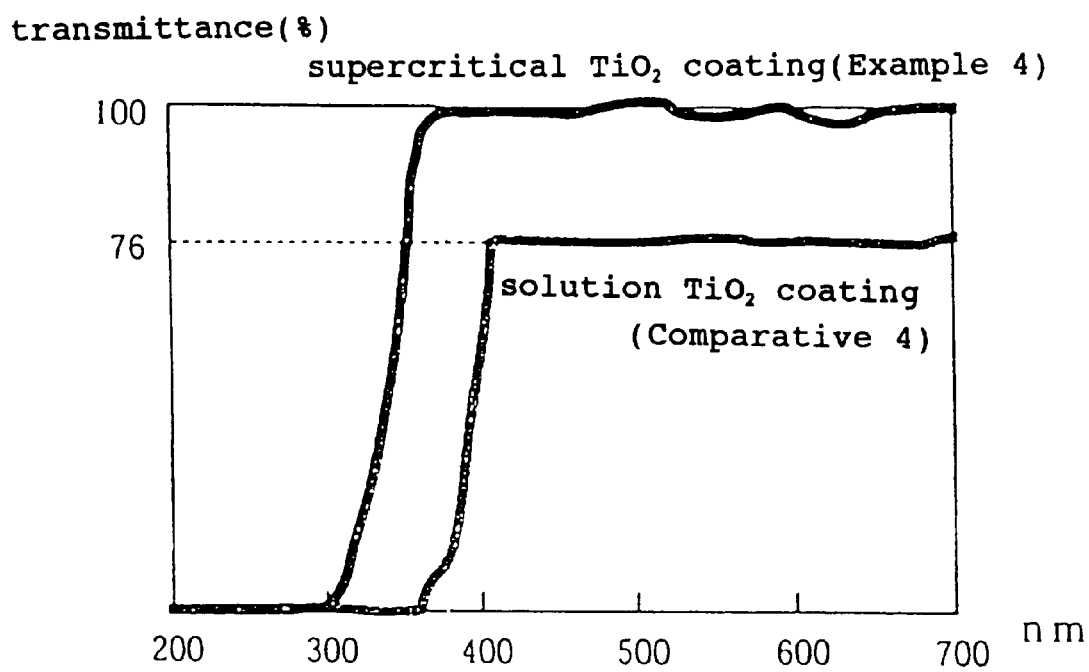
FIG. 23 is a graphical representation indicating the ratio of the transmittance of the light catalysts of Example E131 and Comparative C131 in Embodiment 13.

As evident from FIG. 23, the transmittance of the light catalyst of Comparative C131 was limited to 76%, while that of Example E131 was as high as about 100%.

The light catalyst of Comparative C131 exhibited almost no transmission of a light at a wavelength of about 350 nm or less, and showed a transmittance as high as 76% only at a wavelength exceeding 400 nm.

On the contrary, the light catalyst of Example E131 allowed a light at a wavelength exceeding 300 nm to be transmitted, and showed a transmittance exceeding 76% at any wavelength exceeding about 350 nm.

Thus, the light catalyst of Example E131 had an excellent transmittance, which gave a large surface area of the light-facing region, resulting in an improved catalyst reaction efficiency.

These results indicate that a light catalyst having an excellent catalyst reaction efficiency can be obtained according to the present invention.

Embodiment 14

This embodiment relates to a dye-sensitized solar cell and is discussed with reference to FIG. 24 to FIG. 29.

In this embodiment, dye-sensitized solar cells of three examples according to the present invention (E141 to E143) and a comparative C141 were produced and their properties were compared.

Figure 24:
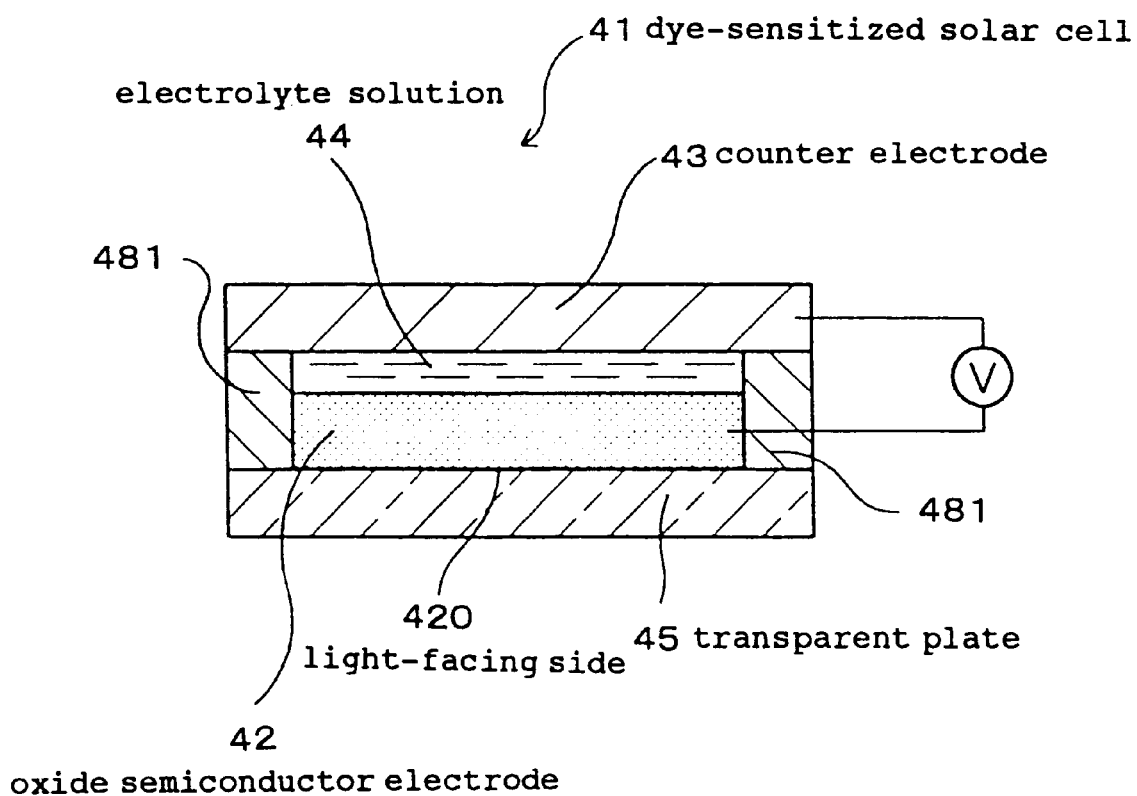
FIG. 24 is an explanatory view illustrating the structure of a dye-sensitized solar cell in Embodiment 14.

Each of the dye-sensitized solar cells 41 of Examples E141 to E143 comprises an oxide semiconductor electrode 42 and a counter electrode 43 between which an electrolyte fluid 44 is contained together with a transparent plate 45 provided on a light-facing side 420 of the oxide semiconductor electrode 42, as shown in FIG. 24.

Figure 25A:
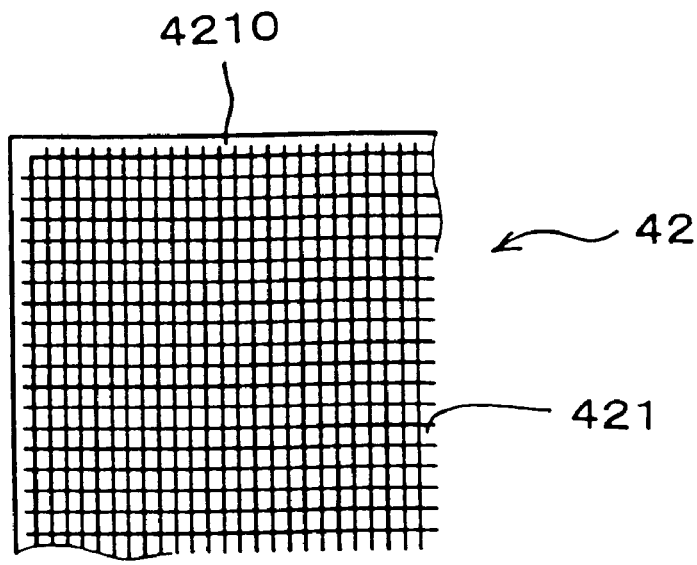
FIG. 25A is an explanatory view of the configuration of a titanium fiber network of an oxide semiconductor electrode in Embodiment 14.
Figure 25B:
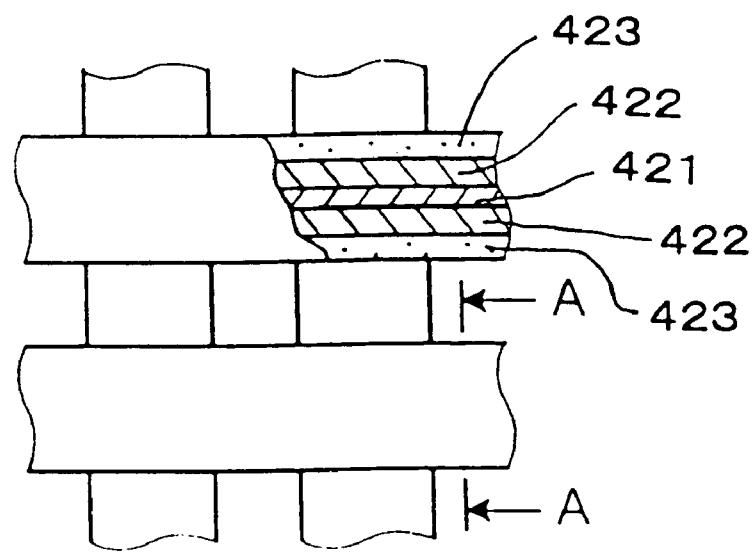
FIG. 25B is an explanatory view of an oxide semiconductor electrode in Embodiment 14 as focused on an important part.
Figure 25C:
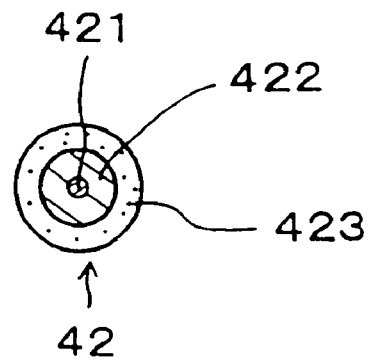
FIG. 25C is a sectional view, corresponding to FIG. 25B, by a line A—A observed in the direction of the arrow.
Figure 26:
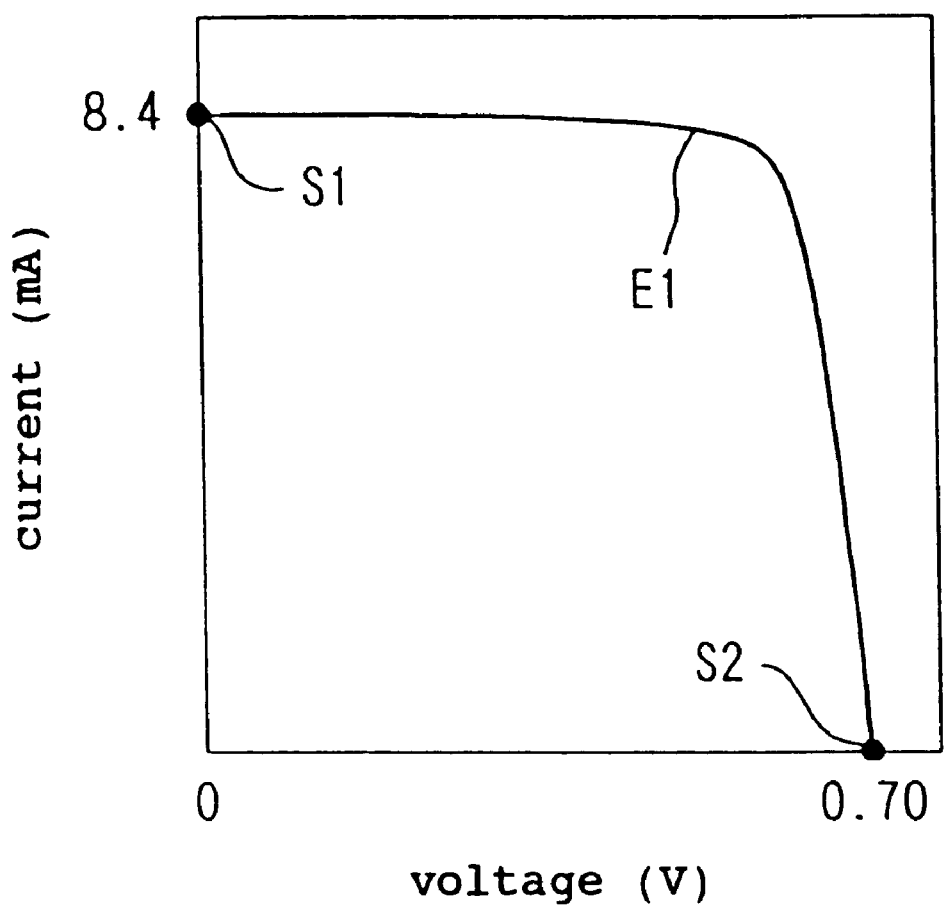
FIG. 26 is a scheme illustrating the relationship between the current and the voltage in Example E141 in Embodiment 14.
Figure 27:
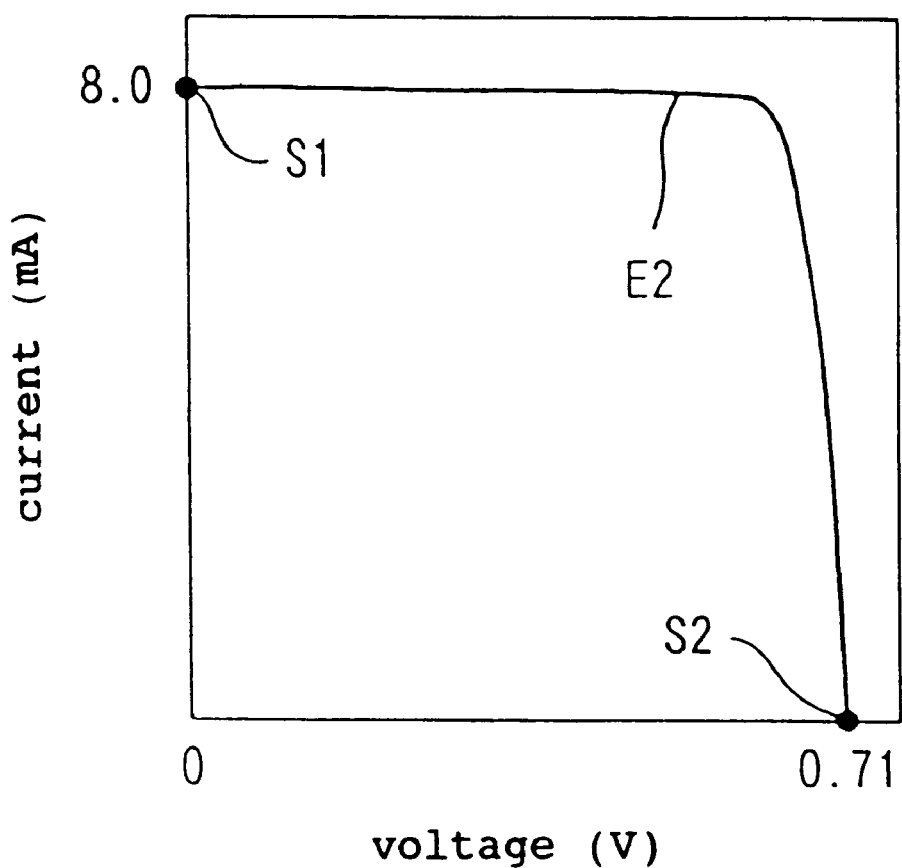
FIG. 27 is a scheme illustrating the relationship between the current and the voltage in Example E142 in Embodiment 14.
Figure 28:
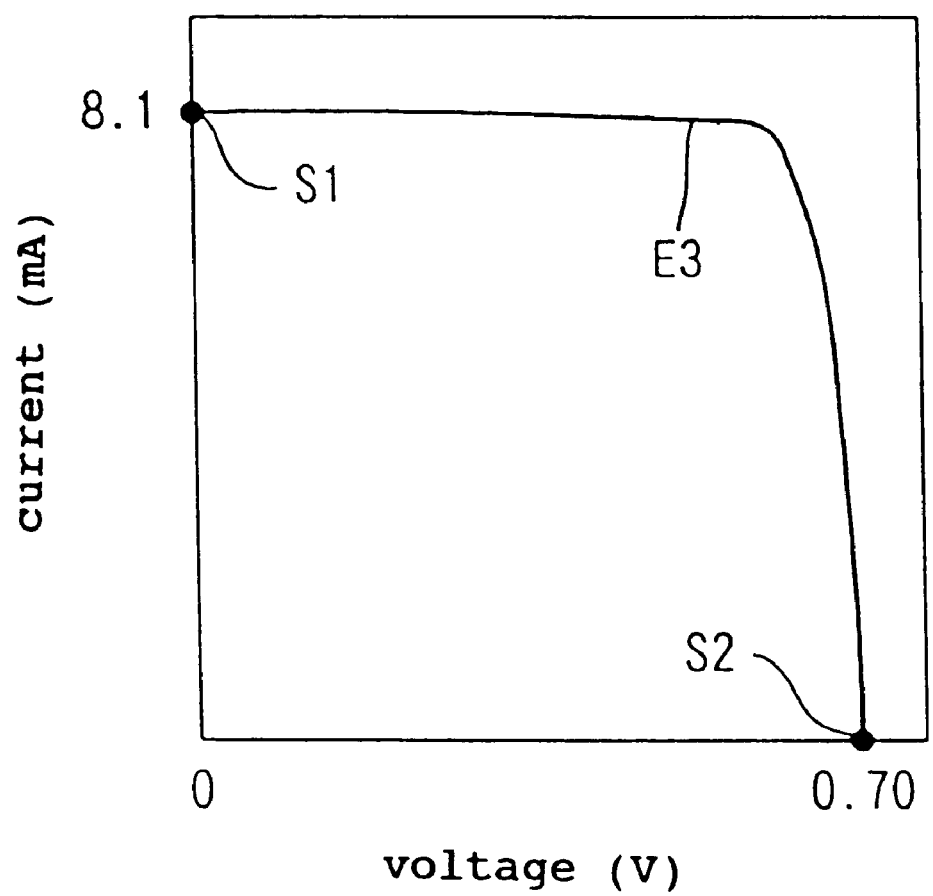
FIG. 28 is a scheme illustrating the relationship between the current and the voltage in Example E143 in Embodiment 14.
Figure 29:
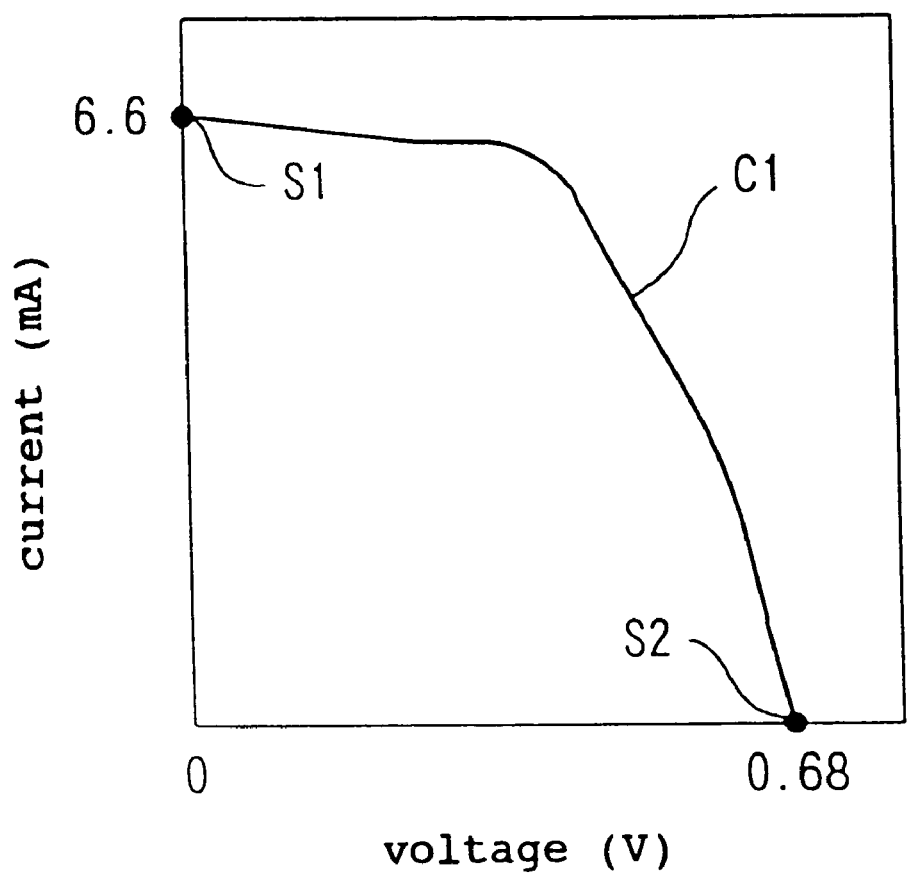
FIG. 29 is a scheme illustrating the relationship between the current and the voltage in Comparative C141 in Embodiment 14.

The oxide semiconductor electrode 42 has an oxide semiconductor 422 coated on the surface of a conductive center electrode 421 and a dye 423 provided on the surface of the oxide semiconductor 422, as shown in FIG. 25A to FIG. 25C. The dye-sensitized solar cell 41 is designed to allow an electron to be isolated from the center electrode 421.

The methods for producing the cells of Examples E141 to E143 are detailed below together with their structures.

EXAMPLE E141

For producing an oxide semiconductor electrode 42, a cathode-oxidized titanium fiber net is first provided as a center electrode 421 as shown in FIG. 25A to FIG. 25C. The titanium fiber net 421 is provided by placing a titanium fiber having a diameter of about 0.1 mm in a network. An outer frame 4210 of the titanium fiber net is also made from titanium, and designed to allow an electron to be isolated therefrom.

The formation of the oxide semiconductor 422 on the surface of the titanium fiber net 421 was performed by a supercritical coating method.

Thus, in the presence of the titanium fiber net 421, an isopropanol solution in which titanium isopropoxide {Ti(iso-PrO)$_4$} as a precursor was dissolved at the concentration of 3.5 mol/l was dissolved in a supercritical carbon dioxide (150° C., 374 atms). The mixture was kept in this condition for 3 hours.

As a result, the supercritical carbon dioxide containing the precursor was bound extremely uniformly on the surface of the titanium fiber net 421.

Subsequently, the supercritical carbon dioxide was removed under a reduced pressure. After drying at room temperature for 10 hours, a heat treatment was performed under an air flow at 450° C. for 30 minutes, and then TiO$_2$ film as the oxide semiconductor 422 was formed on the titanium fiber net 421.

Then the dye 423 was placed on the TiO$_2$ film 422 as described below.

First, a solution of a ruthenium complex (cis-dithiocyanato)-N,N'-bis(2,2'-bipyridyl-4,4'-dicarboxylic acid)-ruthenium (II)) dissolved at the concentration of 2.85× $10^{-4}$ mol/l in an absolute ethanol obtained by dehydration with magnesium ethoxide was prepared. In this solution, the titanium fiber net 421 having the TiO$_2$ film 422 formed thereon was immersed for 24 hours thereby absorbing the ruthenium complex as the dye 422. As a result, the oxide semiconductor electrode 42 was obtained.

Then, as shown in FIG. 24, the transparent plate 45 made from a soda glass was provided on the light-facing side 420 of the oxide semiconductor electrode 42 obtained as described above, and a spacer 481 was sandwiched between the oxide semiconductor electrode 42 and the counter electrode 43 (10 mm×10 mm) which had separately been prepared and consisted of a metal plate to form a gap. In this gap, an electrolyte solution 44 was penetrated to obtain the dye-sensitized solar cell 41.

The electrolyte solution 44 was made by dissolving 3.13 g of tetra n-propylammonium iodide and 0.18 g of iodine in the solvent mixture of 21.14 g of ethylene carbonate and 4.0 ml of acetonitrile.

EXAMPLE E142

Example E142 is a modification of Example E141 and employs a different precursor in the supercritical coating method for forming an oxide semiconductor 22.

Thus, a similar titanium fiber net 421 was provided, and in the presence of this net, an n-butanol solution {2.9 mol/l} in which titaniumn n-butoxide {Ti(n-BuO)$_4$} as a precursor was dissolved in a supercritical carbon dioxide (150° C., 371 atms). The mixture was kept in this condition for 3 hours.

Subsequently, the supercritical carbon dioxide was removed under a reduced pressure, and the net was dried at room temperature for 10 hours. Then, a heat treatment was performed under an air flow at 450° C. for 30 minutes to form a TiO$_2$ film 422 on the titanium fiber net 421.

Otherwise similarly to Example E141, a dye-sensitized solar cell 41 was produced.

EXAMPLE E143

Example E143 is also a modification of Example E143 and employs a liquid phase coating method for forming the oxide semiconductor 422.

A titanium isopropoxide solution was first prepared in the composition of titanium isopropoxide:isopropanol:ion exchange water=2:20:60 (molar ratio).

Then the titanium fiber net 421 similar to that in the above example was provided and immersed in the titanium isopropoxide solution and kept at room temperature for 18 hours with stirring. Subsequently, the titanium fiber net 421 was taken out and washed with water and then dried at room temperature for 10 hours. Then, a heat treatment was performed under an air flow at 450° C. for 30 minutes to form a TiO$_2$ film 46 on the titanium fiber net 421.

Otherwise similarly to Example E141, the dye-sensitized solar cell 41 was produced.

COMPARATIVE C141

Figure 30:
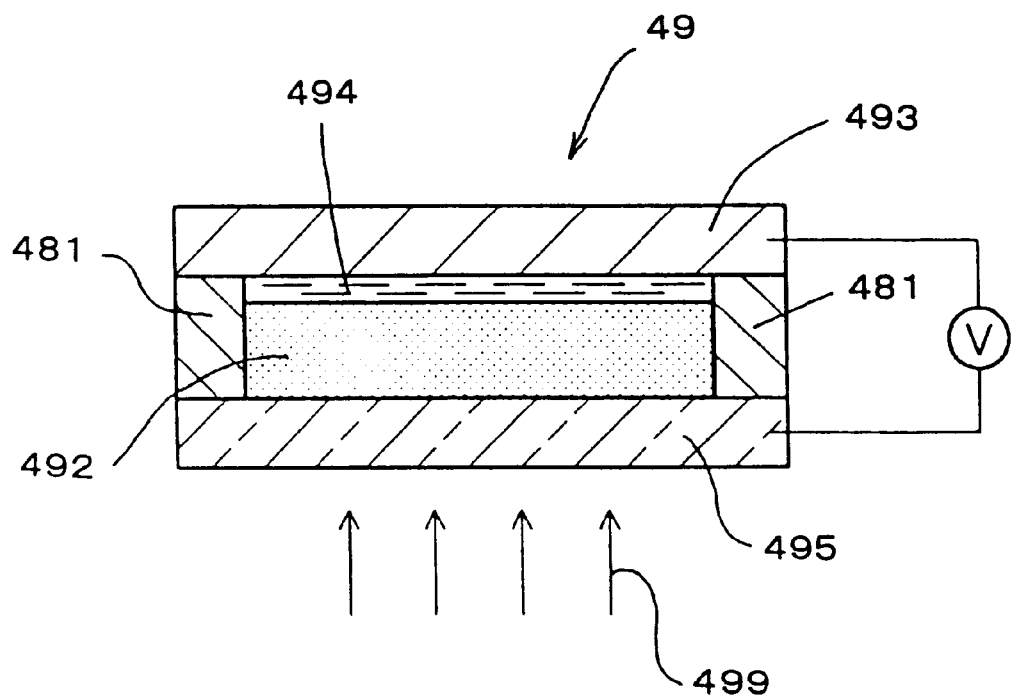
FIG. 30 is an explanatory view of the structure of a dye-sensitized solar cell of a conventional art in Embodiment 14.
Figure 31:
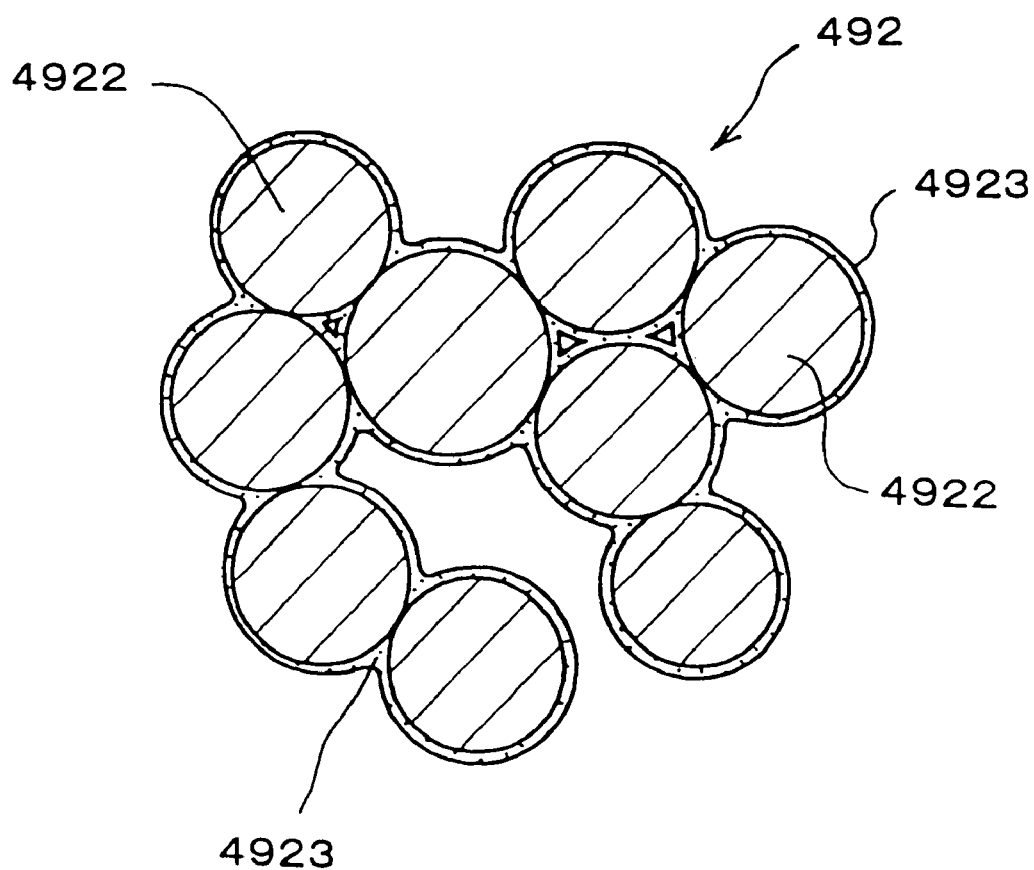
FIG. 31 is an explanatory view of the structure of an oxide semiconductor electrode of a conventional art in Embodiment 14.

An oxide semiconductor electrode 49 of Comparative C141 was formed differently from Examples E141 to E143 described above. Thus, as shown in FIG. 30 and FIG. 31, a dye-sensitized solar cell 49 has a transparent electrode 495 provided on the light-facing side of an oxide semiconductor electrode 492, facing which a counter electrode 493 is also provided together with a spacer 481, with which a gap is formed between the electrodes, in which an electrolyte fluid 494 is filled. The oxide semiconductor electrode 492 is obtained by aggregate TiO$_2$ particles into a porous article and has a dye 4923 on the surface thereof, as shown in FIG. 31.

To produce the oxide semiconductor electrode 492 in Comparative C141, a TiO$_2$ particle (P25, Nippon Aerosil Co., Ltd.) was provided and admixed at the concentration of 37.5% by weight with the solvent consisting of ion exchange water:acetylacetone:surfactant (polyethylene glycol mono-4-octylphenylether)=100:2:1 (volume ratio) to form a TiO$_2$-containing solution.

Then, a fluorine-doped SnO$_2$-coated glass (ASAHI GLASS) as the transparent electrode 495 was provided and a 10 mm×10 mm area of the surface was coated with the TiO$_2$-containing solution obtained above. Then, after drying at room temperature for 10 hours, a heat treatment was performed under an air flow at 450° C. for 30 minutes. In this manner, a TiO$_2$ film 492 as an oxide electrode was formed on the fluorine-doped SnO$_2$-coated glass 495.

Subsequently, in order to place the dye 493 on the TiO$_2$ film 492, a solution of a ruthenium complex dissolved at the concentration of 2.85×10$^{-4}$ mol/l in an absolute ethanol obtained by dehydration with magnesium ethoxide was prepared, and in this solution, the fluorine-doped SnO$_2$-coated glass 495 having the TiO$_2$ film 492 formed thereon was immersed for 24 hours thereby absorbing the ruthenium complex (dye) 493. Otherwise similarly to Example E141, an oxide semiconductor electrode 49 was obtained.

In this embodiment, the properties of the dye-sensitized solar cells (E1–E3, C1) were compared. Specifically, each dye-sensitized solar cell was irradiated with a pseudo-sunlight at 730 W/m$^2$ using a solar simulator (WXS-85, manufactured by WACOM DENSO) and the relationship between the current and the voltage upon sweeping the voltage using a potentiostat was determined.

The results of the determination are shown in FIG. 26 to FIG. 29. In these Figures, the voltage (V) was on the abscissa and the current (mA) was on the ordinate. The results of Example E141, Example E142, Example E143 and Comparative C141 are shown in FIG. 26, FIG. 27, FIG. 28 and FIG. 29, respectively.

Based on the data obtained above, the energy conversion efficiency and the curve factor were obtained. The energy conversion efficiency is represented by (maximum output× 100)/(incident light energy). Thecurve factor is represented by (maximum output)/(short current×release voltage). The short current was designated by S1 and the release voltage was designated by S2 in FIG. 26 to FIG. 29.

The curve factor is an index for the performance of a solar cell similarly to the energy conversion efficiency, and a higher value is more preferred.

The energy conversion efficiency and the curve factor of each dye-sensitive solar cell are shown in Table 6.

TABLE 6

| Items | Energy conversion efficiency (%) | Curve factor |
| --- | --- | --- |
| Example E161 | 5.7% | 0.73 |
| Example E162 | 5.5% | 0.72 |
| Comparative C161 | 3.0% | 0.49 |

As evident from FIG. 26 to FIG. 29 and Table 6, each of Examples E141 to E143 according to the present invention exhibited the energy conversion efficiency and the curve factor both of which were far more excellent than those of Comparative C141. Accordingly, the aspect specific to the present invention provides an increased energy conversion efficiency of a dye-sensitive solar cell and a high current.

In addition, an inventive article (Examples E141 to E143) allows the production cost to be reduced substantially when compared with a conventional one (Comparative 141) since it requires no transparent electrode.

Embodiment 15

This embodiment relates to a coated material as an oxide semiconductor electrode for a solar cell and is discussed with reference to FIG. 32 to FIG. 37.

In this embodiment, two production methods according to the present invention (Example E151, Example E152) and two conventional production methods for comparison (Comparative C151, Comparative C152) were employed to produce oxide semiconductor electrodes for solar cells. The oxide semiconductor electrodes thus obtained were employed to form dye-sensitive solar cells, whose properties were compared with each other.

Examples E151 and E152 and Comparatives C151 and C152 are detailed below.

EXAMPLE E151

Figure 33:
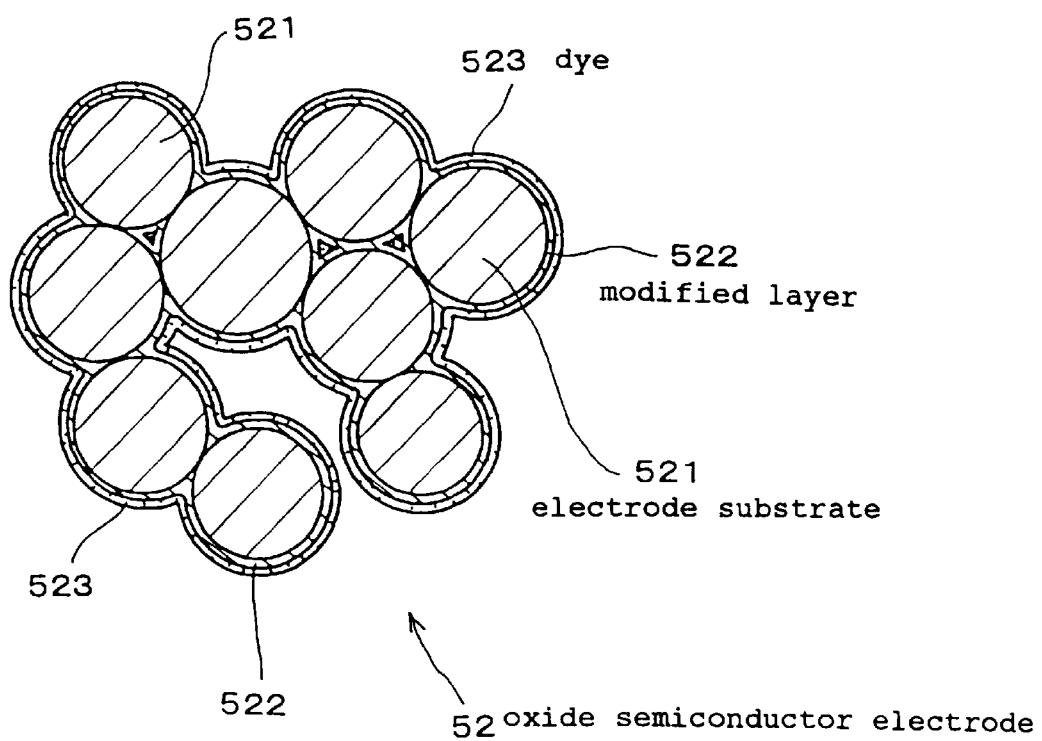
FIG. 33 is an explanatory view of the structure of an oxide semiconductor electrode in Embodiment 15.
Figure 34:
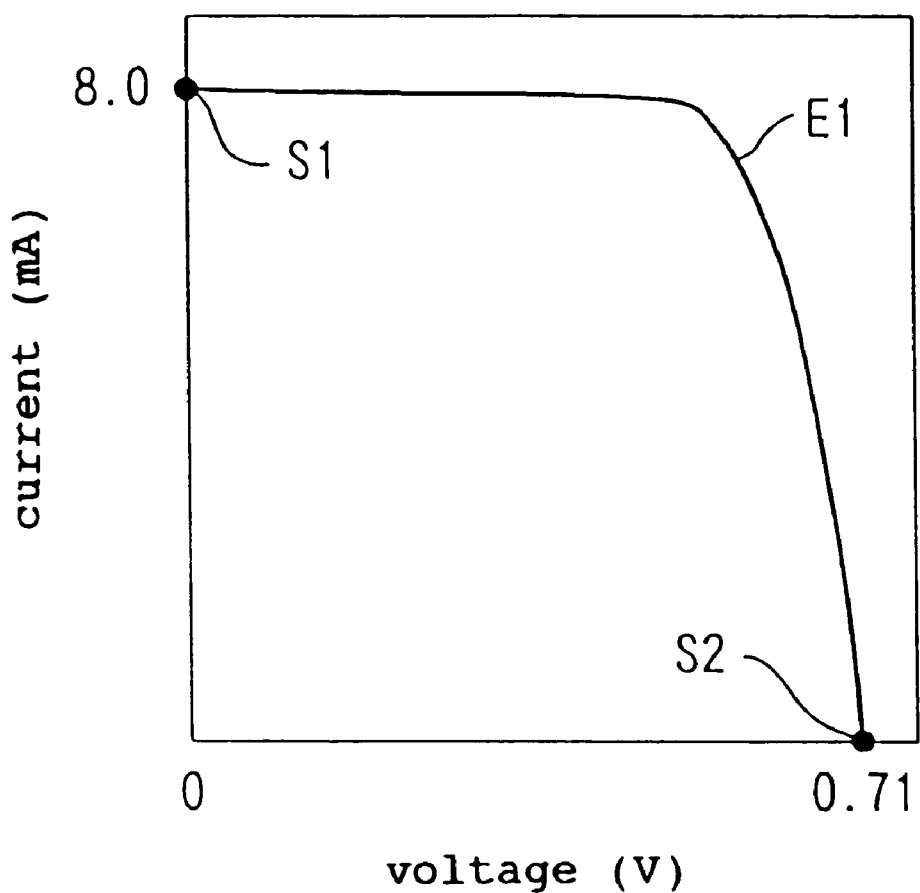
FIG. 34 is a scheme illustrating the relationship between the current and the voltage in Example E151 in Embodiment 15.
Figure 35:
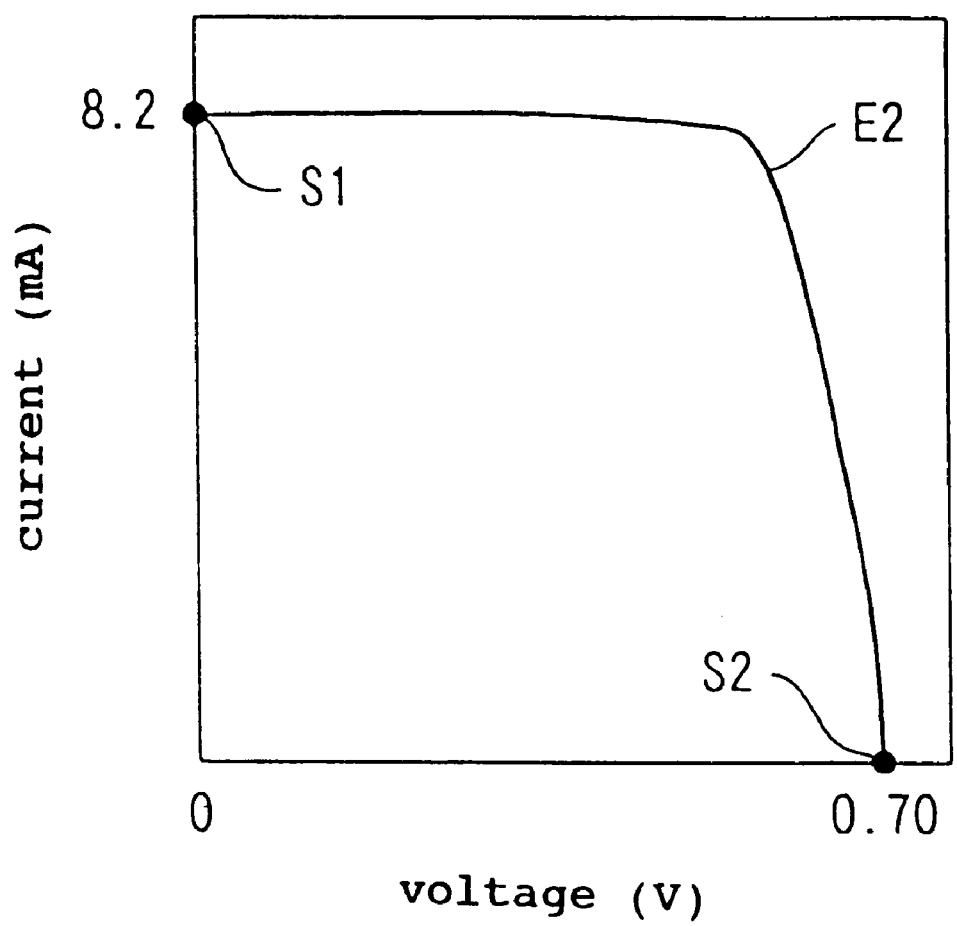
FIG. 35 is a scheme illustrating the relationship between the current and the voltage in Example E152 in Embodiment 15.
Figure 36:
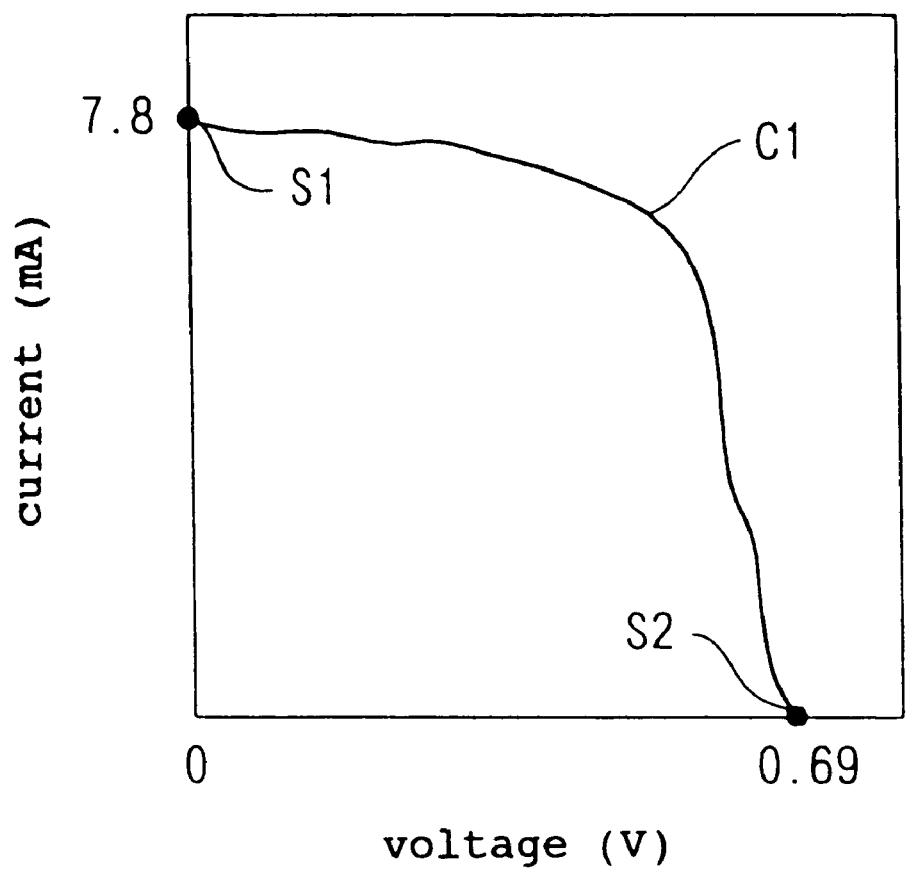
FIG. 36 is a scheme illustrating the relationship between the current and the voltage in Comparative C151 in Embodiment 15.
Figure 37:
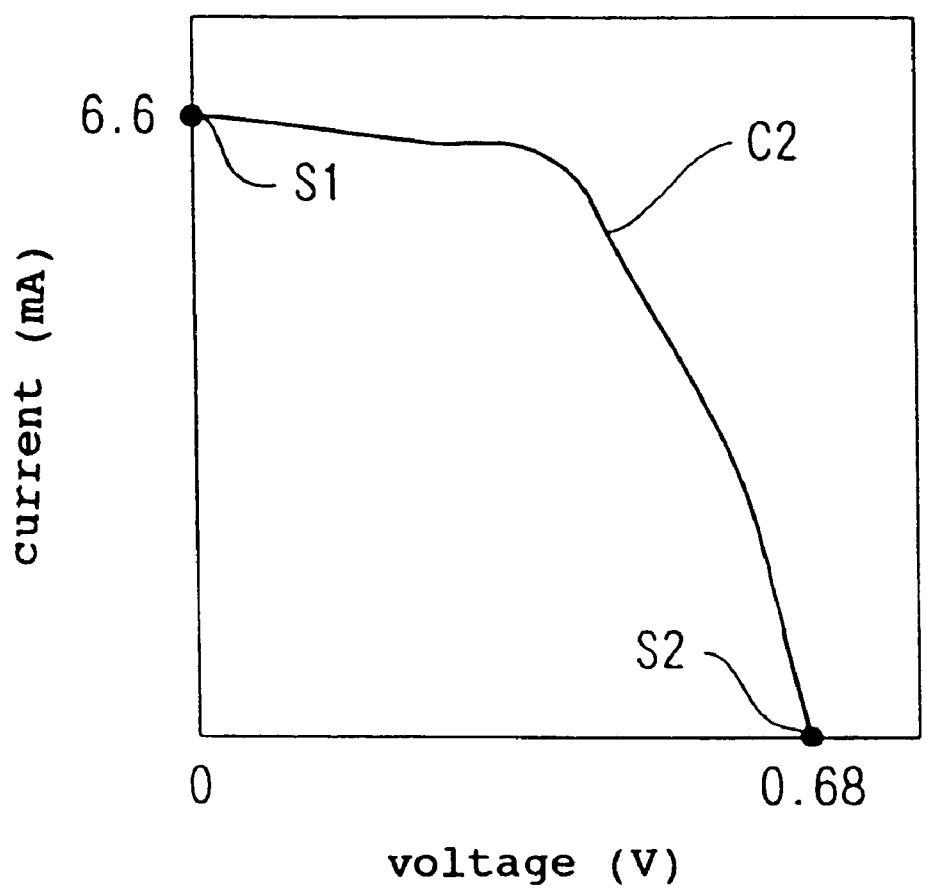
FIG. 37 is a scheme illustrating the relationship between the current and the voltage in Comparative C152 in Embodiment 15.

In this example which is shown in FIG. 33, a supercritical fluid containing a precursor dissolved therein is brought into contact with an electrode substrate 521 consisting of a porous oxide semiconductor, and then the precursor is allowed to be precipitated as an oxide to form a modified layer 522 on the surface of the electrode substrate, and then a dye 523 is placed on the modified layer 522, thereby producing an oxide semiconductor electrode 52 for a solar cell consisting of an electrode substrate 521, the modified layer 522 and the dye 523.

To produce the electrode substrate 521, a $TiO_2$ particle (P25, Nippon Aerosil Co., Ltd.) was provided and admixed at the concentration of 37.5% by weight with the solvent consisting of ion exchange water:acetylacetone:surfactant (polyethylene glycol mono-4-octylphenylether)=100:2:1 (volume ratio) to form a $TiO_2$-containing solution.

Then, a fluorine-doped $SnO_2$-coated glass (ASAHI GLASS) as a transparent electrode 55 was provided and a 10 mm×10 mm area of the surface was coated with the $TiO_2$-containing solution obtained above. Then, after drying at room temperature for 10 hours, a heat treatment was performed under an air flow at 450° C. for 30 minutes. In this manner, the electrode substrate 521 ($TiO_2$) consisting of a porous oxide semiconductor was formed on the fluorine-doped $SnO_2$-coated glass.

Then, in the presence of the electrode substrate 521, an isopropanol solution in which titanium isopropoxide {Ti(iso-PrO)$_4$} as a precursor was dissolved at the concentration of 3.5 mol/l was dissolved in a supercritical carbon dioxide (150° C., 374 atms). The mixture was kept in this condition for 3 hours.

As a result, the supercritical carbon dioxide containing the precursor was bonded extremely uniformly on the surface of the porous electrode substrate 521.

Subsequently, the supercritical carbon dioxide was removed under a reduced pressure. After drying at room temperature for 10 hours, a heat treatment was performed under an air flow at 450° C. for 30 minutes. As a result, the modified layer 522 consisting of $TiO_2$ was formed uniformly on the electrode substrate 521.

Then the dye 523 was placed on the modified layer 522 consisting of $TiO_2$ as described below.

First, a solution of a ruthenium complex (cisdithiocyanato-N,N'-bis(2,2'-bipyridyl-4,4'-dicarboxylic acid)-ruthenium (II)) dissolved at the concentration of 2.85×$10^{-4}$ mol/l in an absolute ethanol obtained by dehydration with magnesium ethoxide was prepared. In this solution, the electrode substrate 521 having the modified layer 522 formed thereon was immersed for 24 hours thereby absorbing the ruthenium complex as the dye 522. As a result, an oxide semiconductor electrode 52 for a solar cell was obtained.

EXAMPLE E152

Example E152 is a modification of Example E151 and employs a different precursor in the supercritical coating method for forming the modified layer 522.

Thus, a similar electrode substrate 521 was provided, and in the presence of this substrate, an n-butanol solution {2.9 mol/l} in which titanium n-butoxode {Ti(n-BuO)$_4$} was dissolved in a supercritical carbon dioxide (150° C., 371 atms). The mixture was kept in this condition for 3 hours.

Subsequently, the supercritical carbon dioxide was removed under a reduced pressure, and the substrate was dried at room temperature for 10 hours. Then, a heat treatment was performed under an air flow at 450° C. for 30 minutes to form the modified layer 522 on the electrode substrate 521.

Otherwise similarly to Example E151, an oxide semiconductor electrode 52 was produced.

COMPARATIVE C151

In Comparative C151, a conventional surface treatment employing an aqueous solution of titanium tetrachloride was performed instead of a supercritical coating method employed in Example E151 for forming the modified layer 522.

Thus, the electrode substrate 521 was prepared in the manner similar to that described above. Then, the modified layer 522 was formed by adding 50 µl of a 0.2 mol/l aqueous solution of titanium tetrachloride dropwise to the electrode substrate 521 followed by allowing to stand for 10 hours at room temperature in a tightly closed container to effect hydrolysis partially. Subsequently, unreacted titanium tetrachloride was washed off with an ion exchange water. Then, a heat treatment was performed under an air flow at 450° C. for 30 minutes to form the modified layer 522 consisting of $TiO_2$.

Otherwise similarly to Example E151, an oxide semiconductor electrode was produced.

COMPARATIVE C152

In Comparative C152, the formation of the modified layer 522 performed in Example E151 was not performed.

Thus, on the electrode substrate 521 prepared in the manner similar to that described above, the dye 523 was placed directly in the manner similar to that described above.

Otherwise similarly to Example E151, an oxide semiconductor electrode was produced.

Using each of the oxide semiconductor electrode produced by the methods described above (Examples E151, E152, Comparatives C151, C152), a dye-sensitized solar cell 1 was formed.

Figure 32:
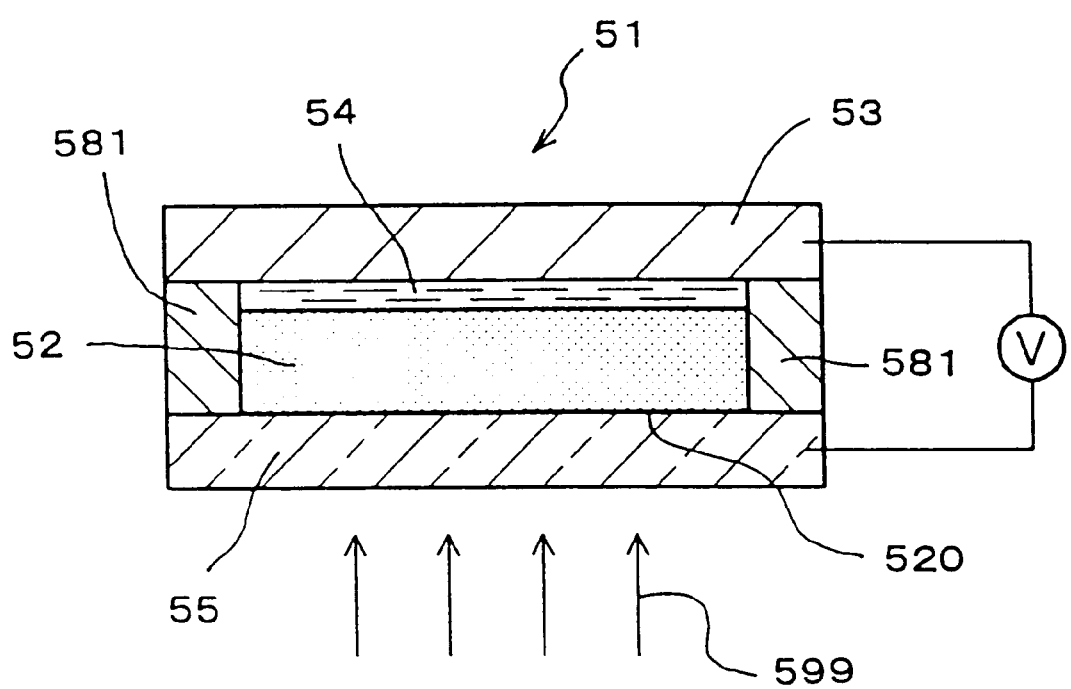
FIG. 32 is an explanatory view of the structure of a dye-sensitized solar cell in Embodiment 15.

As shown in FIG. 32, with the transparent electrode 55 outside, the oxide semiconductor electrode 52 was placed to face counter the electrode 53 (10 mm×20 mm) consisting of a fluorine-doped $SnO_2$-coated glass having a vapor-deposited 50 Å platinum layer which had separately been prepared. Between them, a spacer 581 was sandwiched to create a gap. In this gap, an electrolyte solution 54 was penetrated to obtain a dye-sensitized solar cell 51.

The electrolyte solution 54 was made by dissolving 3.13 g of tetra n-propylammonium iodide and 0.18 g of iodine in the solvent mixture of 21.14 g of ethylene carbonate and 4.0 ml of acetonitrile.

In this embodiment, the properties of dye-sensitized solar cell 51 formed with each oxide semiconductor electrode described above were compared with each other. Specifically, each dye-sensitized solar cell 51 was irradiated with a pseudo-sunlight at 730 W/m² using a solar simulator (WXS-85, manufactured by WACOM DENSO) and the relationship between the current and the voltage upon sweeping the voltage using a potentiostat was determined.

The results of the determination are shown in FIG. 34 to FIG. 37. In these Figures, the voltage (V) was on the abscissa and the current (mA) was on the ordinate. The results of Example E151, Example E152, Comparative C151 and Comparative C152 are shown in FIG. 34, FIG. 35, FIG. 36 and FIG. 37, respectively.

Based on the data obtained above, the energy conversion efficiency and the curve factor were obtained. The energy conversion efficiency is represented by (maximum output× 100)/(incident light energy). The curve factor is represented by maximum output/(short current×release voltage). The short current was designated by S1 and the release voltage was designated by S2 in FIG. 34 to FIG. 37.

The curve factor is an index for the performance of a solar cell similarly to the energy conversion efficiency, and a higher value is more preferred.

The energy conversion efficiency and the curve factor of each dye-sensitive solar cell are shown in Table 7.

TABLE 7

|  | Energy conversion efficiency (%) | Curve factor |
| --- | --- | --- |
| Example E151 | 5.6% | 0.72 |
| Example E152 | 5.5% | 0.70 |
| Comparative C151 | 4.3% | 0.59 |
| Comparative C152 | 3.0% | 0.49 |

As evident from FIG. 34 to FIG. 37 and Table 7, Comparative C152 having no modified layer exhibited the lowest energy conversion efficiency. When comparing Examples E151 and E152 with Comparative C151, it was revealed that the increases in the energy conversion efficiency and in the curve factor was attributable not only to the formation of the modified layer itself but also to the formation of the modified layer by the utilization of the supercritical coating method, which was thus very useful for improving the performance of a solar cell.

Embodiment 16

This embodiment relates to a coated material as a further different oxide semiconductor electrode for a solar cell and is discussed with reference to FIG. 38A to FIG. 43.

In this embodiment, two production methods according to the present invention (Example E161, Example E162) and a conventional production method for comparison (Comparative C161) were employed to produce oxide semiconductor electrodes for solar cells. The oxide semiconductor electrodes thus obtained were employed to form dye-sensitive solar cells, whose properties were compared with each other.

Examples E161 and E162 and Comparative C161 are detailed below.

EXAMPLE E161

In this example which is shown in FIG. 38A to FIG. 38D, an oxide semiconductor was precipitated or coated on a substrate 87 having a high specific surface area to form an oxide semiconductor layer 821 and then after removal of the substrate 87, a dye 823 was placed on the oxide semiconductor layer 821 to obtain a solar cell consisting of the oxide semiconductor electrode 82 and the oxide semiconductor layer 821 and the dye 823.

Figure 38A:
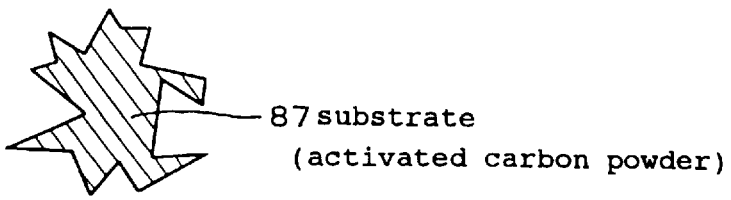
FIG. 38A is an explanatory view of a substrate in the course of the production of an oxide semiconductor layer in Embodiment 16.

For preparation of the oxide semiconductor layer 821, a large number of activated carbon particles (M30, manufactured by Osaka Gas Co., Ltd.) as the substrate 87 were provided as shown in FIG. 38A. This activated carbon particle was a porous material whose specific surface area was 3100 m$^2$/g.

Then, in the presence of the activated carbon powder 87, an isopropanol solution in which titanium isopropoxide {Ti(iso-PrO)$_4$} as a precursor was dissolved at the concentration of 3.5 mol/l was dissolved in a supercritical carbon dioxide (150° C., 374 atms). The mixture was kept in this condition for 3 hours.

Figure 38B:
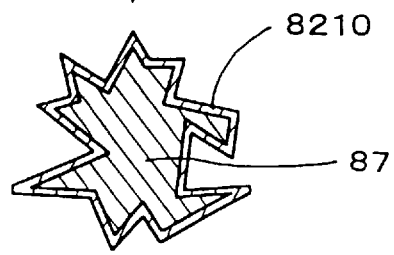
FIG. 38B is an explanatory view illustrating a condition in which a substrate is in contact with a supercritical fluid in the course of the production of an oxide semiconductor layer in Embodiment 16.

As a result, as shown in FIG. 38B, a supercritical carbon dioxide 8210 containing the precursor was brought into an extremely uniform contact with the surface of the porous activated carbon powder 87 (including the wall inside of a micropore).

Figure 38C:
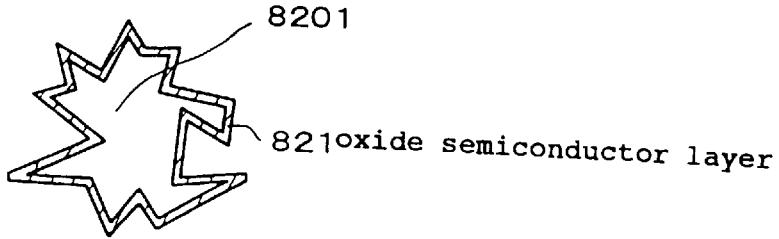
FIG. 38C is an explanatory view illustrating a condition in which an oxide semiconductor layer is formed in the course of the production of an oxide semiconductor layer in Embodiment 16.

Subsequently, the supercritical carbon dioxide was removed under a reduced pressure. After drying at room temperature for 10 hours, a heat treatment was performed under an air flow at 570° C. for 10 hours. As a result, the oxide semiconductor layer 821 consisting of TiO$_2$ and having a high specific surface are was formed and the activated carbon powder as the substrate 87 was burnt off as shown in FIG. 38C. Inside of the oxide semiconductor layer 821, a hollow 8201 was created as a cavity in which the substrate 87 had been contained before burning.

Subsequently in this example, the oxide semiconductor layer 821 consisting of TiO$_2$ was admixed at the concentration of 37.5% by weight with the solvent consisting of ion exchange water:acetylacetone:surfactant (polyethylene glycol mono-4-octylphenylether)=100:2:1 (volume ratio) to form a TiO$_2$-containing solution.

Figure 39A:
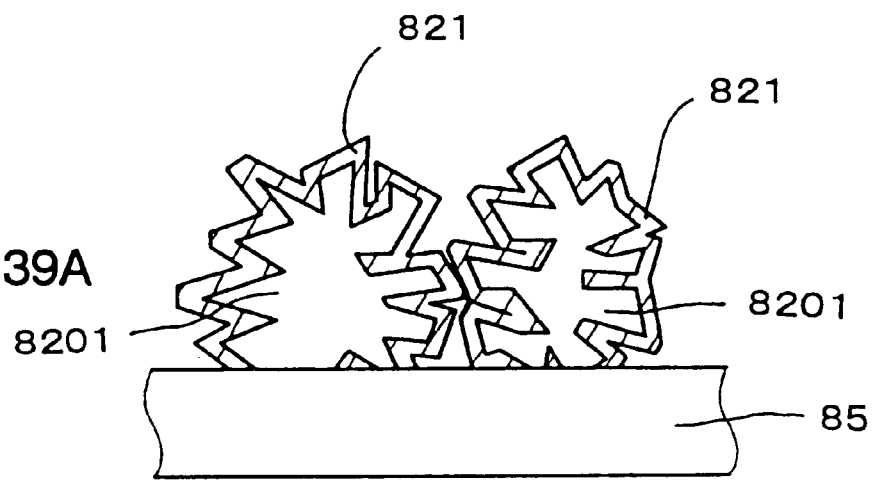
FIG. 39A is an explanatory view illustrating a condition in which an oxide semiconductor layer is placed on a transparent electrode in the course of the production of an oxide semiconductor electrode in Embodiment 16.

Then, a fluorine-doped SnO$_2$-coated glass (ASAHI GLASS) as a transparent electrode 85 was provided and a 10 mm×10 mm area of the surface was coated with the TiO$_2$-containing solution obtained above. Then, after drying at room temperature for 10 hours, a heat treatment was performed under an air flow at 450° C. for 30 minutes. As a result, the oxide semiconductor layer 821 having a high specific surface are was formed on the transparent electrode 85 as shown in FIG. 39A.

Figure 38D:
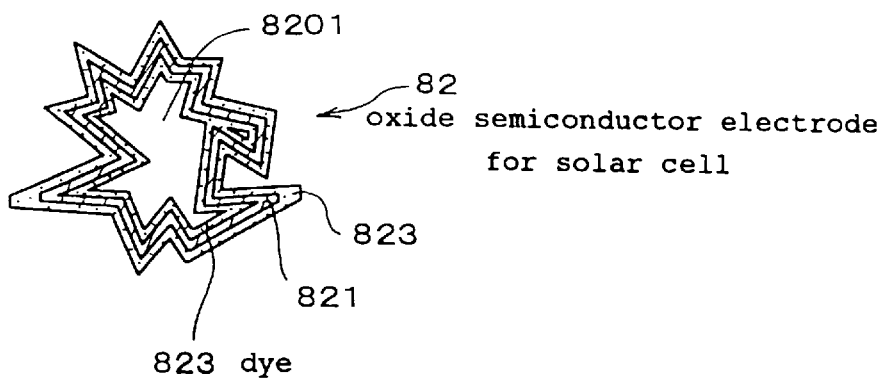
FIG. 38D is an explanatory view illustrating a condition in which a dye is placed in the course of the production of an oxide semiconductor layer in Embodiment 16.
Figure 39B:
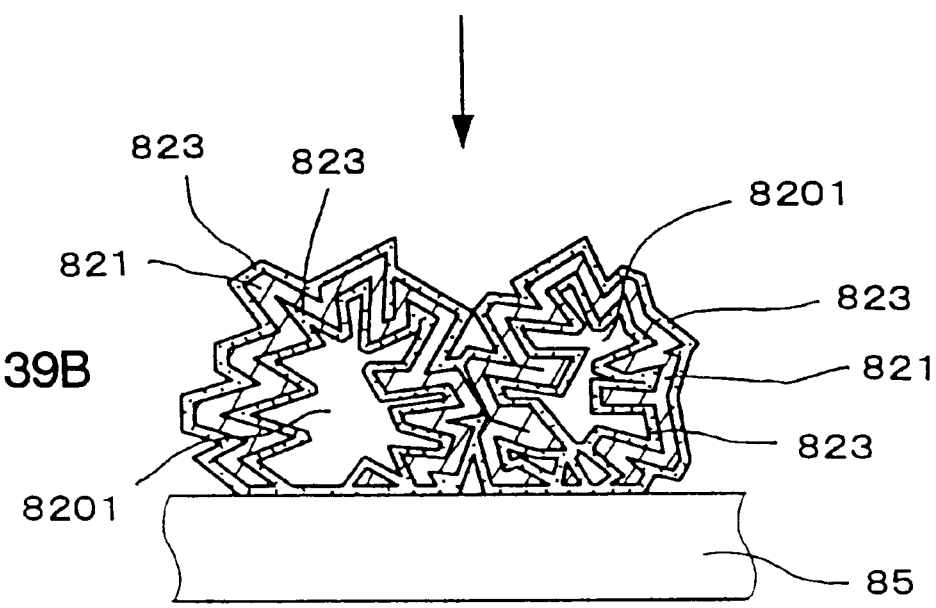
FIG. 39B is an explanatory view illustrating a condition in which a dye is placed on an oxide semiconductor layer in the course of the production of an oxide semiconductor electrode in Embodiment 16.

Then, the dye 823 was placed on the oxide semiconductor layer 821 as described below and as shown in FIG. 38D and FIG. 39B.

First, a solution of a ruthenium complex (cisdithiocyanato)-N,N'-bis(2,2'-bipyridyl-4,4'-dicarboxylic acid)-ruthenium (II)) dissolved at the concentration of 2.85× 10$^{-4}$ mol/l in an absolute ethanol obtained by dehydration with magnesium ethoxide was prepared. In this solution, a transparent electrode having the aforementioned oxide semiconductor layer 21 was immersed for 24 hours. In this manner, the ruthenium complex as the dye 823 was adsorbed on the surface and the inside of the oxide semiconductor layer 821, thereby obtaining the oxide semiconductor electrode 82 for a solar cell.

While the oxide semiconductor layer 821 was placed on the transparent electrode 85 after removal of the activated carbon powder 87 inside of the oxide semiconductor layer 821 by burning off in this example, it is a matter of course that the removal of the activated carbon powder 87 may be performed after the placement on the transparent electrode 85.

EXAMPLE E162

Example E162 is a modification of Example E161 and employs a different precursor in the supercritical coating method for forming the oxide semiconductor layer 821.

Thus, a similar activated carbon powder 87 was provided, and in the presence of this powder, an n-butanol solution {2.9 mol/l} in which titaniumn-butoxode {Ti(n-BuO)$_4$} was dissolved was dissolved in a supercritical carbon dioxide (150° C., 371 atms). The mixture was kept in this condition for 3 hours.

As a result, the supercritical carbon dioxide containing the precursor was bonded extremely uniformly on the surface of the activated carbon powder 87.

Subsequently, the supercritical carbon dioxide was removed under a reduced pressure, and was dried at room temperature for 10 hours. Then, a heat treatment was performed under an air flow at 570° C. for 10 hours. By this method, the activated carbon powder as the substrate 87 was burnt off, leading to formation of a large number of the oxide semiconductor layers 821 formed of TiO$_2$, having high specific surface areas.

Otherwise similarly to Example E161, an oxide semiconductor electrode 82 was produced.

COMPARATIVE C161

Comparative C161 is a modification of Example E161 and employs a large number of TiO$_2$ fine particles instead of the oxide semiconductor layer 821.

Thus, a TiO$_2$ particle (P25, Nippon Aerosil Co., Ltd.) was first prepared and admixed at the concentration of 37.5% by weight with the solvent consisting of ion exchange water-:acetylacetone:surfactant (polyethylene glycol mono-4-octylphenylether)=100:2:1 (volume ratio) to form a TiO$_2$-containing solution.

Figure 44:
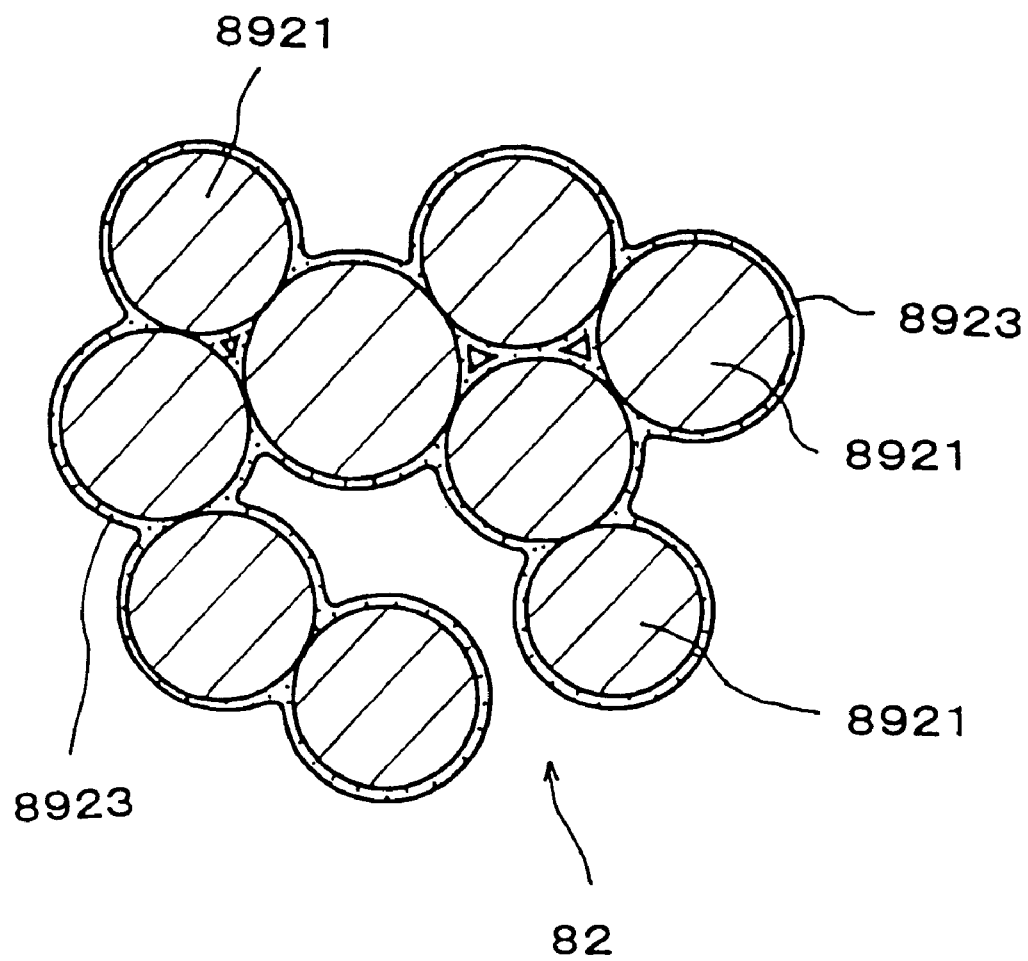
FIG. 44 is an explanatory view of the structure of an oxide semiconductor electrode of a conventional art in Embodiment 16.

Then, a fluorine-doped SnO$_2$-coated glass (ASAHI GLASS) as a transparent electrode 85 was provided and a 10 mm×10 mm area of the surface was coated with the TiO$_2$-containing solution obtained above. Then, after drying at room temperature for 10 hours, a heat treatment was performed under an air flow at 450° C. for 30 minutes. In this manner, the electrode substrate 8921 (FIG. 44) consisting of TiO$_2$ was formed on a transparent electrode 5.

Then a dye 8923 was placed on the electrode substrate 8921. Thus, a solution of a ruthenium complex dissolved at the concentration of 2.85×10$^{-4}$ mol/l in an absolute ethanol obtained by dehydration with magnesium ethoxide was prepared. In this solution, the transparent electrode 85 having the electrode substrate 821 formed thereon was immersed for 24 hours thereby absorbing the ruthenium complex(dye) 83. Otherwise similarly to Example E161, an oxide semiconductor electrode 82 was produced.

Then, using each of the oxide semiconductor electrode produced by the methods described above (Examples E161, E162, Comparative C161), a dye-sensitized solar cell 1 was formed.

Figure 40:
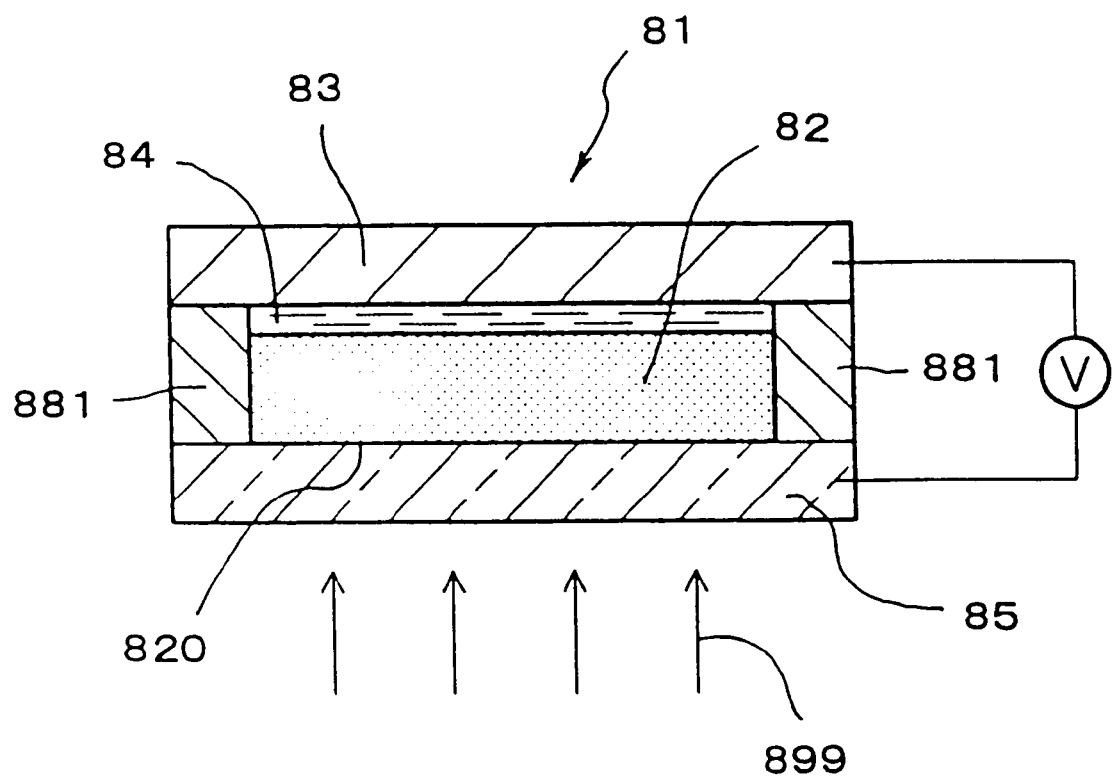
FIG. 40 is an explanatory view of the structure of a dye-sensitized solar cell in Embodiment 16.

As shown in FIG. 40, with the transparent electrode 5 outside, the oxide semiconductor electrode 2 was placed to face counter the electrode 83 (10 mm×20 mm) consisting of a fluorine-doped SnO$_2$-coated glass having a vapor-deposited 50 Å platinum layer which had separately been prepared. Between them, a spacer 881 was sandwiched to create a gap. In this gap, an electrolyte solution 84 was penetrated to obtain a dye-sensitized solar cell 81.

The electrolyte solution 84 was made by dissolving 3.13 g of tetra n-propylammonium iodide and 0.18 g of iodine in the solvent mixture of 21.14 g of ethylene carbonate and 4.0 ml of acetonitrile.

In this embodiment, the properties of dye-sensitized solar cell 81 formed with each oxide semiconductor electrode described above were compared with each other. Specifically, each dye-sensitized solar cell 51 was irradiated with a pseudo-sunlight at 730 W/m$^2$ using a solar simulator (WXS-85, manufactured by WACOM DENSO) and the relationship between the current and the voltage upon sweeping the voltage using a potentiostat was determined.

Figure 41:
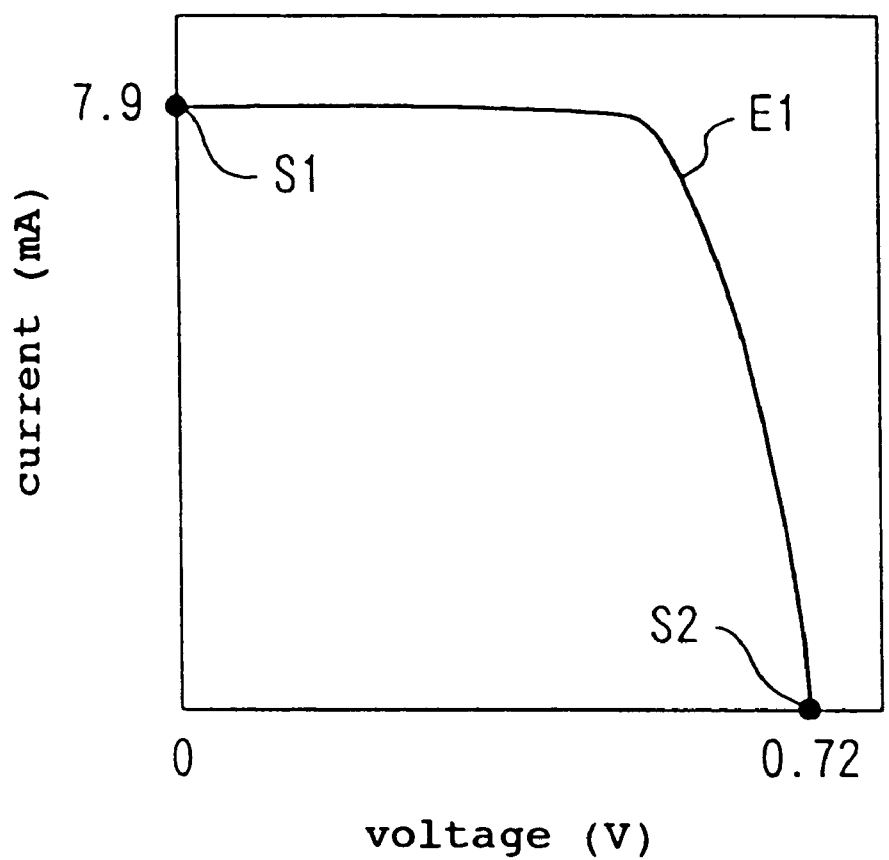
FIG. 41 is a scheme illustrating the relationship between the current and the voltage in Example E161 in Embodiment 16.
Figure 42:
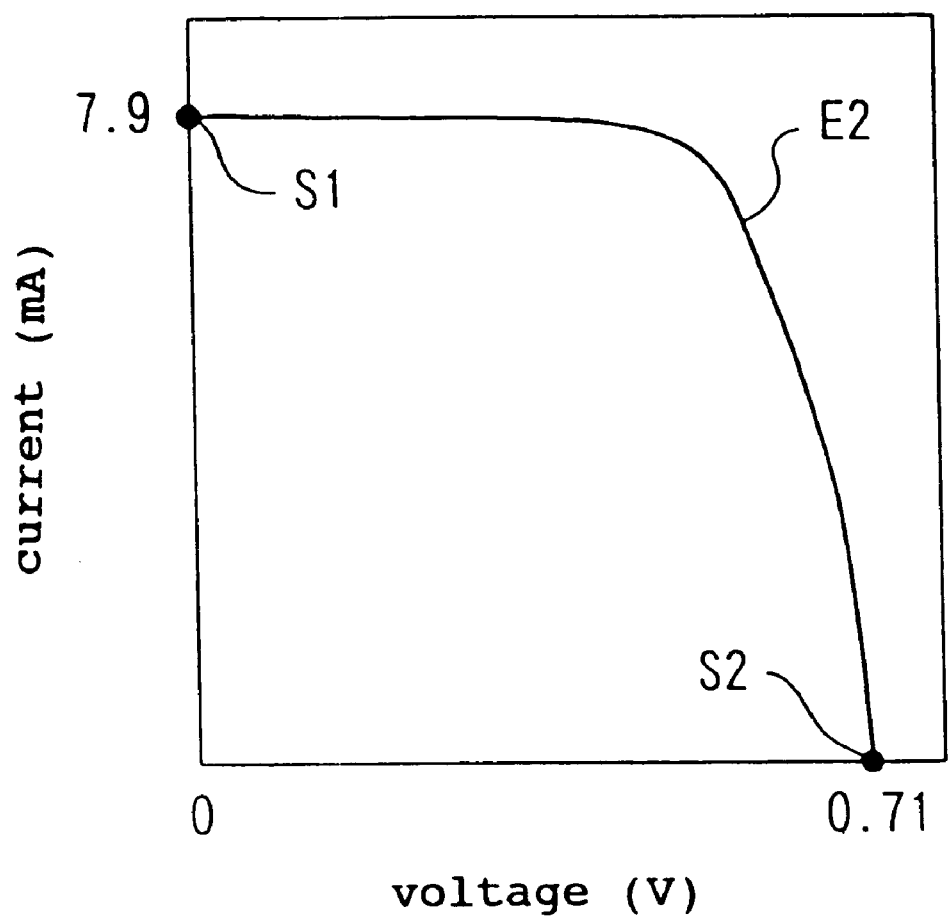
FIG. 42 is a scheme illustrating the relationship between the current and the voltage in Example E162 in Embodiment 16.
Figure 43:
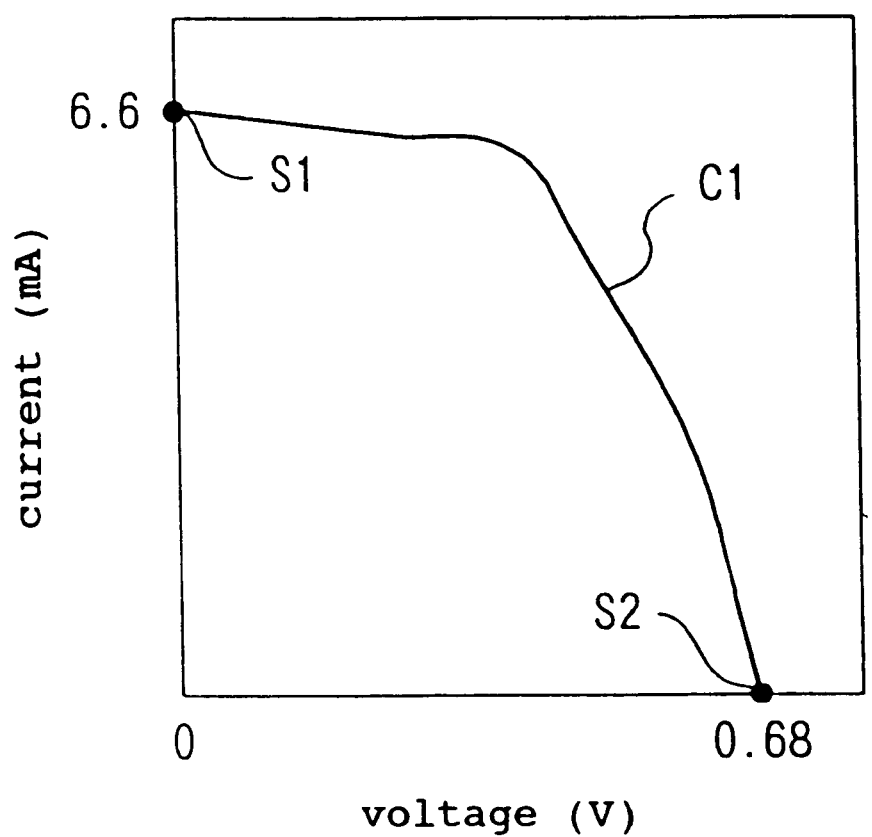
FIG. 43 is a scheme illustrating the relationship between the current and the voltage in Comparative C161 in Embodiment 16.

The results of the determination are shown in FIG. 41 to FIG. 43. In these Figures, the voltage (V) was on the abscissa and the current (mA) was on the ordinate. The results of Example E161, Example E162 and Comparative C161 are shown in FIG. 41, FIG. 42 and FIG. 43, respectively.

Based on the data obtained above, the energy conversion efficiency and the curve factor were obtained. The energy conversion efficiency is represented by (maximum output× 100)/(incident light energy). The curve factor is represented by maximum output/(short current×release voltage). The short current was designated by S1 and the release voltage was designated by S2 in FIG. 41 to FIG. 43.

The curve factor is an index for the performance of a solar cell similarly to the energy conversion efficiency, and a higher value is more preferred.

The energy conversion efficiency and the curve factor of each dye-sensitive solar cell are shown in Table 8.

TABLE 8

| Items | Energy conversion efficiency (%) | Curve factor |
|---|---|---|
| Example E161 | 5.7% | 0.73 |
| Example E162 | 5.5% | 0.72 |
| Comparative C161 | 3.0% | 0.49 |

As evident from FIG. 41 to FIG. 43 and Table 8, it is revealed that the above produced oxide semiconductor electrodes (Examples E161 and E162) are capable of increasing the energy conversion efficiency and the curve factor when compared to the one produced by the conventional method (Comparative C161), which is thus very useful for improving the performance of a solar cell.

Embodiment 17

This embodiment relates to a coated material as an adsorbent for a heat pump and is discussed with reference to FIG. 45.

In this embodiment, an inventive production method (Example E171) and a comparative conventional production method (Comparative C171) were employed to produce adsorbents for a heat pump. The properties of each adsorbent for a heat pump thus obtained were compared with each other.

Example E171 and Comparative C171 are detailed below.

EXAMPLE E171

In this example, an adsorbent (coated material) for a heat pump was obtained by a supercritical coating method consisting of a dissolution step wherein a reaction precursor is dissolved in a supercritical fluid to form a precursor fluid and a coating step wherein the precursor fluid is brought into contact with a adsorbent substrate in the presence with a reaction initiator to allow a reaction between the reaction precursor and the reaction initiator, thereby coating a silica as a reaction product onto said adsorbent substrate.

Specifically, 3 g of tetraethoxysilane was provided as a starting material for the silica as a coating material and was dissolved in carbon dioxide as a supercritical fluid to form a precursor fluid.

On the other hand, as an adsorbent substrate 1 g of an activated carbon fiber (A20, manufactured by Osaka Gas Co., Ltd.) was provided. Water adsorbed on the activated carbon and the OH groups on the surface of the activated carbon served as the reaction initiator described above.

The precursor fluid, the adsorbent substrate and the reaction initiator thus provided were placed in an autoclave, in which the reaction was conducted at 120° C. under 7 MPa for 2 hours.

Drying after completion of the reaction gave an adsorbent for a heat pump according to the present invention which supported on its surface 20% by weight of the silica, with the total weight being regarded as 100% by weight.

COMPARATIVE C171

The adsorbent substrate (A20, manufactured by Osaka Gas Co., Ltd.) employed in the previous example was employed here directly. Thus, no silica was supported on the surface of the adsorbent substrate.

Then, the adsorbents of Example E171 and Comparative C171 thus obtained were subjected to the determination of the isothermal adsorption curves of water vapor. The results are shown in FIG. 45. In this graph, a relative humidity (%) was on the abscissa and a % moisture intake (%) was on the ordinate. In this context, a relative humidity is a ratio ($P/P_0$) of an actual water vapor pressure (P) to a saturate vapor pressure ($P_0$) assuming that a gaseous phase consists entirely of water vapor, and the % moisture intake is a value based on the amount of the water adsorbed when the relative humidity is 90%.

Figure 45:
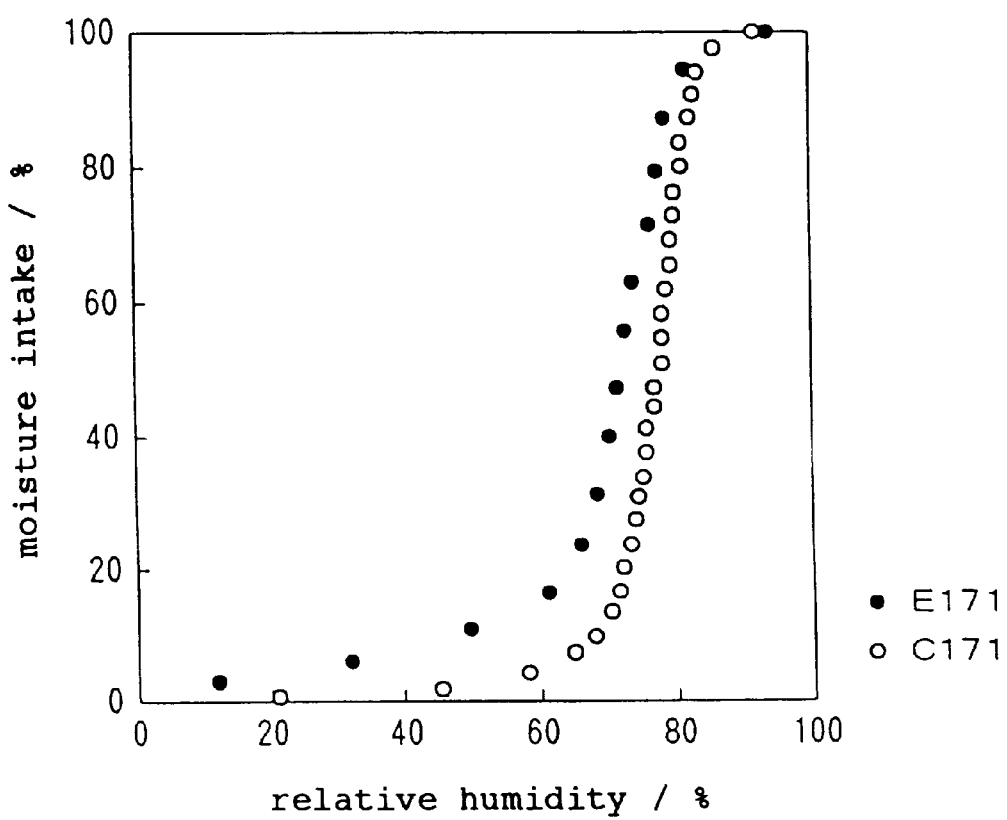
FIG. 45 is the isothermal adsorption curve of water vapor in Embodiment 17.

As evident from FIG. 45, Example E171 exhibited the relative humidity which was shifted to the lower humidity upon intake of the moisture, when compared with Comparative C171. Accordingly, the production method of Example E171 was proven to be extremely useful in improving the hygroscopicity properties essential to an adsorbent for a heat pump.

In this embodiment, the amount of the silica supported was 20% by weight. This was the amount capable of covering the entire surface of the adsorbent substrate employed here (A20), Thus, as long as A20 is employed as an adsorbent substrate, it is preferable to support 20% by weight or more of the silica. On the other hand, when an excessive silica is supported, the micropore of the adsorbent substrate may fully be packed up. Therefore, the amount is preferably 200% by weight or less.

Embodiment 18

In this embodiment, other examples of the method for producing various coated materials described above are discussed together with comparatives.

In each of Examples E181 to E184, a coating material whose thickness is 50 nm or less was formed on the surface of a substrate. After coating, the substrate may be removed. Details are as follows.

EXAMPLES 181

3 ml of tetraethoxysilane $\{Si(C_2H_5O)_4\}$ which is a precursor for a silica ($SiO_2$) was dissolved in a supercritical carbon dioxide at 104° C. under 231 atms, which was then brought into contact with 1.0 g of a water-supporting activated carbon (specific surface area:1781 $m^2/g$) to coat the silica ($SiO_2$) onto the surface of the activated carbon, thereby obtaining an activated carbon-silica ($SiO_2$) complex, which was then heated in the air at 750° C. for 10 hours to remove the activated carbon.

EXAMPLE 182

3 ml of tetraethoxysilane $\{Si(C_2H_5O)_4\}$ which is a precursor for a silica ($SiO_2$) was dissolved in 20 ml of ethanol and heated at 102° C., which was then brought into contact with 1.0 g of a water-supporting activated carbon (specific surface area: 1781 $m^2/g$) to coat the silica ($SiO_2$) onto the surface of the activated carbon, thereby obtaining an activated carbon-silica ($SiO_2$) complex, which was then heated in the air at 750° C. for 10 hours to remove the activated carbon.

EXAMPLE E183

3 ml of tetra n-butoxytitanium $[Ti(C_4H_9O)_4]$ used instead of tetraethoxysilane $\{Si(C_2H_5O)_4\}$ was dissolved in a supercritical carbon dioxide at 131° C. under 254 atms, which was then brought into contact with 1.0 g of a water-supporting activated carbon (specific surface area:1745 $m^2/g$) to coat the titania ($TiO_2$) onto the surface of the activated carbon, thereby obtaining an activated carbon-titania ($TiO_2$) complex, which was then heated in the air at 750° C. for 10 hours to remove the activated carbon.

EXAMPLE E184

3.0 g of isopropoxyaluminum $[Al(C_3H_7O)_3]$ used instead of tetraethoxysilane $\{Si(C_2H_5O)_4\}$ was dissolved in a 20 ml of isopropanol and heated at 113° C., which was then brought into contact with 1.0 g of a water-supporting activated carbon (specific surface area:1745 $m^2/g$) to coat the alumina ($Al_2O_3$) onto the surface of the activated carbon, thereby obtaining an activated carbon-alumina ($Al_2O_3$) complex, which was then heated in the air at 750° C. for 10 hours to remove the activated carbon.

COMPARATIVE C181

20 ml of tetraethoxysilane $\{Si(C_2H_5O)_4\}$ which is a precursor for a silica ($SiO_2$) was heated at 102° C., and then brought into contact with 1.0 g of a water-supporting activated carbon (specific surface area:1781 $m^2/g$) to coat the silica ($SiO_2$) onto the surface of the activated carbon, thereby obtaining an activated carbon-silica ($SiO_2$) complex, which was then heated in the air at 750° C. for 10 hours to remove the activated carbon.

COMPARATIVE C182

20 ml of tetra n-butoxytitanium $[Ti(C_4H_9O)_4]$ used instead of tetraethoxysilane $\{Si(C_2H_5O)_4\}$ of Comparative C181 was heated at 130° C., which was then brought into contact with 1.0 g of a water-supporting activated carbon (specific surface area:1781 $m^2/g$) to coat the titania ($TiO_2$) onto the surface of the activated carbon, thereby obtaining an activated carbon-titania ($TiO_2$) complex, which was then heated in the air at 750° C. for 10 hours to remove the activated carbon.

COMPARATIVE C183

20 ml of tri-sec-butoxyaluminum $[Al(C_2H_5CH(CH_3)O)_3]$ used instead of tetraethoxysilane $\{Si(C_2H_5O)_4\}$ of Comparative C181 was heated at 115° C., which was then brought into contact with 1.0 g of a water-supporting activated carbon (specific surface area:1745 $m^2/g$) to coat the alumina ($Al_2O_3$) onto the surface of the activated carbon, thereby obtaining an activated carbon-alumina ($Al_2O_3$) complex, which was then heated in the air at 750° C. for 10 hours to remove the activated carbon.

Then, the coating thickness and the specific surface area of each of the coated materials of Examples E181 to E184 and Comparatives C181 to C183 were determined and are shown in Table 9.

The coating thickness t was calculated according to the following equation from the data of the micropore distribution determined before and after coating based on the nitrogen adsorption of the activated carbon. Equation:

$$t=(a-b)/2$$

wherein a=(peak of micropore distribution of activated carbon before coating) mm, b=(peak of micropore distribution of activated carbon after coating) mm The specific surface area of each coating was determined based on the nitrogen adsorption by B.E.T. (Brunauer, Emmett, Teller) method.

TABLE 9

|  | Coating material | Thickness (nm) | Specific surface area ($m^2/g$) |
|---|---|---|---|
| Example E181 | silica | 1 | 1321 |
| Example E182 | silica | 15 | 1352 |
| Example E183 | titania | 2 | 311 |
| Example E184 | silica | 5 | 879 |
| Comparative C181 | alumina | 63 | 231 |
| Comparative C182 | silica | 88 | 3 |
| Comparative C183 | alumina | 78 | 16 |

As evident from Table 9, each of the coated materials of Examples E181 to E184 had a specific surface area as high as that of the substrate activated carbon, and had the surface profile reflecting the configuration of the substrate as fine as nanometers.

On the other hand, Comparatives C181 to C183 exhibited markedly low specific surface areas, indicating the closure of the pore of the substrate with the silica formed and no penetration into the inside of the substrate.

Ordinary specific surface areas of untreated silica, titania and alumina are several hundreds $m^2/g$, 50 to 60 $m^2/g$ and 200 to 300 $m^2/g$, respectively.

Figure 46:
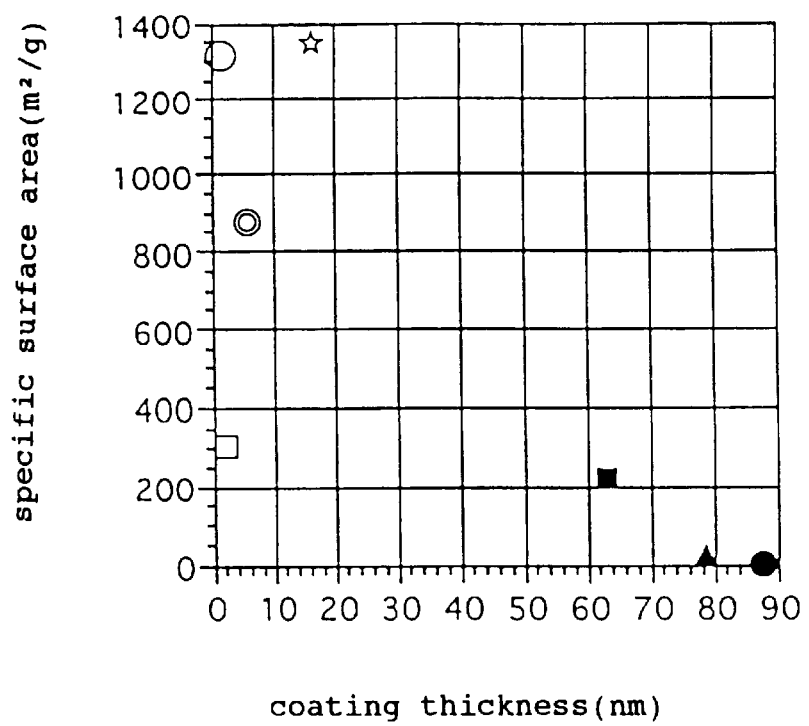
FIG. 46 shows a property illustration of the relationship between the coating thickness and the specific surface area of a coating material in Embodiment 18.

The coating thickness and the specific surface area of each of the coated materials of Examples E181 to E184 and Comparatives C181 to C183 were plotted in the graphical representation shown in FIG. 46.

As evident from FIG. 46, an abrupt reduction in the specific surface area and difficulty in transferring the microstructure of the activated carbon were observed as the 30 nm borderline of a coating thickness was exceeded.

What is claimed is:

1. A coated material comprising a substrate which has micropores, and a reaction product coated thereon along the surface configuration of the substrate and an inner wall of the micropores thereof, wherein said reaction product is formed by the reaction of a reaction precursor dissolved in a supercritical fluid, with a reaction initiator.

2. The coated material according to claim 1, wherein the coated material is a condenser comprising a conductive porous substrate as the substrate, a dielectric layer as a first reaction product and a counter electrode layer as a second reaction product, wherein the specific surface area of said dielectric layer is $1 \times 10^8$ $m^2/m^3$ or more.

3. A coated material comprising a substrate having micropores a part of which is to be removed and, a reaction product coated along the surface configuration of the substrate and an inner wall of the micropores, wherein said reaction product is formed by the reaction of a reaction precursor dissolved in a supercritical fluid, with a reaction initiator.

4. The coated material according to claim 3, wherein the coated material is a condenser comprising a substrate-side electrode layer as a first reaction product, a dielectric layer as a second reaction product and a counter electrode layer as a third reaction product, wherein the specific surface area of said dielectric layer is $1 \times 10^8$ $m^2/m^3$ or more.

5. A method for producing a coated material comprising a supercritical coating step wherein a reaction precursor is dissolved in a supercritical fluid to form a precursor fluid and then the precursor fluid is brought into contact with a substrate in the presence of a reaction initiator to allow a reaction between the reaction precursor and the reaction initiator, thereby coating a reaction product onto the substrate.

6. The method according to claim 5, wherein the coated material is a condenser comprising a conductive porous substrate, a dielectric layer and a counter electrode layer, the method comprising:

a dielectric layer forming step wherein the dielectric layer is formed on the surface of the conductive porous layer and a counter electrode forming step wherein the counter electrode layer is coated onto said dielectric layer, wherein at least one of said dielectric layer forming step and said counter electrode forming step is conducted by means of the supercritical coating step.

7. The method according to claim 5, wherein the coated material is a condenser comprising a porous substrate, a substrate-side electrode layer, a dielectric layer and a counter electrode layer, the method comprising:

performing a substrate-side electrode forming step wherein the substrate-side electrode layer is formed on the surface of the porous substrate, a dielectric layer forming step wherein the dielectric layer is formed on said substrate-side electrode layer, and a counter electrode layer forming step wherein the counter electrode layer is formed on said dielectric layer, wherein at least one of said substrate-side electrode forming step, said dielectric layer forming step and said counter electrode layer forming step is conducted by means of the supercritical coating step.

8. The method according to claim 5, wherein the coated material is a metal-supported material having a metal supported on the substrate, the method including a supercritical coating step which comprises:

a dissolution step wherein a metal precursor is dissolved in a supercritical fluid to form a precursor fluid, a supercritical coating step wherein the precursor fluid is brought into contact with the substrate in the presence of a reaction initiator to allow a reaction between the metal precursor and the reaction initiator, thereby coating the metal onto the substrate.

9. The method according to claim 5, wherein the coated material is a metal-supported material having a metal supported on the substrate, comprising:

a supercritical coating step wherein a metal precursor is dissolved in a supercritical fluid to form a precursor fluid, and then the precursor fluid is brought into contact with the substrate in the presence of a reaction initiator to allow a reaction between the metal precursor and the reaction initiator, thereby coating the metal onto the substrate, and, a sintering step wherein the material thus obtained is heated and sintered.

10. The method according to claim 5, wherein the coated material is a light catalyst supporting a light catalyst component on the porous substrate, comprising:

a supercritical coating step wherein a precursor fluid is formed by dissolving a light catalyst precursor for forming a light catalyst component in a supercritical fluid and then the precursor fluid is brought into contact with the porous substrate in the presence of a reaction initiator thereby coating the light catalyst component on the porous substrate.

11. The method according to claim 10, wherein the light catalyst is subjected to a heat treatment at 300 to 700° C. after performing the coating step.

12. The method according to claim 5, wherein the coated material is an oxide semiconductor electrode having a modified layer formed on at least a part of the surface of an electrode substrate, comprising:

a supercritical coating step wherein a reaction precursor of the modified layer is dissolved in a supercritical fluid to form a precursor fluid and then the precursor fluid is brought into contact with a porous oxide semiconductor in the presence of a reaction initiator to allow a reaction between the reaction precursor and the reaction initiator, thereby coating a reaction product as an oxide onto said oxide semiconductor.

13. The method according to claim 5, wherein the coated material is an oxide semiconductor electrode comprising an electrode substrate, a modified layer and a dye, comprising:

a supercritical coating step wherein a reaction precursor of the modified layer is dissolved in a supercritical fluid to form a precursor fluid and then the precursor fluid is brought into contact with the electrode substrate consisting of a porous oxide semiconductor in the presence of a reaction initiator to allow a reaction between the reaction precursor and the reaction initiator, thereby coating a reaction product as an oxide onto said electrode substrate to form the modified layer on at least a part of the surface of the electrode substrate, and, a dye placing step wherein the dye is placed on the top of said modified layer.

14. The method according to claim 5, wherein the coated material is an oxide semiconductor electrode having an oxide semiconductor layer, comprising:

a supercritical coating step wherein a reaction precursor of the oxide semiconductor is dissolved in a supercritical fluid to form a precursor fluid and then the precursor fluid is brought into contact with a substrate having a high specific surface area in the presence of a reaction initiator to allow a reaction between the reaction precursor and the reaction initiator, thereby coating an oxide semiconductor onto said substrate.

15. The method according to claim 5, wherein the coated material is an oxide semiconductor electrode having an oxide semiconductor layer and a dye, comprising:

a supercritical coating step wherein a reaction precursor of the oxide semiconductor is dissolved in a supercritical fluid to form a precursor fluid and then the precursor fluid is brought into contact with a substrate having a high specific surface area in the presence of a reaction initiator to allow a reaction between the reaction precursor and the reaction initiator, thereby coating an oxide semiconductor onto said substrate, and, a dye placing step wherein the dye is placed on the top of said oxide semiconductor layer.

16. The method according to claim 5, wherein the coated material which is an adsorbent, comprising:

a supercritical coating step wherein a reaction precursor is dissolved in a supercritical fluid to form a precursor fluid and then the precursor fluid is brought into contact with a adsorbent substrate in the presence with a reaction initiator to allow a reaction between the reaction precursor and the reaction initiator, thereby coating a hydrophilic substance as a reaction product onto said adsorbent substrate.

17. The method according to claim 5, wherein the reaction initiator is contained in the substrate.

18. A method for producing a coated material comprising:

a supercritical coating step wherein a reaction precursor is dissolved in a supercritical fluid to form a precursor fluid and then the precursor fluid is brought into contact with a substrate in the presence of a reaction initiator to allow a reaction between the reaction precursor and the reaction initiator, thereby coating a reaction product onto the substrate; and, a removing step wherein at least a part of the substrate is removed.

19. The method according to claim 17, wherein the coated material is a catalyst having a catalyst component as supported on a support material, comprising:

a catalyst component bonding step wherein the catalyst component is bonded as dispersed onto the surface of a substrate;

a support coating step wherein the support material is coated on said catalyst component, followed by;

a substrate removing step wherein the substrate is removed, wherein at least one of catalyst bonding step and the support coating step is conducted by means of the supercritical coating step.

20. The method according to claim 17, wherein the coated material is a noble metal-supporting catalyst having a noble metal supported on a support material, comprising:

a noble metal loading step wherein the noble metal as the catalyst component is loaded as dispersed onto a pore wall surface of a porous substrate;

a support coating step wherein the support material is coated on said noble metal, followed by;

a substrate removing step wherein the porous substrate is removed, wherein at least one of the noble metal loading step and the support coating step is conducted by means of the supercritical coating step.

21. A coated material manufactured by a method comprising a supercritical coating step wherein a reaction precursor is dissolved in a supercritical fluid to form a precursor fluid and then the precursor fluid is brought into contact with a substrate in the presence of a reaction initiator contained in the substrate to allow a reaction between the reaction precursor and the reaction initiator, thereby coating a reaction product onto the substrate.

22. The method according to claim 18, wherein the reaction initiator is contained in the substrate.

23. A coated material manufactured by a method comprising a supercritical coating step wherein a reaction precursor is dissolved in a supercritical fluid to form a precursor fluid and then the precursor fluid is brought into contact with a substrate in the presence of a reaction initiator to allow a reaction between the reaction precursor and the reaction initiator, thereby coating a reaction product onto the substrate.

24. The coated material according to claim 21, wherein the coated material is a metal-supported material having a metal supported on the substrate, obtained by performing:

a supercritical coating step wherein a metal precursor is dissolved in a supercritical fluid to form a precursor fluid, and then the precursor fluid is brought into contact with the substrate in the presence of a reaction initiator to allow a reaction between the metal precursor and the reaction initiator, thereby coating the metal onto the substrate.

25. The coated material according to claim 21, wherein the coated material is a metal-supported material having a metal supported on the substrate, obtained by performing:

a supercritical coating step wherein a metal precursor is dissolved in a supercritical fluid to form a precursor fluid, and then the precursor fluid is brought into contact with the substrate in the presence of a reaction initiator to allow a reaction between the metal precursor and the reaction initiator, thereby coating the metal onto the substrate followed by sintering the material.

26. The coated material according to claim 21, wherein the coated material is a light catalyst supporting a light catalyst component on a porous substrate, obtained by performing:

a supercritical coating step wherein a precursor fluid is formed by dissolving a light catalyst precursor for forming a light catalyst component in a supercritical fluid and then the precursor fluid is brought into contact with the porous substrate in the presence of a reaction initiator thereby coating the light catalyst component on the porous substrate.

27. The coated material according to claim 21, wherein the coated material is a light catalyst supporting a light catalyst component on the porous substrate, obtained by performing:

a supercritical coating step wherein a precursor fluid is formed by dissolving a light catalyst precursor for forming a light catalyst component in a supercritical fluid and then the precursor fluid is brought into contact with the porous substrate in the presence of a reaction initiator thereby coating the light catalyst component on the porous substrate, followed by, a heat treatment at 300 to 700° C.

28. The coated material according to claim 21, which is an oxide semiconductor electrode having a modified layer formed on at least a part of the surface of an electrode substrate, obtained by performing:

a supercritical coating step wherein a reaction precursor of the modified layer is dissolved in a supercritical fluid to form a precursor fluid and then the precursor fluid is brought into contact with a porous oxide semiconductor in the presence of a reaction initiator to allow a reaction between the reaction precursor and the reaction initiator, thereby coating a reaction product as an oxide onto said oxide semiconductor.

29. The coated material according to claim 21, which is an oxide semiconductor electrode comprising an electrode substrate, a modified layer and a dye, obtained by performing:

a supercritical coating step wherein a reaction precursor of the modified layer is dissolved in a supercritical fluid to form a precursor fluid and then the precursor fluid is brought into contact with the electrode substrate consisting of a porous oxide semiconductor in the presence of a reaction initiator to allow a reaction between the reaction precursor and the reaction initiator, thereby coating a reaction product as an oxide onto said electrode substrate to form the modified layer on at least a part of the surface of the electrode substrate, followed by, a dye placing step wherein a dye is placed on the top of said modified layer.

30. The coated material according to claim 21, which is an oxide semiconductor electrode having an oxide semiconductor layer, obtained by performing:

a supercritical coating step wherein a reaction precursor of the oxide semiconductor is dissolved in a supercritical fluid to form a precursor fluid and then the precursor fluid is brought into contact with a substrate having a high specific surface area in the presence of a reaction initiator to allow a reaction between the reaction precursor and the reaction initiator, thereby coating an oxide semiconductor onto said substrate.

31. The coated material according to claim 21, which is an oxide semiconductor electrode having an oxide semiconductor layer and a dye, obtained by performing:

a supercritical coating step wherein a reaction precursor of the oxide semiconductor is dissolved in a supercritical fluid to form a precursor fluid and then the precursor fluid is brought into contact with a substrate having a high specific surface area in the presence of a reaction initiator to allow a reaction between the reaction precursor and the reaction initiator, thereby coating an oxide semiconductor onto said substrate, followed by, placing the dye on the top of said oxide semiconductor layer.

32. The coated material according to claim 21, wherein the coated material is an adsorbent, obtained by performing:

a supercritical coating step wherein a reaction precursor is dissolved in a supercritical fluid to form a precursor fluid and then the precursor fluid is brought into contact with an adsorbent substrate in the presence with a reaction initiator to allow a reaction between the reaction precursor and the reaction initiator, thereby coating a hydrophilic substance as a reaction product onto said adsorbent substrate.

33. A coated material manufactured by a method comprising a supercritical coating step wherein a reaction precursor is dissolved in a supercritical fluid to form a precursor fluid and then the precursor fluid is brought into contact with a substrate in the presence of a reaction initiator contained in the substrate to allow a reaction between the reaction precursor and the reaction initiator, thereby coating a reaction product onto the substrate, followed by removing at least a part of the substrate.

34. The coated material according to claim 33, wherein the coated material is a condenser comprising a substrate-side electrode layer, a dielectric layer and a counter electrode layer, obtained by:

performing a substrate-side electrode forming step wherein the substrate-side electrode layer is formed on the surface of a porous substrate, a dielectric layer forming step wherein the dielectric layer is formed on said substrate-side electrode layer, a counter electrode layer forming step wherein the counter electrode layer is formed on said dielectric layer, and a removing step wherein the porous substrate is removed, wherein at least one of said substrate-side electrode forming step, said dielectric layer forming step and said counter electrode layer forming step is conducted by means of the supercritical coating step.

35. The coated material according to claim 23, wherein the reaction initiator is contained in the substrate.

36. A coated material manufactured by a method comprising a supercritical coating step wherein a reaction precursor is dissolved in a supercritical fluid to form a precursor fluid and then the precursor fluid is brought into contact with a substrate in the presence of a reaction initiator to allow a reaction between the reaction precursor and the reaction initiator, thereby coating a reaction product onto the substrate, followed by removing at least a part of the substrate.

37. A dye-sensitized solar cell comprising an oxide semiconductor electrode, a counter electrode, an electrolyte fluid provided therebetween, and a transparent plate provided on the light-facing side of the oxide semiconductor electrode, wherein said oxide semiconductor electrode is a coated material having a conductive center electrode whose surface is coated with an oxide semiconductor and a dye provided on the surface of said oxide semiconductor to taken an electron from said center electrode, wherein the coated material as the oxide semiconductor is produced by a method comprising a supercritical coating step wherein a reaction precursor is dissolved in a supercritical fluid to form a precursor fluid and then the precursor fluid is brought into contact with a substrate in the presence with a reaction initiator to allow a reaction between the reaction precursor and the reaction initiator, thereby coating a reaction product onto the substrate.

38. A surface configuration reproducing material comprising a reaction product formed along a configuration of a surface of a substrate which has micropores, thereby reproducing the surface configuration of the substrate wherein said reaction product is obtained by coating the substrate with a precursor fluid comprising a supercritical fluid and a reaction precursor dissolved therein in a supercritical coating step, and then bringing the precursor fluid into contact with the substrate in the presence of a reaction initiator, reacting the reaction precursor with the reaction initiator to form the reaction product, thereby coating the reaction product onto the substrate.

39. The coated material according to claim 36, wherein the coated material is a noble metal-supporting catalyst having a noble metal supported on a support material, obtained by performing:

a noble metal loading step wherein the noble metal as the catalyst component is loaded as dispersed onto a pore wall surface of a porous substrate;

a support coating step wherein the support material is coated on said noble metal, followed by;

a substrate removing step wherein the porous substrate is removed, wherein at least one of the noble metal loading step and the support coating step is conducted by means of the supercritical coating step.

40. The coated material according to claim 36, wherein the reaction initiator is contained in the substrate.

* * * * *

UNITED STATES PATENT AND TRADEMARK OFFICE
CERTIFICATE OF CORRECTION

PATENT NO. : 6,194,650 B1
DATED : February 27, 2001
INVENTOR(S) : Hiroaki Wakayama et al.

It is certified that error appears in the above-identified patent and that said Letters Patent is hereby corrected as shown below:

Claim 19,
Line 1, delete "17" and insert -- 18 --.

Claim 20,
Line 1, delete "17" and insert -- 18 --.

Claim 21,
Lines 5-6, delete "contained in the substrate".

Claim 23,
Delete in its entirety.

Claim 33,
Lines 5-6, delete "contained in the substrate".

Claim 36,
Delete in its entirety.

Claim 39,
Line 1, delete "36" and insert -- 33 --.

Claim 40,
Line 1, delete "36" and insert -- 21 --.

Insert original Claims 11, 12, 13 and 17 (note dependencies in "Request")

Signed and Sealed this

Twenty-second Day of January, 2002

Attest:

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 6,194,650 B1　　　　　　　　　　　　　　　　　　　　　　　Page 1 of 1
DATED : February 27, 2001
INVENTOR(S) : Wakayama et al.

It is certified that error appears in the above-identified patent and that said Letters Patent is hereby corrected as shown below:

Column 69, claim 35,
Line 5, "The coated material according to claim 23, ... should read -- The coated material according to claim 33,... --

Signed and Sealed this

Fifth Day of March, 2002

Attest:

Attesting Officer

JAMES E. ROGAN
*Director of the United States Patent and Trademark Office*